(12) United States Patent
Masi et al.

(10) Patent No.: US 11,334,220 B2
(45) Date of Patent: May 17, 2022

(54) METHOD, APPARATUS, AND COMPUTER-READABLE MEDIUM FOR PROPAGATING CROPPED IMAGES OVER A WEB SOCKET CONNECTION IN A NETWORKED COLLABORATION WORKSPACE

(71) Applicant: Re Mago Holding LTD, London (GB)

(72) Inventors: Marco Valerio Masi, Lugano Paradiso (CH); Cristiano Fumagalli, Segrate (IT)

(73) Assignee: RE MAGO LTD., London (GB)

( * ) Notice: Subject to any disclaimer, the term of this patent is extended or adjusted under 35 U.S.C. 154(b) by 59 days.

(21) Appl. No.: 15/983,747

(22) Filed: May 18, 2018

(65) Prior Publication Data

US 2019/0065010 A1    Feb. 28, 2019

Related U.S. Application Data

(63) Continuation-in-part of application No. 15/685,533, filed on Aug. 24, 2017, now Pat. No. 10,380,038.

(51) Int. Cl.
*G06F 3/0482* (2013.01)
*G06T 11/60* (2006.01)
(Continued)

(52) U.S. Cl.
CPC .......... *G06F 3/0482* (2013.01); *G06F 3/1454* (2013.01); *G06T 11/60* (2013.01);
(Continued)

(58) Field of Classification Search
CPC ...... G06F 3/0482; G06F 3/1454; G06F 3/017; G06F 3/0304; G06F 3/03542;
(Continued)

(56) References Cited

U.S. PATENT DOCUMENTS

| | | | | |
|---|---|---|---|---|
| 2007/0124737 A1* | 5/2007 | Wensley | ................. | G06F 9/546 719/314 |
| 2008/0028323 A1* | 1/2008 | Rosen | .................... | G06Q 10/10 715/752 |

(Continued)

*Primary Examiner* — Joshua D Taylor
*Assistant Examiner* — Adil Ocak
(74) *Attorney, Agent, or Firm* — Amardeep S. Grewal; Gerard M. Donovan; Reed Smith LLP

(57) ABSTRACT

A system, method and computer-readable medium for propagating cropped images over a web socket connection in a networked collaboration workspace, including transmitting a representation of a collaboration workspace hosted on a server and including images, detecting a user input selecting an image portion of an image, the user input corresponding to coordinates, transmitting the coordinates to a transparent layer, the transparent layer comprising an application programming interface configured to interface with the operating system or applications, capturing the image portion based at least in part on the coordinates, detecting a second user input to drag the selected image portion to a location, and transmitting a plurality of commands to the server, the plurality of commands being configured to cause the image to be removed from the collaboration workspace and cause the image portion to be inserted into the collaboration workspace based at least in part on the location.

21 Claims, 42 Drawing Sheets

(51) Int. Cl.

|  |  |
|---|---|
| *H04L 29/08* | (2006.01) |
| *H04L 12/18* | (2006.01) |
| *H04L 29/06* | (2006.01) |
| *G06F 3/14* | (2006.01) |
| *G09G 5/14* | (2006.01) |
| *H04L 67/02* | (2022.01) |
| *H04L 67/131* | (2022.01) |

(52) U.S. Cl.
CPC ........... *G09G 5/14* (2013.01); *H04L 12/1813* (2013.01); *H04L 12/1822* (2013.01); *H04L 67/02* (2013.01); *H04L 67/38* (2013.01); *G09G 2340/045* (2013.01); *G09G 2340/10* (2013.01); *G09G 2354/00* (2013.01); *G09G 2370/022* (2013.01)

(58) Field of Classification Search
CPC ............... G06F 3/0425; G06F 3/04842; G06F 3/04845; G06F 3/04883; G06T 11/60; G09G 5/14; G09G 2340/045; G09G 2340/10; G09G 2354/00; G09G 2370/022; H04L 12/1813; H04L 12/1822; H04L 67/02; H04L 67/38
See application file for complete search history.

(56) References Cited

U.S. PATENT DOCUMENTS

2011/0016419 A1* 1/2011 Grosz .................. G06K 9/6267
 715/769
2017/0324834 A1* 11/2017 Hodge .................. H04L 12/287

\* cited by examiner

METHOD, APPARATUS, AND COMPUTER-READABLE MEDIUM FOR PROPAGATING CROPPED IMAGES OVER A WEB SOCKET CONNECTION IN A NETWORKED COLLABORATION WORKSPACE

This application is a continuation-in-part of U.S. application Ser. No. 15/685,533, titled "METHOD, APPARATUS, AND COMPUTER-READABLE MEDIUM FOR IMPLEMENTATION OF A UNIVERSAL HARDWARE-SOFTWARE INTERFACE" and filed Aug. 24, 2017, the disclosure of which is hereby incorporated by reference in its entirety.

BACKGROUND

Operating systems and applications executing within operating systems frequently make use of external hardware devices to allow users to provide input to the program and to provide output to users. Common examples of external hardware devices include a keyboard, a computer mouse, a microphone, and external speakers. These external hardware devices interface with the operating system through the use of drivers, which are specialized software programs configured to interface between the hardware commands used by a particular hardware device and the operating system.

Applications will sometimes be designed to interface with certain hardware devices. For example, a voice-to-text word processing application can be designed to interface with an audio headset including a microphone. In this case, the application must be specifically configured to receive voice commands, perform voice recognition, convert the recognized words into textual content, and output the textual content into a document. This functionality will typically be embodied in the application's Application Programming Interface (API), which is a set of defined methods of communication between various software components. In the example of the voice recognition application, the API can include an interface between the application program and software on a driver that is responsible for interfacing with the hardware device (the microphone) itself One problem with existing software that makes use of specialized hardware devices is that the application or operating system software itself must be customized and specially designed in order to utilize the hardware device. This customization means that the hardware device cannot exceed the scope defined for it by the application and cannot be utilized for contexts outside the specific application for which it was designed to be used. For example, a user of the voice-to-text word processing application could not manipulate other application programs or other components within the operating system using voice commands unless those other application programs or the operating system were specifically designed to make use of voice commands received over the microphone.

FIG. 1 illustrates an example of the existing architecture of systems which make use of coupled hardware devices for user input. The operating system 100A of FIG. 1 includes executing applications 101A and 102A, each of which have their own APIs, 101B and 102B, respectively. The operating system 100A also has its own API 100B, as well as specialized drivers 100C, 101C, and 102C, configured to interface with hardware devices 100D, 101D, and 102D.

As shown in FIG. 1, application API 101B is configured to interface with driver 101C which itself interfaces with hardware device 101D. Similarly, application API 102B is configured to interface with driver 102C which itself interfaces with hardware device 102D. At the operating system level, the operating system API 100B is configured to interface with driver 100C, which itself interfaces with hardware device 100D.

The architecture of the system shown in FIG. 1 limits the ability of users to utilize hardware devices outside of certain application or operating system contexts. For example, a user could not utilize hardware device 101D to provide input to application 102A and could not utilize hardware device 102D to provide input to application 101A or to the operating system 100A.

Accordingly, improvements are needed in hardware-software interfaces which allow for utilization of hardware devices in multiple software contexts.

DETAILED DESCRIPTION

While methods, apparatuses, and computer-readable media are described herein by way of examples and embodiments, those skilled in the art recognize that methods, apparatuses, and computer-readable media for implementation of a universal hardware-software interface are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," and "includes" mean including, but not limited to.

Applicant has discovered a method, apparatus, and computer-readable medium that solves the problems associated with previous hardware-software interfaces used for hardware devices. In particular, Applicant has developed a universal hardware-software interface which allows users to utilize communicatively-coupled hardware devices in a variety of software contexts. The disclosed implementation removes the need for applications or operating systems to be custom designed to interface with a particular hardware device through the use of a specialized virtual driver and a corresponding transparent layer, as is described below in greater detail.

Figure 1:
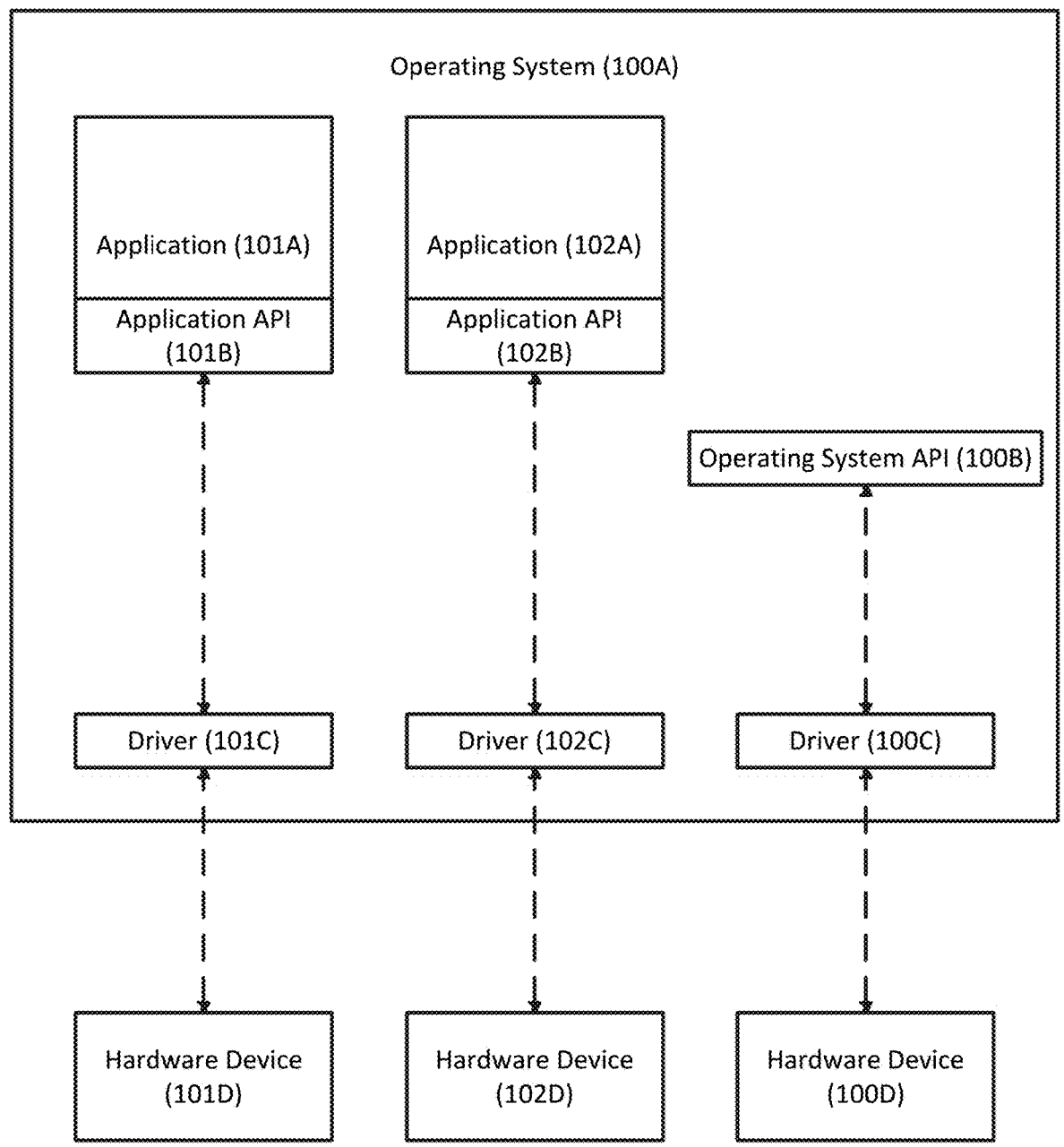
FIG. 1 illustrates an example of the existing architecture of systems which make use of coupled hardware devices for user input.
Figure 2:
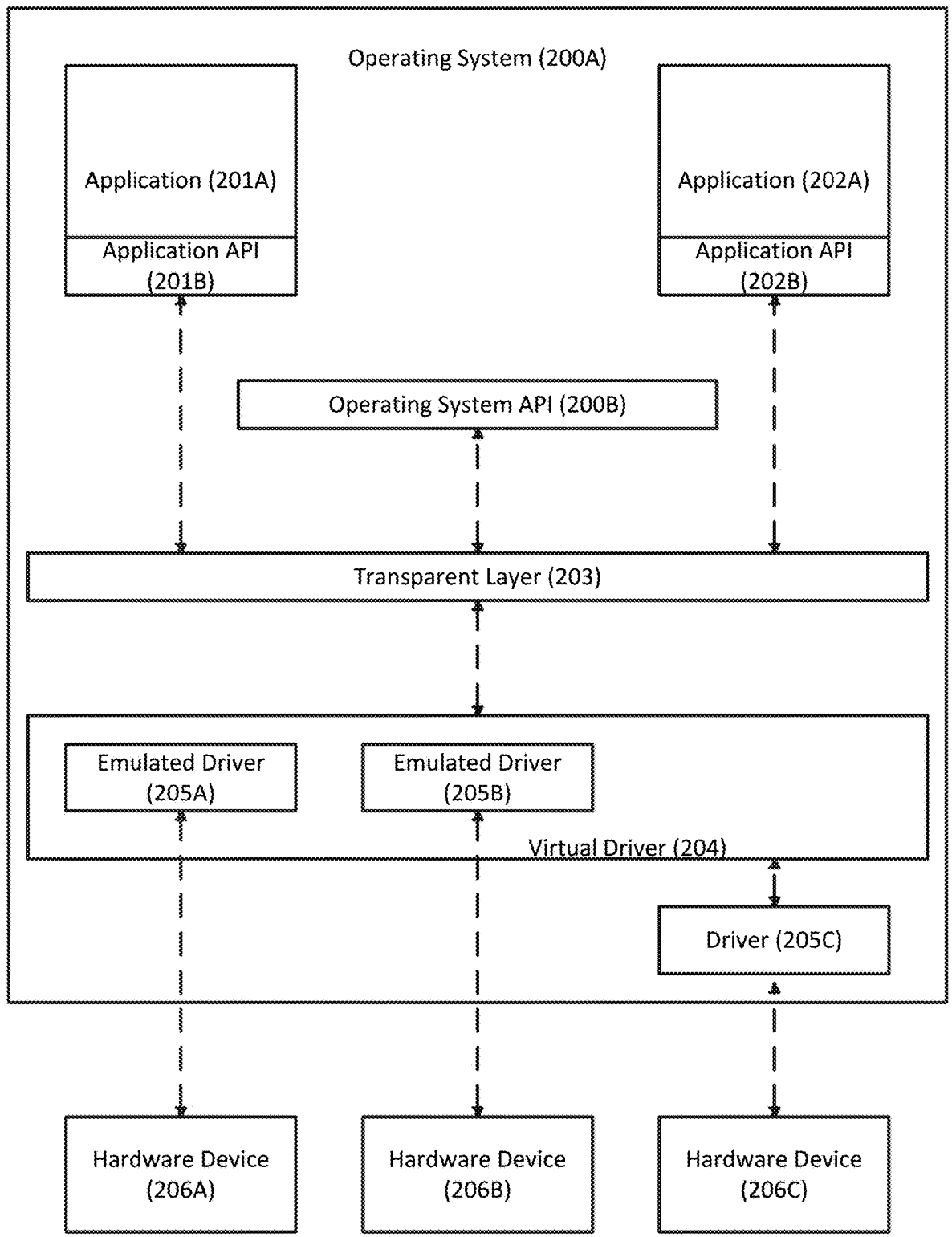
FIG. 2 illustrates the architecture of a system utilizing the universal hardware-software interface according to an exemplary embodiment.

FIG. 2 illustrates the architecture of a system utilizing the universal hardware-software interface according to an exemplary embodiment. As shown in FIG. 2, the operating system 200A includes a transparent layer 203 which communicates a virtual driver 204. As will be explained in greater detail below, the transparent layer 203 is an API configured to interface between a virtual driver and an operating system and/or application(s) executing on the operating system. In this example, the transparent layer 203 interfaces between the virtual driver 204 and API 201B of application 201A, API 202 B of application 202A, and operating system API 200B of operating system 200A.

The transparent layer 203 can be part of a software process running on the operating system and can have its own user interface (UI) elements, including a transparent UI superimposed on an underlying user interface and/or visible UI elements that a user is able to interact with.

The virtual driver 204 is configured to emulate drivers 205A and 205B, which interface with hardware devices 206A and 206B, respectively. The virtual driver can receive user input that instructs the virtual driver on which virtual driver to emulate, for example, in the form of a voice command, a selection made on a user interface, and/or a gesture made by the user in front of a coupled web camera. For example, each of the connected hardware devices can operate in a "listening" mode and each of the emulated drivers in the virtual driver 204 can be configured to detect an initialization signal which serves as a signal to the virtual driver to switch to a particular emulation mode. For example, a user stating "start voice commands" can activate the driver corresponding to a microphone to receive a new voice command. Similarly, a user giving a certain gesture can activate the driver corresponding to a web camera to receive gesture input or touch input.

The virtual driver can also be configured to interface with a native driver, such as native driver 205C, which itself communicates with hardware device 206C. In one example, hardware device 206C can be a standard input device, such as a keyboard or a mouse, which is natively supported by the operating system.

The system shown in FIG. 2 allows for implementation of a universal hardware-software interface in which users can utilize any coupled hardware device in a variety of contexts, such as a particular application or the operating system, without requiring the application or operating system to be customized to interface with the hardware device.

For example, hardware device 206A can capture information which is then received by the virtual driver 204 emulating driver 205A. The virtual driver 204 can determine a user input based upon the captured information. For example, if the information is a series of images of a user moving their hand, the virtual driver can determine that the user has performed a gesture.

Based upon an identified context (such as a particular application or the operating system), the user input can be converted into a transparent layer command and transmitted to the transparent layer 203 for execution. The transparent layer command can include native commands in the identified context. For example, if the identified context is application 201A, then the native commands would be in a format that is compatible with application API 201B of application 201A. Execution of the transparent layer command can then be configured to cause execution of one or more native commands in the identified context. This is accomplished by the transparent layer 203 interfacing with each of the APIs of the applications executing on the operating system 200A as well as the operating system API 200B. For example, if the native command is an operating system command, such as a command to launch a new program, then the transparent layer 203 can provide that native command to the operating system API 200B for execution.

As shown in FIG. 2, there is bidirectional communication between all of the components shown. This means, for example, that execution of a transparent layer command in the transparent layer 203 can result in transmission of information to the virtual driver 204 and on to one of the connected hardware devices. For example, after a voice command is recognized as input, converted to a transparent layer command including a native command, and executed by the transparent layer (resulting in execution of the native command in the identified context), a signal can be sent from the transparent layer to a speaker (via the virtual driver) to transmit the sound output "command received."

Of course, the architecture shown in FIG. 2 is for the purpose of explanation only, and it is understood that the number of applications executing, number and type of connected hardware devices, number of drivers, and emulated drivers can vary.

Figure 3:
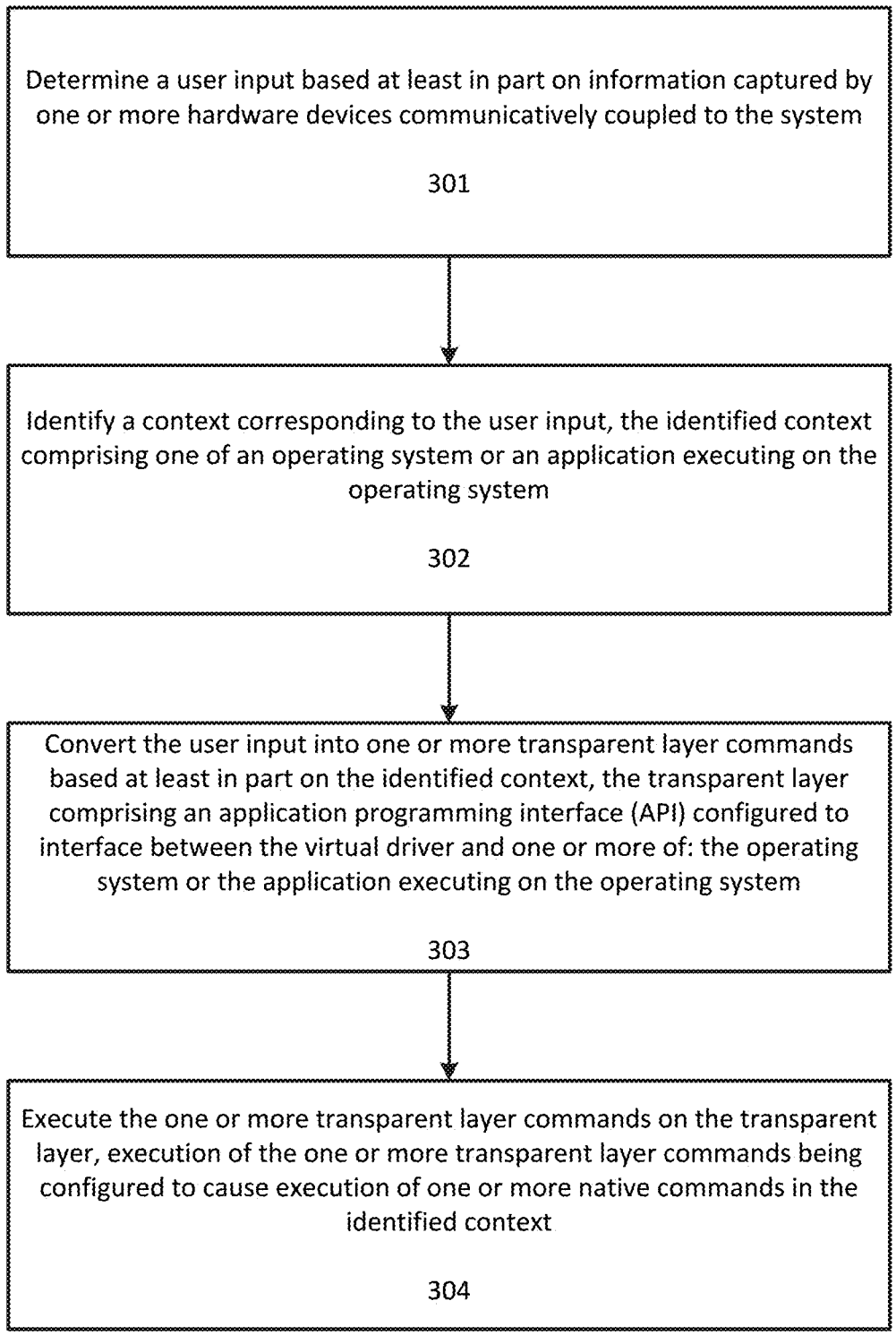
FIG. 3 illustrates a flowchart for implementation of a universal hardware-software interface according to an exemplary embodiment.

FIG. 3 illustrates a flowchart for implementation of a universal hardware-software interface according to an exemplary embodiment.

At step 301 a user input is determined based at least in part on information captured by one or more hardware devices communicatively coupled to the system. The system, as used herein, can refer to one or more computing devices executing the steps of the method, an apparatus comprising one or more processors and one or more memories executing the steps of the method, or any other computing system.

The user input can be determined by a virtual driver executing on the system. As discussed earlier, virtual driver can be operating in an emulation mode in which it is emulating other hardware drivers and thereby receiving the captured information from a hardware device or can optionally receive the captured information from one or more other hardware drivers which are configured to interface with a particular hardware device.

A variety of hardware devices can be utilized, such as a camera, a video camera, a microphone, a headset having bidirectional communication, a mouse, a touchpad, a trackpad, a controller, a game pad, a joystick, a touch screen, a motion capture device including accelerometers and/or a tilt sensors, a remote, a stylus, or any combination of these devices. Of course, this list of hardware devices is provided by way of example only, and any hardware device which can be utilized to detect voice, image, video, or touch information can be utilized.

The communicative coupling between the hardware devices and the system can take a variety of forms. For example, the hardware device can communicate with the system via a wireless network, Bluetooth protocol, radio frequency, infrared signals, and/or by a physical connection such as a Universal Serial Bus (USB) connection. The communication can also include both wireless and wired communications. For example, a hardware device can include two components, one of which wirelessly (such as over Bluetooth) transmits signals to a second component which itself connects to the system via a wired connection (such as USB). A variety of communication techniques can be utilized in accordance with the system described herein, and these examples are not intended to be limiting.

The information captured by the one or more hardware devices can be any type of information, such as image information including one or more images, frames of a video, sound information, and/or touch information. The captured information can be in any suitable format, such as .wav or .mp3 files for sound information, .jpeg files for images, numerical coordinates for touch information, etc.

The techniques described herein can allow for any display device to function effectively as a "touch" screen device in any context, even if the display device does not include any hardware to detect touch signals or touch-based gestures. This is described in greater detail below and can be accomplished through analysis of images captured by a camera or a video camera.

Figure 4:
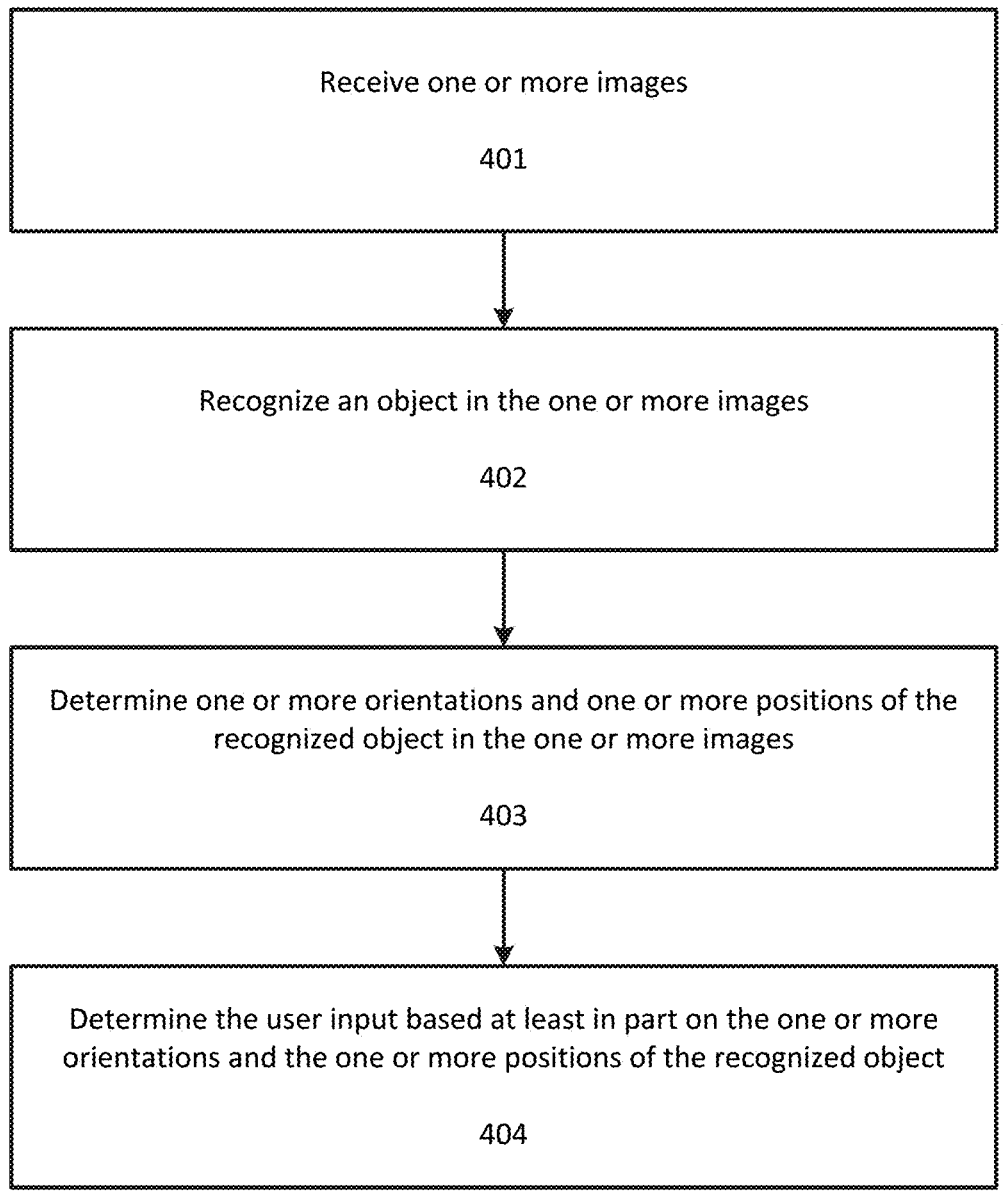
FIG. 4 illustrates a flowchart for determining a user input based at least in part on information captured by one or more hardware devices communicatively coupled to the system when the information captured by the one or more hardware devices comprises one or more images according to an exemplary embodiment.

FIG. 4 illustrates a flowchart for determining a user input based at least in part on information captured by one or more hardware devices communicatively coupled to the system when the information captured by the one or more hardware devices comprises one or more images.

At step 401 one or more images are received. These images can be captured by a hardware device such as a camera or video camera and can be received by the virtual driver, as discussed earlier.

At step 402 an object in the one or more images is recognized. The object can be, for example, a hand, finger, or other body part of a user. The object can also be a special purpose device, such as a stylus or pen, or a special-purpose hardware device, such as a motion tracking stylus/remote which is communicatively coupled to the system and which contains accelerometers and/or tilt sensors. The object recognition can be performed by the virtual driver can be based upon earlier training, such as through a calibration routine run using the object.

Figure 5A:
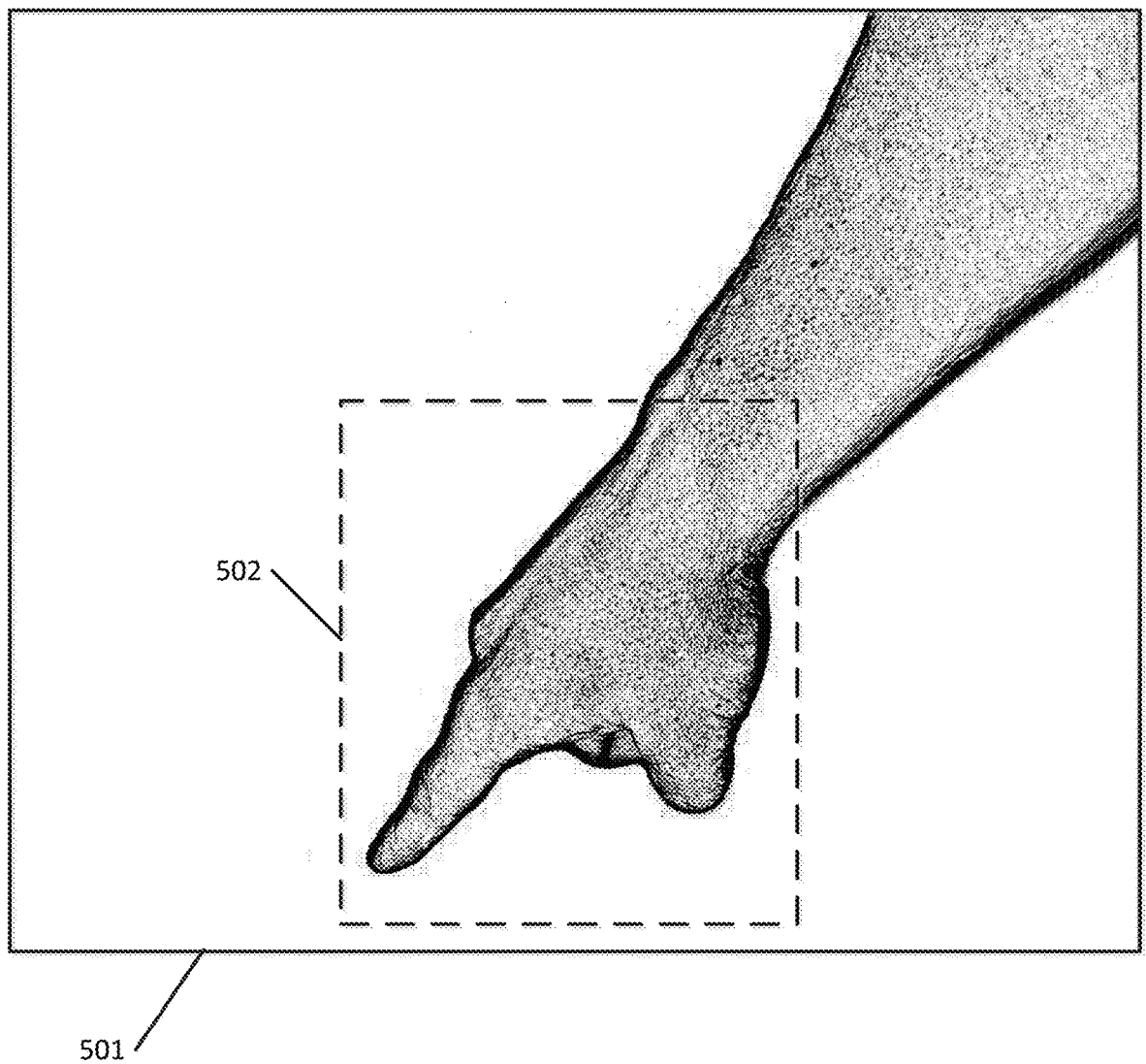
FIG. 5A illustrates an example of object recognition according to an exemplary embodiment.

FIG. 5A illustrates an example of object recognition according to an exemplary embodiment. As shown in FIG. 5A, image 501 includes a hand of the user that has been recognized as object 502. The recognition algorithm could of course be configured to recognize a different object, such as a finger.

Returning to FIG. 4, at step 403 one or more orientations and one or more positions of the recognized object are determined. This can be accomplished in a variety of ways. If the object is not a hardware device and is instead a body part, such as a hand or finger, the object can be mapped in a three-dimensional coordinate system using a known location of the camera as a reference point to determine the three dimensional coordinates of the object and the various angles relative to the X, Y, and Z axes. If the object is a hardware device and includes motion tracking hardware such as an accelerometer and/or tilt sensors, then the image information can be used in conjunction with the information indicated by the accelerometer and/or tilt sensors to determine the positions and orientations of the object.

At step 404 the user input is determined based at least in part on the one or more orientations and the one or more positions of the recognized object. This can include determining location coordinates on a transparent user interface (UI) of the transparent layer based at least in part the on the one or more orientations and the one or more positions. The transparent UI is part of the transparent layer and is superimposed on an underlying UI corresponding to the operating system and/or any applications executing on the operating system.

Figure 5B:
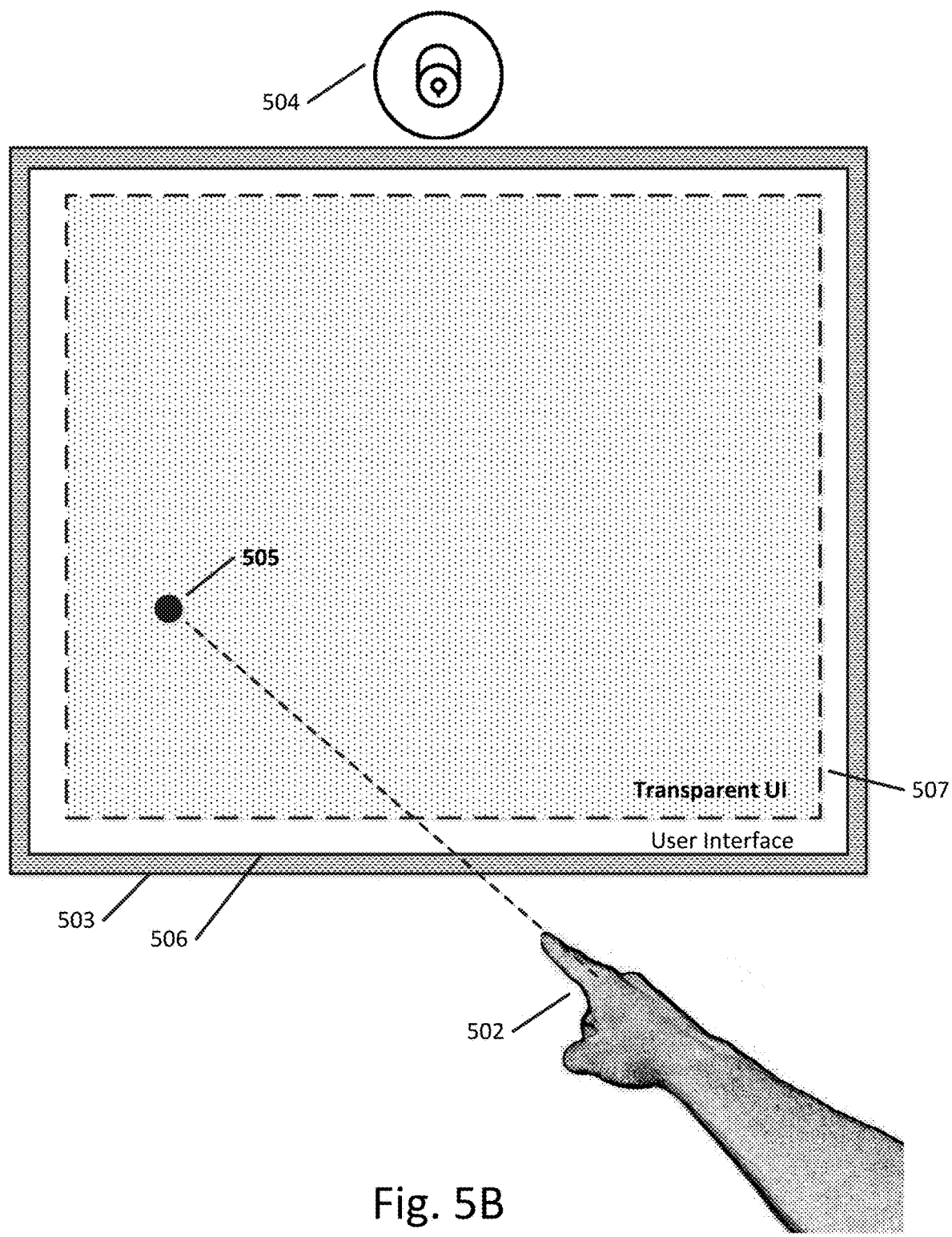
FIG. 5B illustrates an example of determining input location coordinates according to an exemplary embodiment.

FIG. 5B illustrates an example of this step when the object is a user's finger. As shown in FIG. 5B, display device 503 includes an underlying UI 506 and a transparent UI 507 superimposed over the underlying UI 506. For the purpose of clarity, the transparent UI 507 is shown with dot shading, but it is understood that in practice the transparent UI is a transparent layer that is not visible to the user. Additionally, the transparent UI 507 is shown as slightly smaller than the underlying UI 506 but it is understood that in practice the transparent UI would cover the same screen area as the underlying UI.

As shown in FIG. 5B, the position and orientation information of the object (the user's finger) is used to project a line onto the plane of the display device 503 and determine an intersection point 505. The image information captured by camera 504 and the known position of the display device 503 under the camera can be used to aid in this projection. As shown in FIG. 5B, the user input is determined to be input coordinates at the intersection point 505.

As will be discussed further below, the actual transparent layer command that is generated based on this input can be based upon user settings and/or an identified context. For example, the command can be a touch command indicating that an object at the coordinates of point 505 should be selected and/or opened. The command can also be a pointing command indicating that a pointer (such as a mouse pointer) should be moved to the coordinates of point 505. Additionally, the command can be an edit command which modifies the graphical output at the location (such as to annotate the interface or draw an element).

While FIG. 5B shows the recognized object 502 as being at some distance from the display device 503, a touch input can be detected regardless of the distance. For example, if the user were to physically touch the display device 503, the technique described above would still determine the input coordinates. In that case, the projection line between object 502 and the intersection point would just be shorter.

Of course, touch inputs are not the only type of user input that can be determined from captured images. The step of determining a user input based at least in part on the one or more orientations and the one or more positions of the recognized object can include determining gesture input. In particular, the positions and orientations of a recognized object across multiple images could be analyzed to determine a corresponding gesture, such as a swipe gesture, a pinch gesture, and/or any known or customized gesture. The user can calibrate the virtual driver to recognize custom gestures that are mapped to specific contexts and commands within those contexts. For example, the user can create a custom gesture that is mapped to an operating system context and results in the execution of a native operating system command which launches a particular application.

Figure 6:
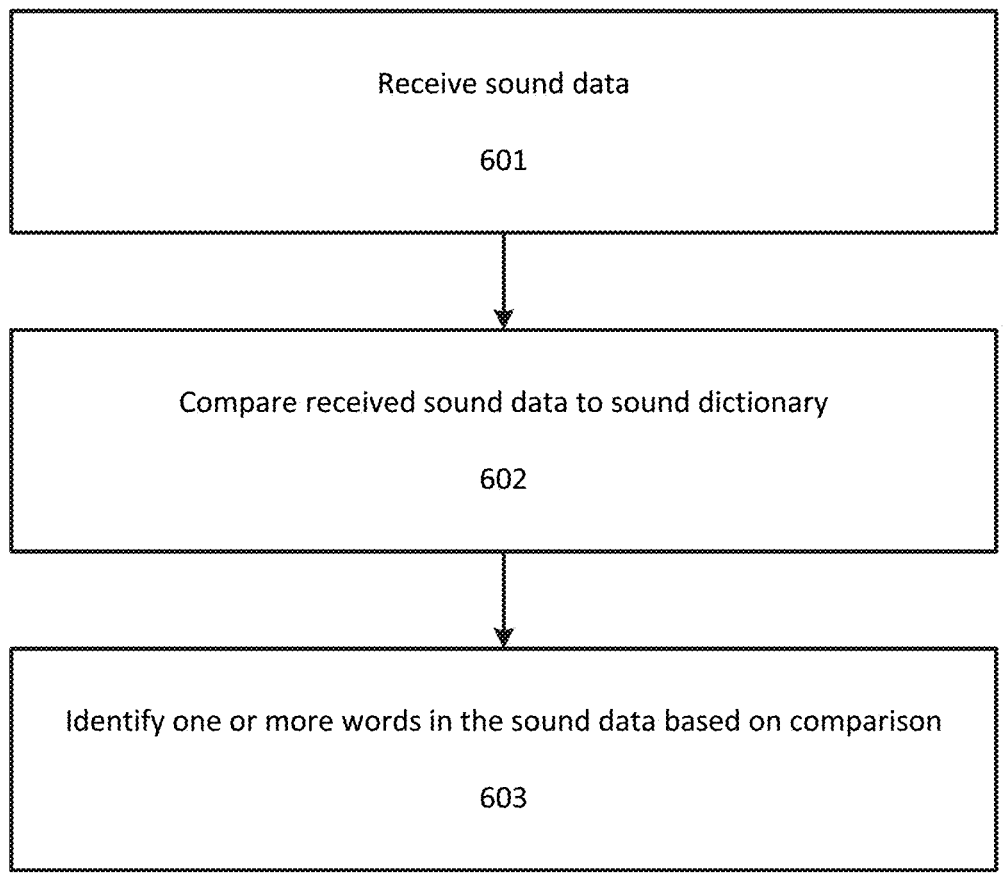
FIG. 6 illustrates a flowchart for determining a user input based at least in part on information captured by one or more hardware devices communicatively coupled to the system when the captured information is sound information according to an exemplary embodiment.

As discussed earlier, the information captured by the one or more hardware devices in step 301 of FIG. 3 can also include sound information captured by a microphone. FIG. 6 illustrates a flowchart for determining a user input based at least in part on information captured by one or more hardware devices communicatively coupled to the system when the captured information is sound information. As discussed below, voice recognition is performed on the sound information to identify one or more words corresponding to the user input.

At step 601 the sound data is received. The sound data can be captured by a hardware device such as a microphone and received by the virtual driver, as discussed above. At step 602 the received sound data can be compared to a sound dictionary. The sound dictionary can include sound signatures of one or more recognized words, such as command words or command modifiers. At step 603 one or more words in the sound data are identified as the user input based on the comparison. The identified one or more words can then be converted into transparent layer commands and passed to the transparent layer.

As discussed earlier, the driver emulated by the virtual driver, the expected type of user input, and the command generated based upon the user input can all be determined based at least in part on one or more settings or prior user inputs.

Figure 7:
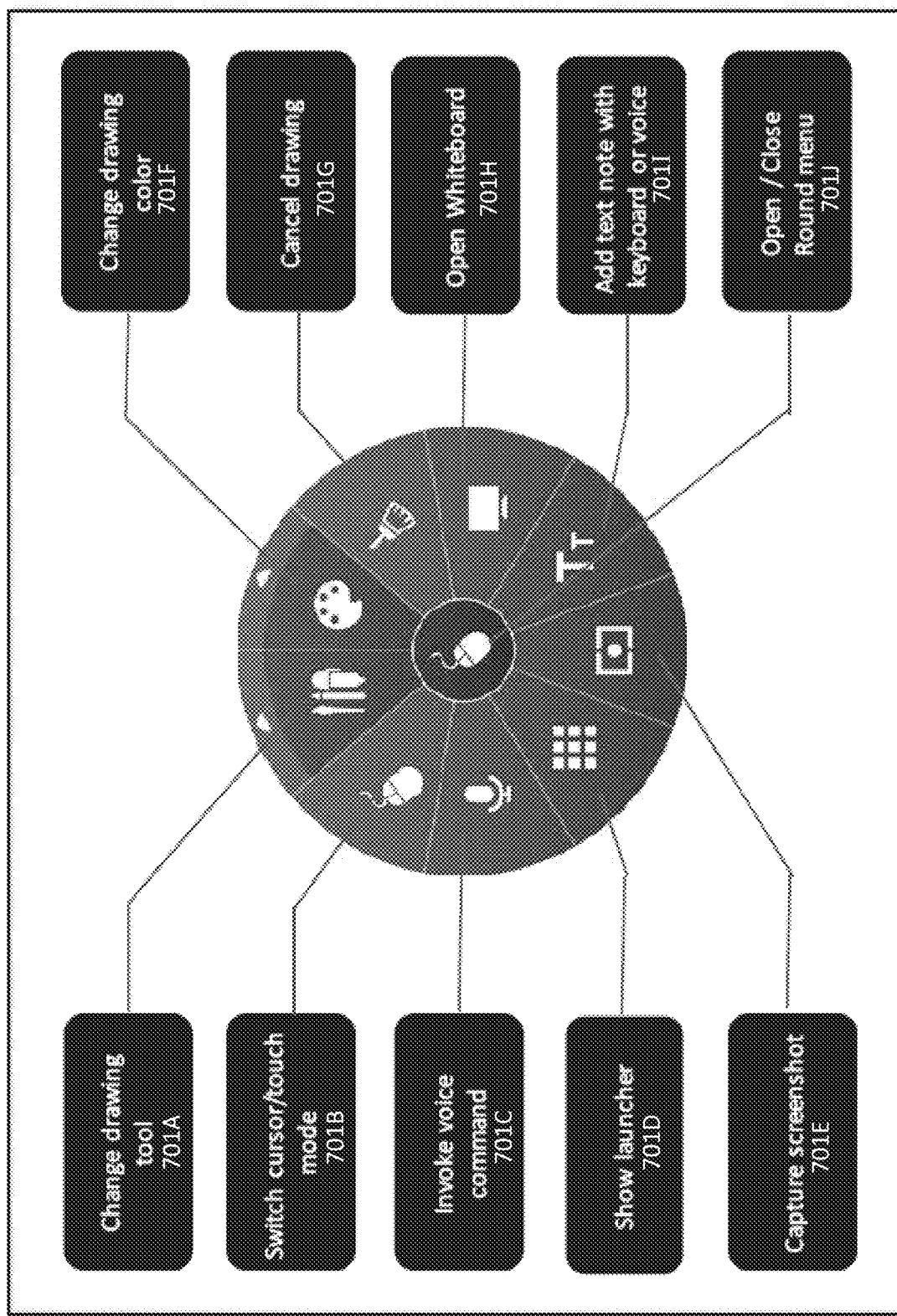
FIG. 7 illustrates a tool interface that can be part of the transparent layer according to an exemplary embodiment.

FIG. 7 illustrates a tool interface 701 that can also be part of the transparent layer. Unlike the transparent UI, the tool interface 701 is visible to the user and can be used to select between different options which alter the emulation mode of the virtual driver, the native commands generated based on user input, or perform additional functions.

Button 701A allows a user to select the type of drawing tool used to graphically modify the user interface when the user input is input coordinates (such as coordinates based upon a user touching the screening with their hand or a stylus/remote). The various drawing tools can include different brushes, colors, pens, highlighters, etc. These tools can result in graphical alterations of varying styles, thicknesses, colors, etc.

Button 701B allows the user to switch between selection, pointing, or drawing modes when input coordinates are received as user input. In a selection mode, the input coordinates can be processed as a "touch" and result in selection or opening of an object at the input coordinates. In pointing mode the coordinates can be processed as a pointer (such as a mouse pointer) position, effectively allowing the user to emulate a mouse. In drawing mode, the coordinates can be processed as a location at which to alter the graphical output of the user interface to present the appearance of drawing or writing on the user interface. The nature of the alteration can depend on a selected drawing tool, as discussed with reference to button 701A. Button 701B can also alert the virtual driver to expect image input and/or motion input (if a motion tracking device is used) and to emulate the appropriate drivers accordingly.

Button 701C alerts the virtual driver to expect a voice command. This can cause the virtual driver to emulate drivers corresponding to a coupled microphone to receive voice input and to parse the voice input as described with respect to FIG. 6.

Button 701D opens a launcher application which can be part of the transparent layer and can be used to launch applications within the operating system or to launch specific commands within an application. Launcher can also be used to customize options in the transparent layer, such as custom voice commands, custom gestures, custom native commands for applications associated with user input and/or to calibrate hardware devices and user input (such as voice calibration, motion capture device calibration, and/or object recognition calibration).

Button 701E can be used to capture a screenshot of the user interface and to export the screenshot as an image. This can be used in conjunction with the drawing mode of button 701B and the drawing tools of 701A. After a user has marked up a particular user interface, the marked up version can be exported as an image.

Button 701F also allows for graphical editing and can be used to change the color of a drawing or aspects of a drawing that the user is creating on the user interface. Similar to the draw mode of button 701B, this button alters the nature of a graphical alteration at input coordinates.

Button 701G cancels a drawing on the user interface. Selection of this button can remove all graphical markings on the user interface and reset the underlying UI to the state it was in prior to the user creating a drawing.

Button 701H can be used to launch a whiteboard application that allows a user to create a drawing or write using draw mode on a virtual whiteboard.

Button 701I can be used to add textual notes to objects, such as objects shown in the operating system UI or an application UI. The textual notes can be interpreted from voice signals or typed by the user using a keyboard.

Button 701J can be used to open or close the tool interface 701. When closed, the tool interface can be minimized or removed entirely from the underlying user interface.

Figure 8:
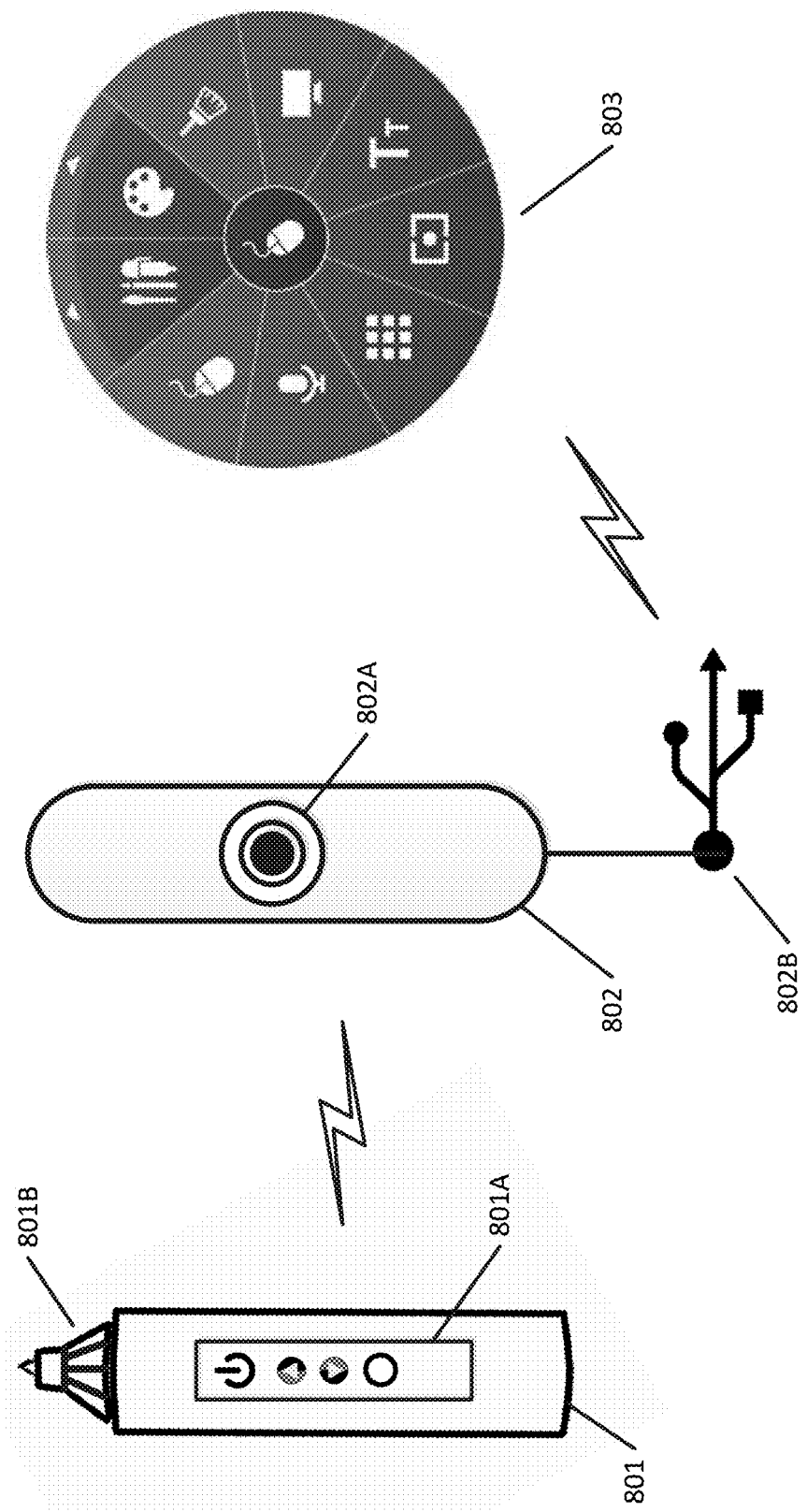
FIG. 8 illustrates an example of a stylus that can be part of the system according to an exemplary embodiment.

As discussed earlier, a stylus or remote hardware device can be used with the present system, in conjunction with other hardware devices, such as a camera or video camera. FIG. 8 illustrates an example of a stylus 801 that can be used with the system. The stylus 801 can communicate with a hardware receiver 802, such as over Bluetooth. The hardware receiver can connect to computer system, such as via USB 802B and the signals from the stylus passed to computer system via hardware receiver can be used to control and interact with menu 803, which is similar to the tool interface shown in FIG. 7.

As shown in FIG. 8, the stylus 801 can include physical buttons 801A. These physical buttons 801 can be used to power the stylus on, navigate the menu 803, and make selections. Additionally, the stylus 801 can include a distinctive tip 801B which is captured in images by a camera and recognized by the virtual driver. This can allow the stylus 801 to be used for drawing and editing when in draw mode. The stylus 801 can also include motion tracking hardware, such an accelerometer and/or tilt sensors to aid in position detection when the stylus is used to provide input coordinates or gestures. Additionally, the hardware receiver 802 can include a calibration button 802A, which when depressed, can launch a calibration utility in the user interface. This allows for calibration of the stylus.

Returning to FIG. 3, at step 302 a context is identified corresponding to the user input. The identified context comprises one of an operating system or an application executing on the operating system.

Figure 9:
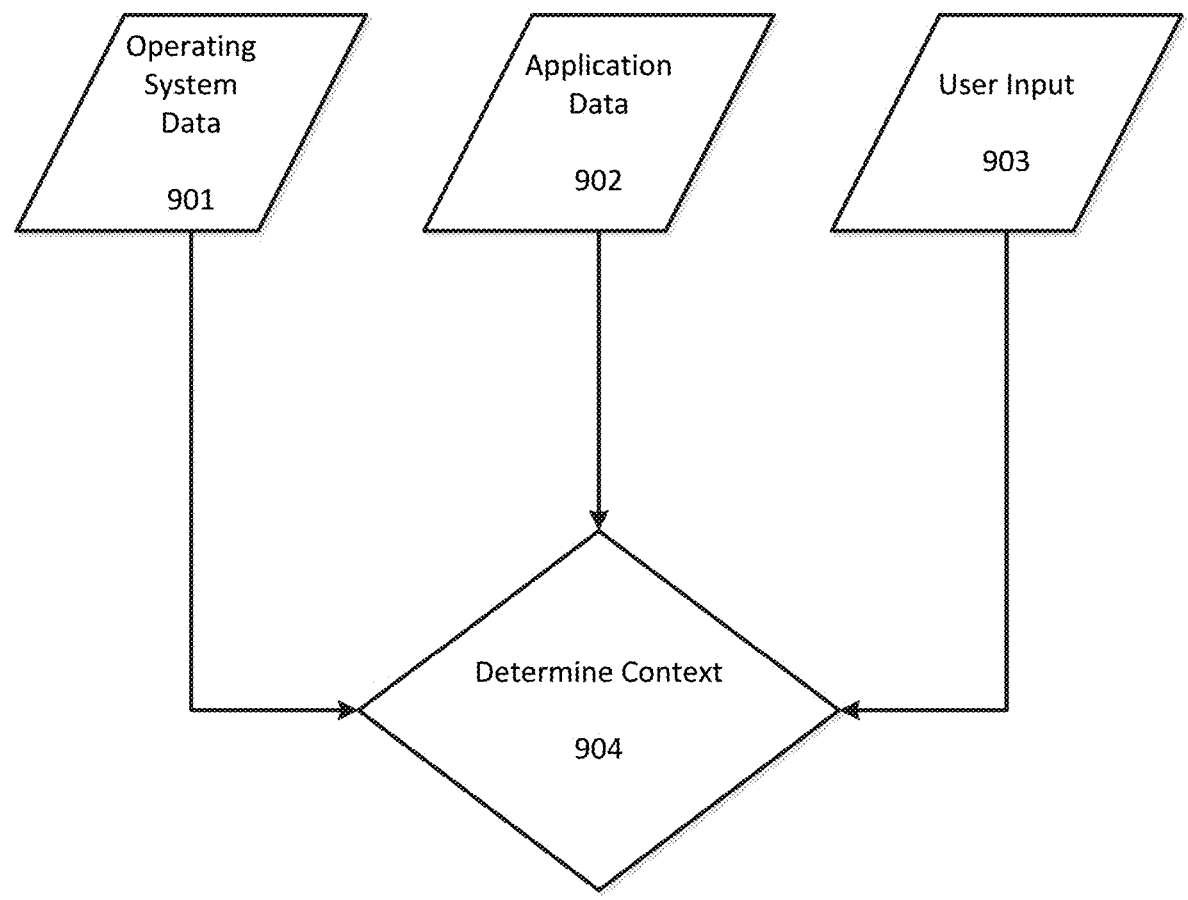
FIG. 9 illustrates a flowchart for identifying a context corresponding to the user input according to an exemplary embodiment.

FIG. 9 illustrates a flowchart for identifying a context corresponding to the user input according to an exemplary embodiment. As shown in FIG. 9, operating system data 901, application data 902, and user input data 903 can all be used to determine a context 904.

Operating system data 901 can include, for example, information regarding an active window in the operating system. For example, if the active window is a calculator window, then the context can be determined to be a calculator application. Similarly, if the active window is a Microsoft Word window, then the context can be determined to be the Microsoft Word application. On the other hand, if the active window is a file folder, then the active context can be determined to be the operating system. Operating system data can also include additional information such as which applications are currently executing, a last launched application, and any other operating system information that can be used to determine context.

Application data 902 can include, for example, information about one or more applications that are executing and/or information mapping particular applications to certain types of user input. For example, a first application may be mapped to voice input so that whenever a voice command is received, the context is automatically determined to be the first application. In another example, a particular gesture can be associated with a second application, so that when that gesture is received as input, the second application is launched or closed or some action within the second application is performed.

User input 903 can also be used to determine the context in a variety of ways. As discussed above, certain types of user input can be mapped to certain applications. In the above example, voice input is associated with a context of a first application. Additionally, the attributes of the user input can also be used to determine a context. Gestures or motions can be mapped to applications or to the operating system. Specific words in voice commands can also be mapped to applications or to the operating system. Input coordinates can also be used to determine a context. For example, a window in the user interface at the position of the input coordinates can be determined and an application corresponding to that window can be determined as the context.

Figure 10:
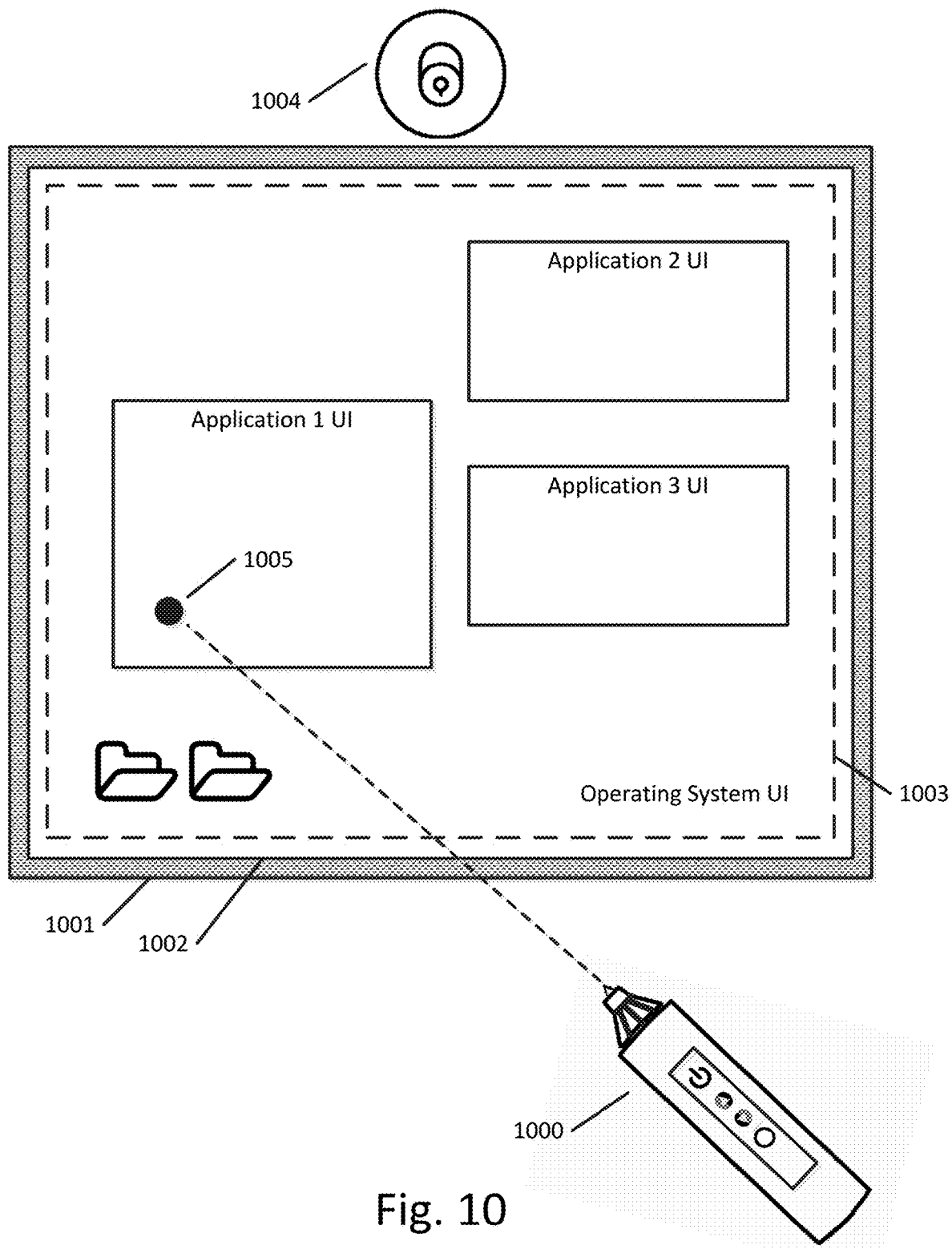
FIG. 10 illustrates an example of using the input coordinates to determine a context according to an exemplary embodiment.

FIG. 10 illustrates an example of using the input coordinates to determine a context. As shown in FIG. 10, the display device 1001 is displaying a user interface 1002. Also shown is a camera 1004 and transparent layer 1003 superimposed over underlying user interface 1003. A user utilizes a stylus 1000 to point to location 1005 in user interface 1002. Since location 1005 lies within an application window corresponding to Application 1, then Application 1 can be determined to be the context for the user input, as opposed to Application 2, Application 3, or the Operating System.

Returning to FIG. 3, at step 303 the user input is converted into one or more transparent layer commands based at least in part on the identified context. As discussed earlier, the transparent layer comprises an application programming interface (API) configured to interface between the virtual driver and the operating system and/or an application executing on the operating system.

Figure 11:
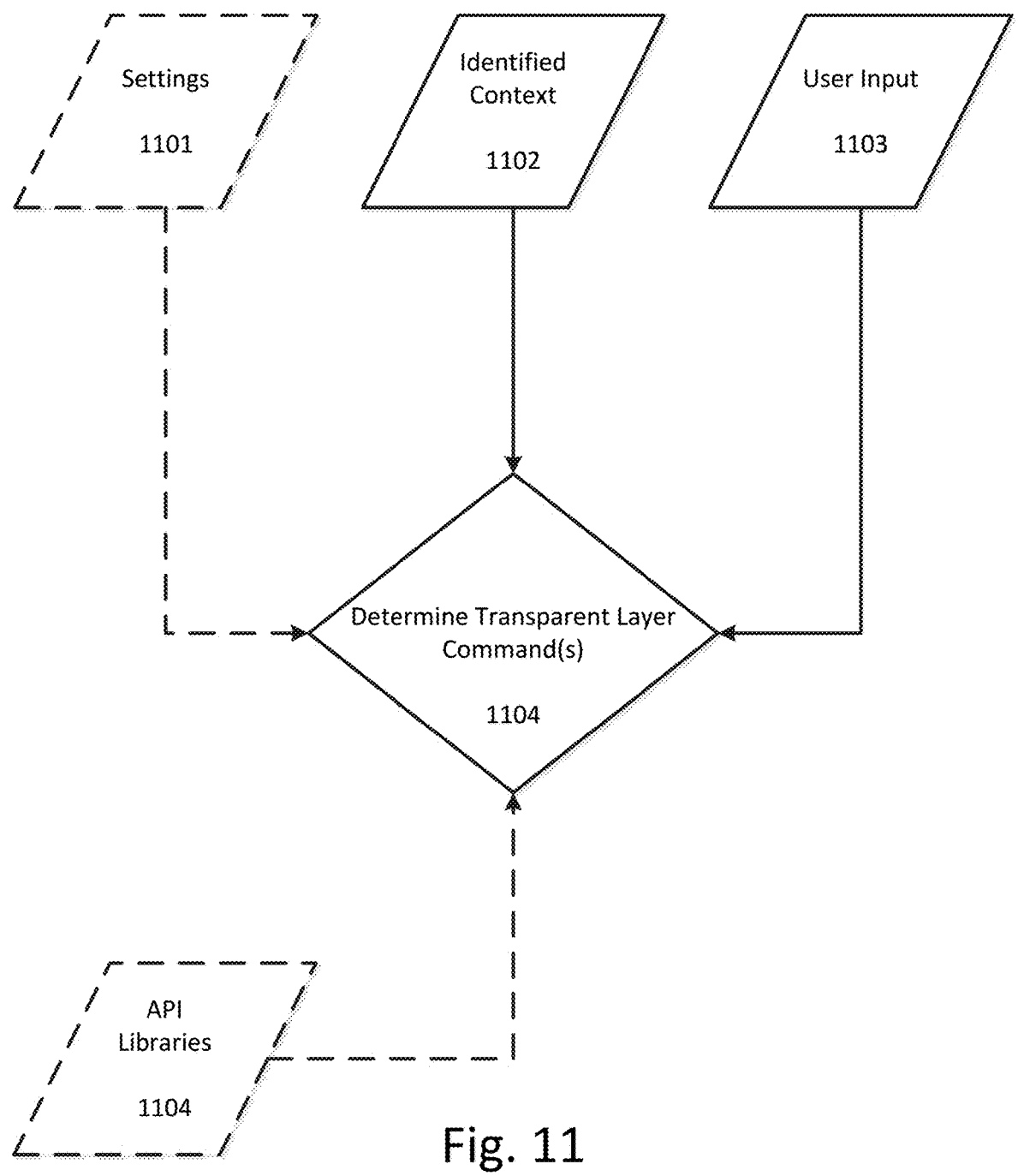
FIG. 11 illustrates a flowchart for converting user input into transparent layer commands according to an exemplary embodiment.

FIG. 11 illustrates a flowchart for converting user input into transparent layer commands. As shown at step 1104 of FIG. 11, the transparent layer command can be determined based at least in part on the identified context 1102 and the user input 1103. The transparent layer command can include one or more native commands configured to execute in one or more corresponding contexts. The transparent layer command can also include response outputs to be transmitted to the virtual driver and on to hardware device(s).

The identified context 1102 can be used to determine which transparent layer command should be mapped to the user input. For example, if the identified context is "operating system," then a swipe gesture input can be mapped to a transparent layer command that results in the user interface scrolling through currently open windows within the operating system (by minimizing one open window and maximize a next open window). Alternatively, if the identified context is "web browser application," then the same swipe gesture input can be mapped to a transparent layer command that results in a web page being scrolled.

The user input 1103 also determines the transparent layer command since user inputs are specifically mapped to certain native commands within one or more contexts and these native commands are part of the transparent layer command. For example, a voice command "Open email" can be mapped to a specific operating system native command to launch the email application Outlook. When voice input is received that includes the recognized words "Open email," this results in a transparent layer command being determined which includes the native command to launch Outlook.

As shown in FIG. 11, transparent layer commands can also be determined based upon one or more user settings 1101 and API libraries 1104. API libraries 1104 can be used to lookup native commands corresponding to an identified context and particular user input. In the example of the swipe gesture and a web browser application context, the API library corresponding to the web browser application can be queried for the appropriate API calls to cause scrolling of a web page. Alternatively, the API libraries 1104 can be omitted and native commands can be mapped directed to a particular user inputs and identified contexts.

In the situation where the user input is determined to be input coordinates the transparent layer command is determined based at least in part on the input location coordinates and the identified context. In this case, the transparent layer command can include at least one native command in the identified context, the at least one native command being configured to perform an action at the corresponding location coordinates in the underlying UI.

When there is more than one possible action mapped to a particular context and user input, settings 1101 can be used to determine the corresponding transparent layer command. For example, button 701B of FIG. 7 allows user to select between selection, pointing, or draw modes when input coordinates are received as user input. This setting can be used to determine the transparent layer command, and by extension, which native command is performed and which action is performed. In this case, the possible native commands can include a selection command configured to select an object associated with the corresponding location coordinates in the underlying UI, a pointer command configured to move a pointer to the corresponding location coordinates in the underlying UI, and a graphical command configured to alter the display output at the corresponding location coordinates in the underlying UI.

Figure 12A:
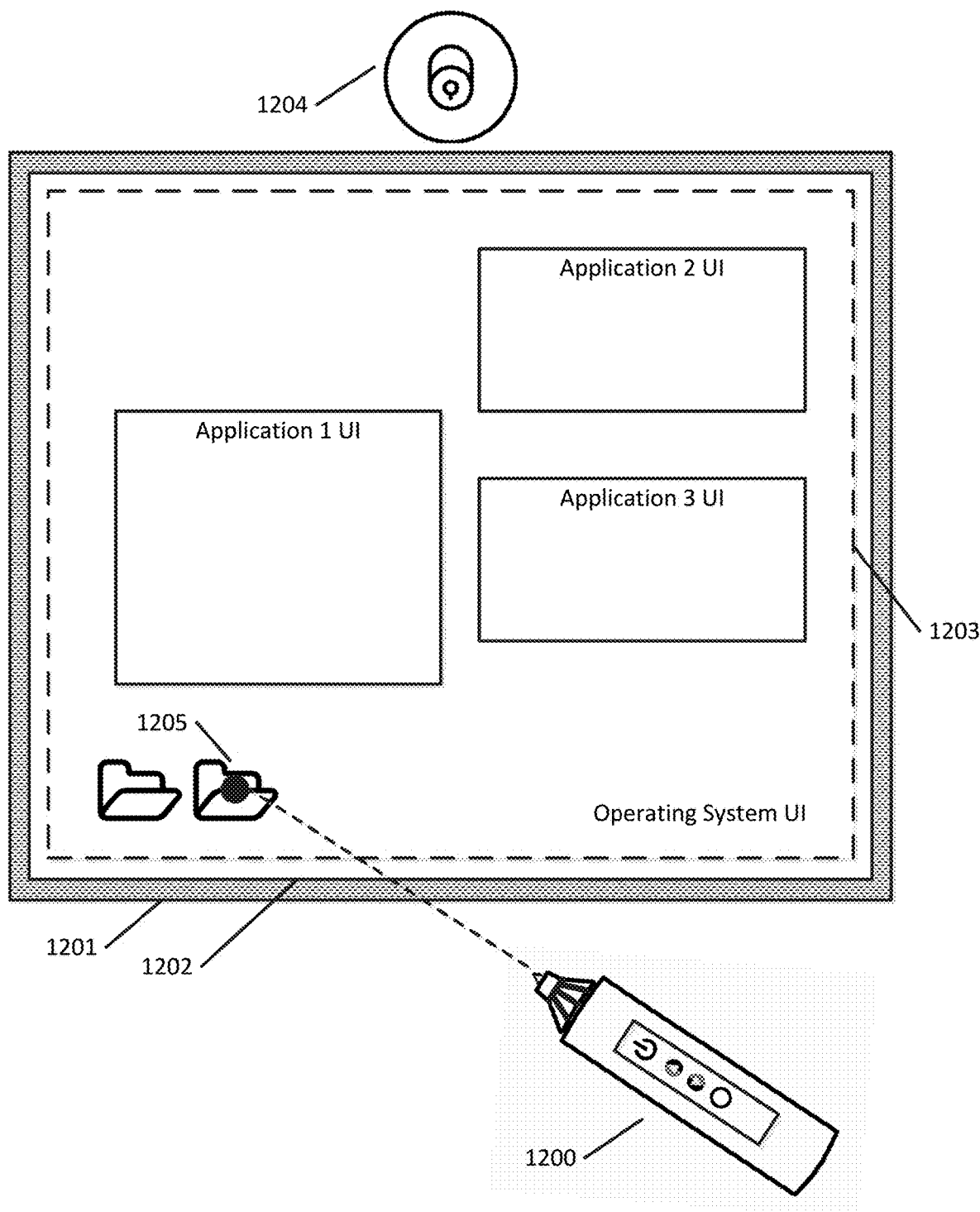
FIG. 12A illustrates an example of receiving input coordinates when the selection mode is toggled according to an exemplary embodiment.

FIG. 12A illustrates an example of receiving input coordinates when the selection mode is toggled. As shown in FIG. 12A, the user has pointed stylus 1200 at operating system UI 1202 (having superimposed transparent UI 1203) on display device 1201. Similar to earlier examples, camera 1204 can be used to determine the position and orientation information for stylus 1200 and the input coordinates. Since the selection mode is toggled and the stylus 1200 is pointed at folder 1205 within the operating system UI 1202, the determined transparent layer command can include a native operating system command to select an object associated with the input coordinates (which in this case is folder 1205). In another example, if a window was located at the input coordinates, this would result in selection of the entire window.

Figure 12B:
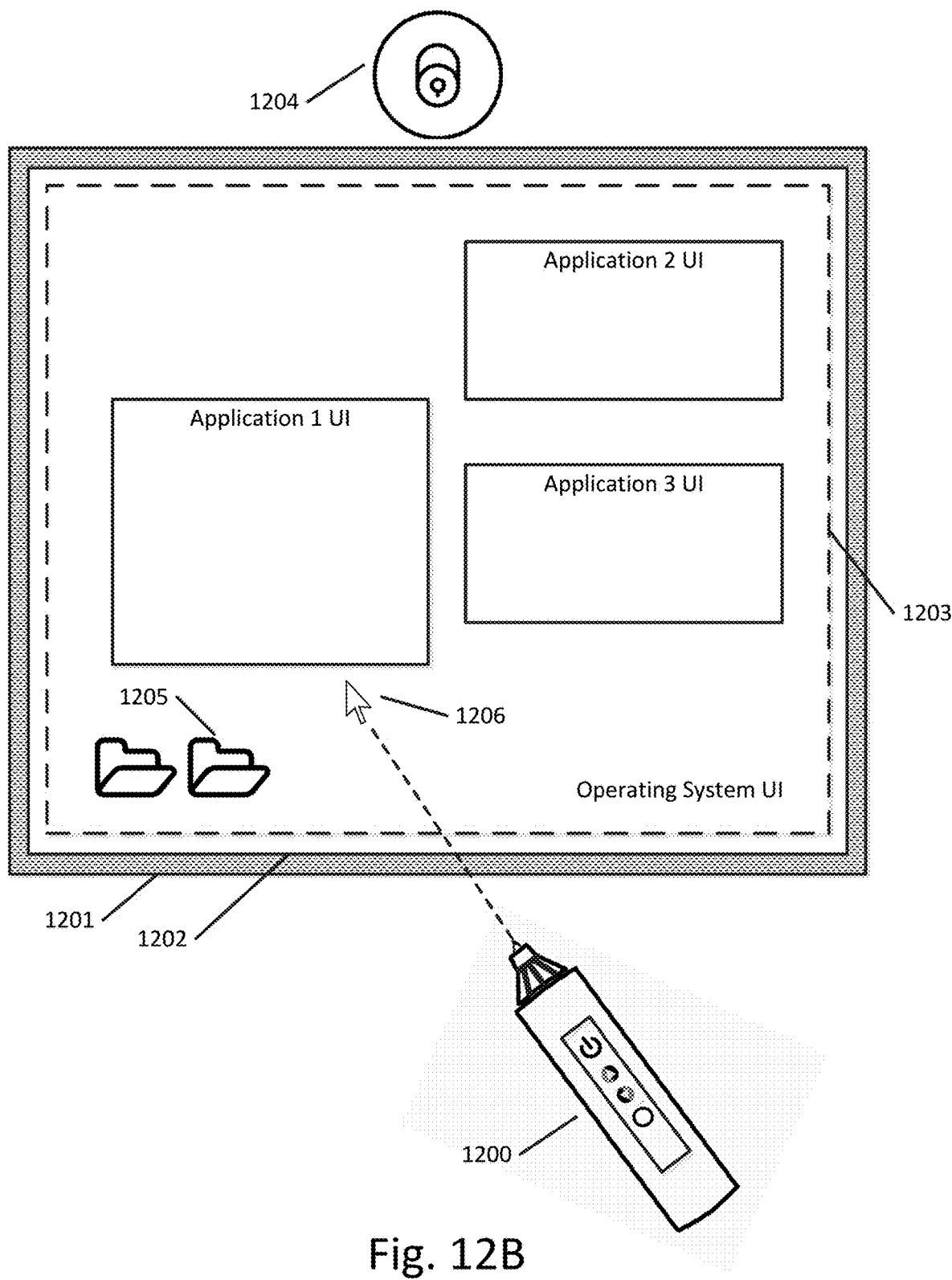
FIG. 12B illustrates an example of receiving input coordinates when the pointing mode is toggled according to an exemplary embodiment.

FIG. 12B illustrates an example of receiving input coordinates when the pointing mode is toggled. In this case, the determined transparent layer command can include a native operating system command to move mouse pointer 1206 to the location of the input coordinates.

Figure 12C:
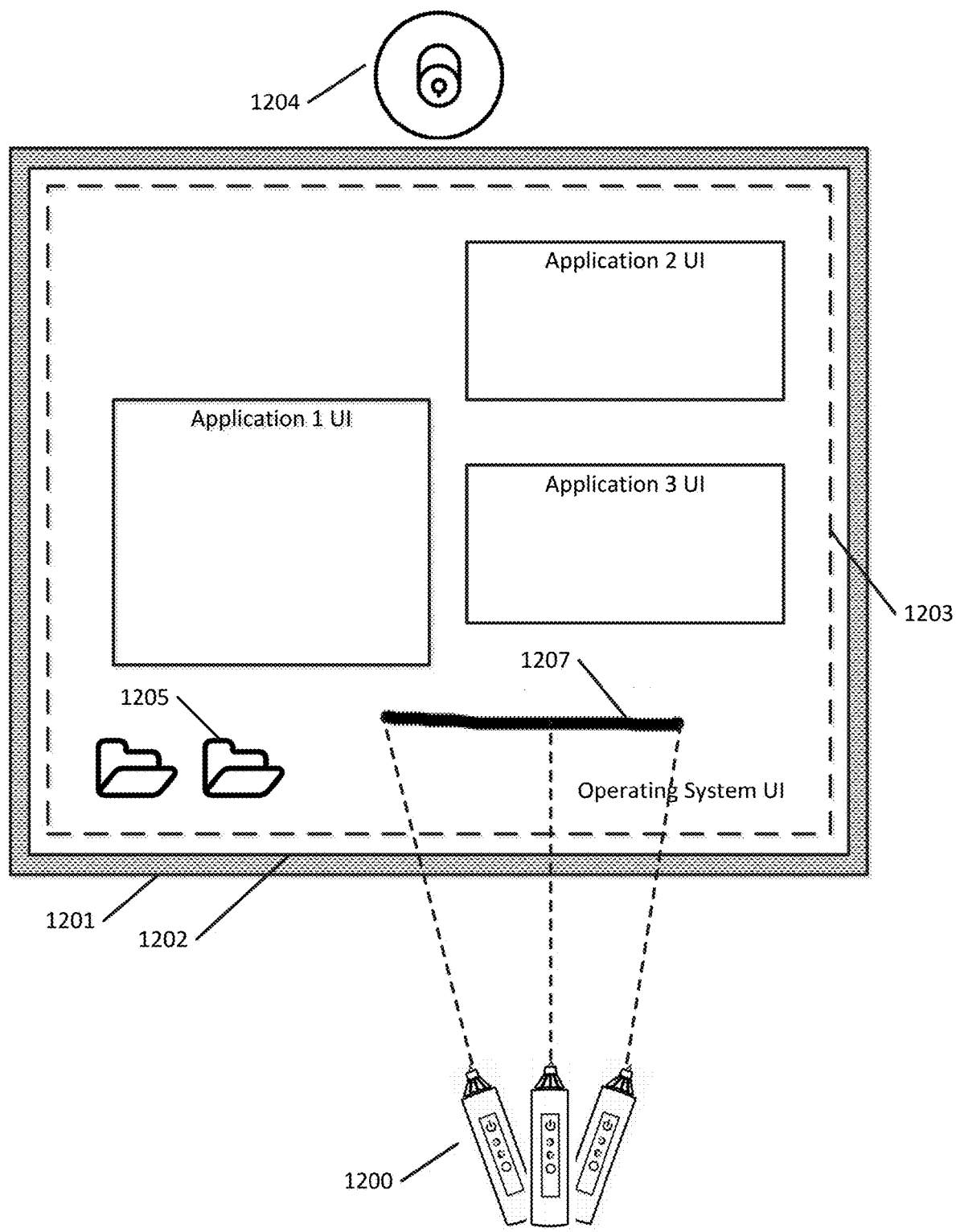
FIG. 12C illustrates an example of receiving input coordinates when the drawing mode is toggled according to an exemplary embodiment.

FIG. 12C illustrates an example of receiving input coordinates when the drawing mode is toggled and the user has swept stylus 1200 over multiple input coordinates. In this case, the determined transparent layer command can include a native operating system command to alter the display output at the locations of each of the input coordinates, resulting in the user drawing line 1207 on the user interface 1202. The modified graphical output produced in drawing mode can be stored as part of the transparent layer 1203, for example, as metadata related to a path of input coordinates. The user can then select an option to export the altered display output as an image.

In the situation wherein the user input is identified as a gesture, converting the user input into one or more transparent layer commands based at least in part on the identified context can include determining a transparent layer command based at least in part on the identified gesture and the identified context. The transparent layer command can include at least one native command in the identified context, the at least one native command being configured to perform an action associated with the identified gesture in the identified context. An example of this is discussed above with respect to a swipe gesture and a web browser application context that results in a native command configured to perform a scrolling action in the web browser.

In the situation wherein the user input is identified as one or more words (such as by using voice recognition), converting the user input into one or more transparent layer commands based at least in part on the identified can include determining a transparent layer command based at least in part on the identified one or more words and the identified context. The transparent layer command can include at least one native command in the identified context, the at least one native command being configured to perform an action associated with the identified one or more words in the identified context.

Figure 13:
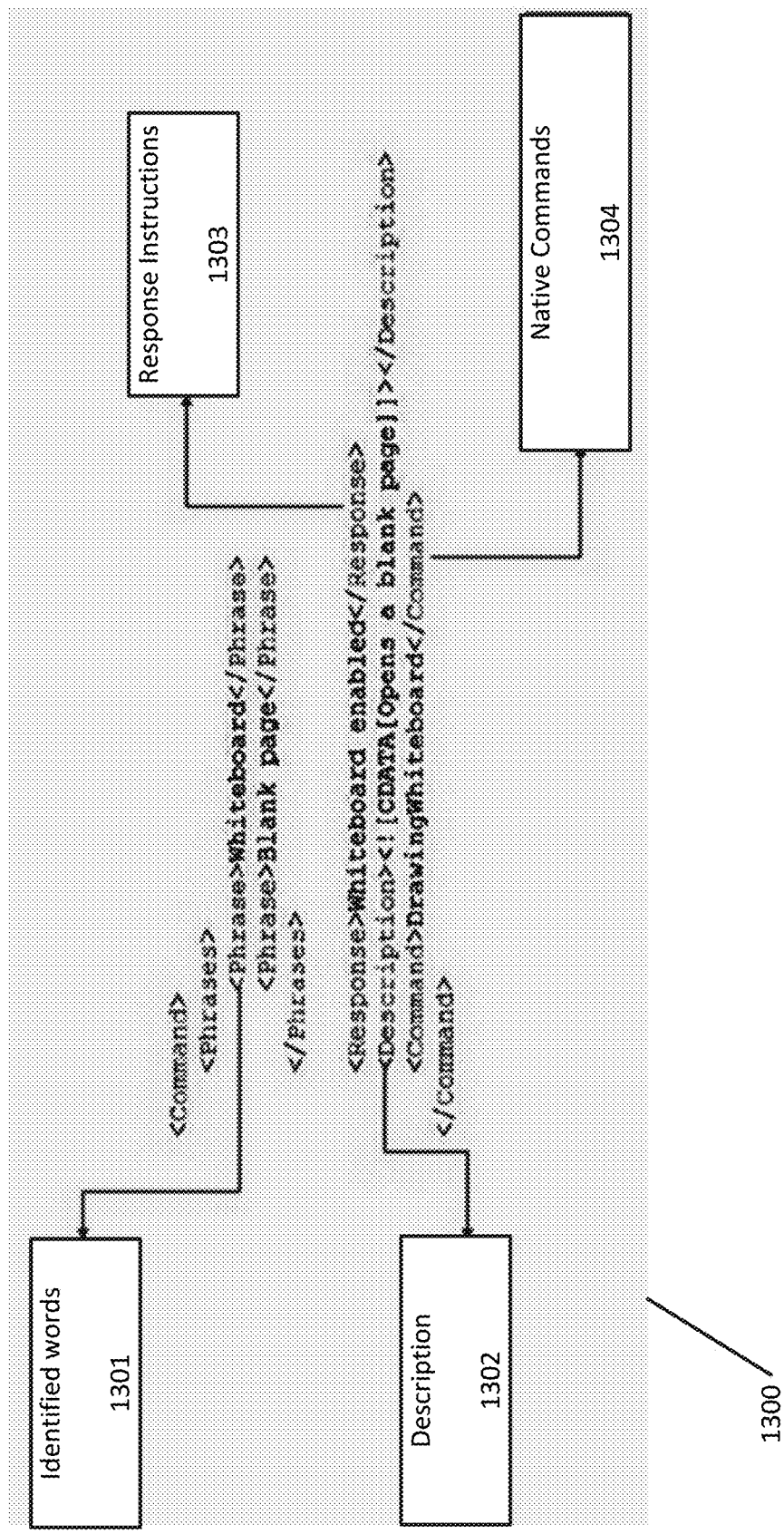
FIG. 13 illustrates an example of a transparent layer command determined based on one or more words identified in input voice data according to an exemplary embodiment.

FIG. 13 illustrates an example of a transparent layer command 1300 determined based on one or more words identified in input voice data. The identified words 1301 include one of the phrases "whiteboard" or "blank page." Transparent layer command 1300 also includes a description 1302 of the command, and response instructions 1303 which are output instructions sent by the transparent layer to the virtual driver and to a hardware output device upon execution of the transparent layer command. Additionally, transparent layer command 1300 includes the actual native command 1304 used to call the white board function.

Figure 14:
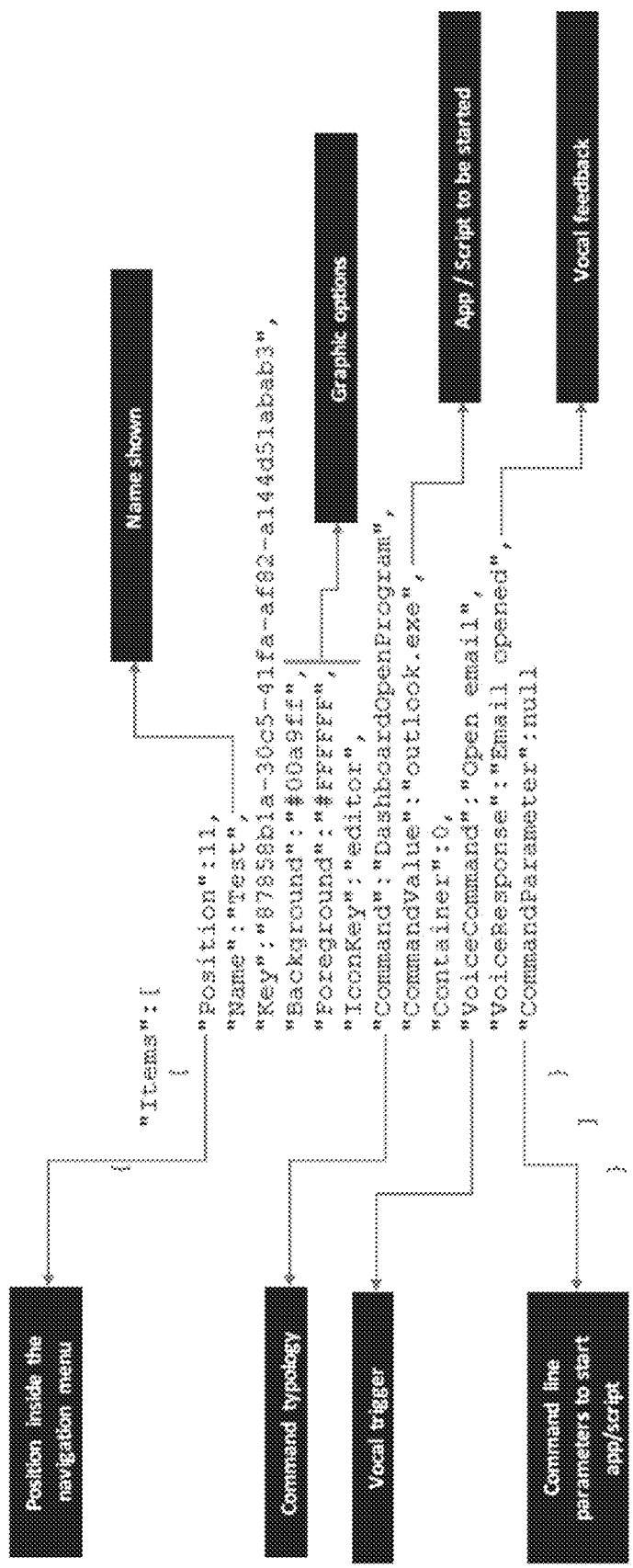
FIG. 14 illustrates another example of a transparent layer command determined based on one or more words identified in input voice data according to an exemplary embodiment.

FIG. 14 illustrates another example of a transparent layer command 1400 determined based on one or more words identified in input voice data according to an exemplary embodiment. In this example, the one or more words are "open email." As shown in FIG. 14, the transparent layer command 1400 includes the native command "outlook.exe," which is an instruction to run a specific executable file that launches the outlook application. Transparent layer command 1400 also includes a voice response "email opened" which will be output in response to receiving the voice command.

Returning to FIG. 3, at step 304 the one or more transparent layer commands are executed on the transparent layer. Execution of the one or more transparent layer commands is configured to cause execution of one or more native commands in the identified context.

Figure 15:
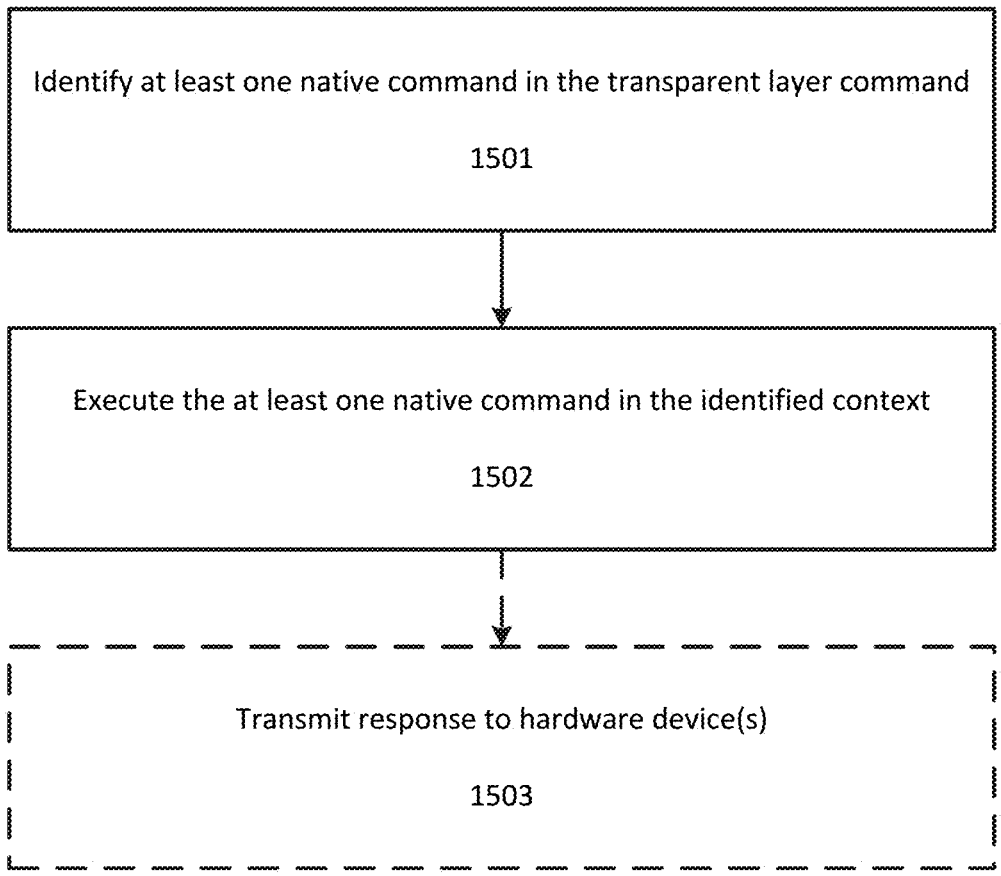
FIG. 15 illustrates a flowchart for executing the one or more transparent layer commands on the transparent layer according to an exemplary embodiment.

FIG. 15 illustrates a flowchart for executing the one or more transparent layer commands on the transparent layer according to an exemplary embodiment. At step 1501 at least one native command in the transparent layer command is identified. The native command can be, for example, designated as a native command within the structure of the transparent layer command, allowing for identification.

At step 1502 the at least one native command is executed in the identified context. This step can include passing the at least one native command to the identified context via an API identified for that context and executing the native command within the identified context. For example, if the identified context is the operating system, then the native command can be passed to the operating system for execution via the operating system API. Additionally, if the identified context is an application, then the native command can be passed to application for execution via the application API.

Optionally, at step 1503, a response can be transmitted to hardware device(s). As discussed earlier, this response can be routed from the transparent layer to the virtual driver and on to the hardware device.

Figure 16:
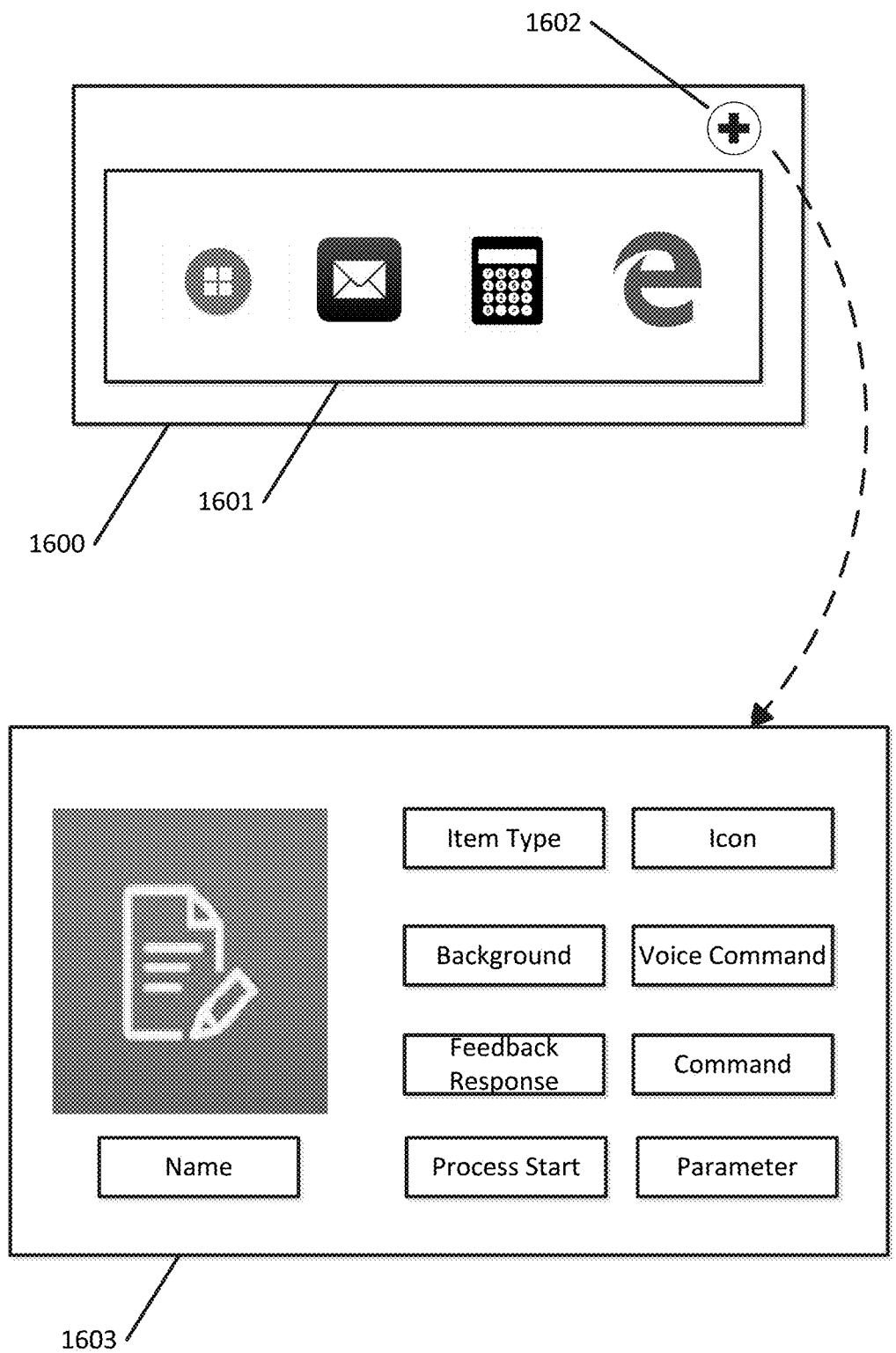
FIG. 16 illustrates an example interface for adding new commands corresponding to user input according to an exemplary embodiment.

FIGS. 16-19 illustrate additional features of the system disclosed herein. FIG. 16 illustrates an example interface for adding new commands corresponding to user input according to an exemplary embodiment. The dashboard in interface 1600 includes icons of applications 1601 which have already been added and can be launched using predetermined user inputs and hardware devices (e.g., voice commands). The dashboard can also show other commands that are application-specific and that are mapped to certain user inputs. Selection of addition button 1602 opens the add command menu 1603. This menu allows users to select between the following options: Item type: Fixed Item to add on bottom bar menu / Normal Item to add in a drag menu; Icon: Select the image icon; Background: Select the background icon color; Color: Select the icon color; Name: Set the new item name; Voice command: Set the voice activation command to open the new application; Feedback response: Set the application voice response feedback; Command: Select application type or custom command type to launch (e.g., launch application command, perform action within application command, close application command, etc.); Process Start: if launching a new process or application, the name of the process or application; and Parameter: any parameters to pass into the new process or application.

Figure 17:
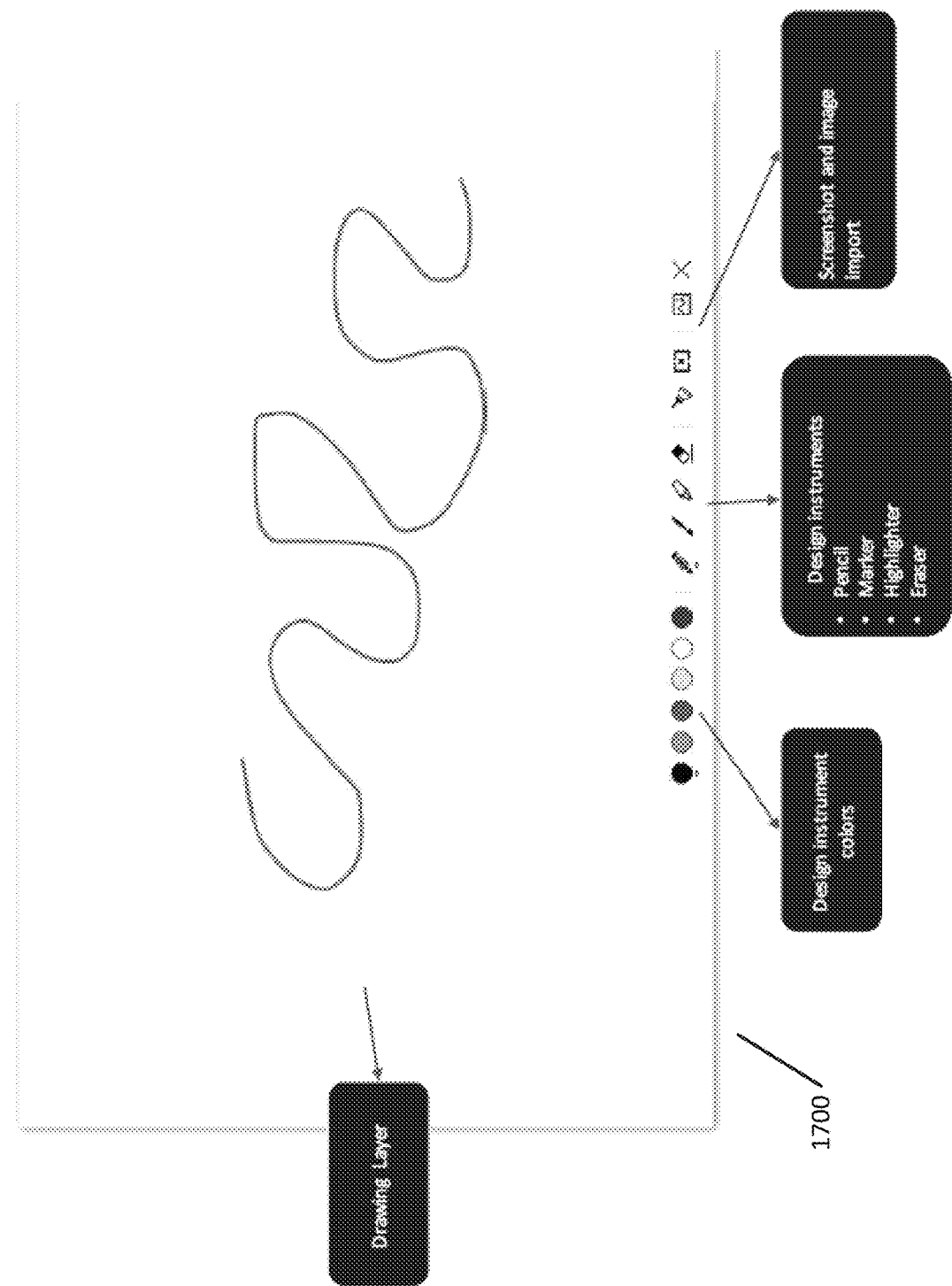
FIG. 17 illustrates various components and options of a drawing interface and draw mode according to an exemplary embodiment.
Figure 18:
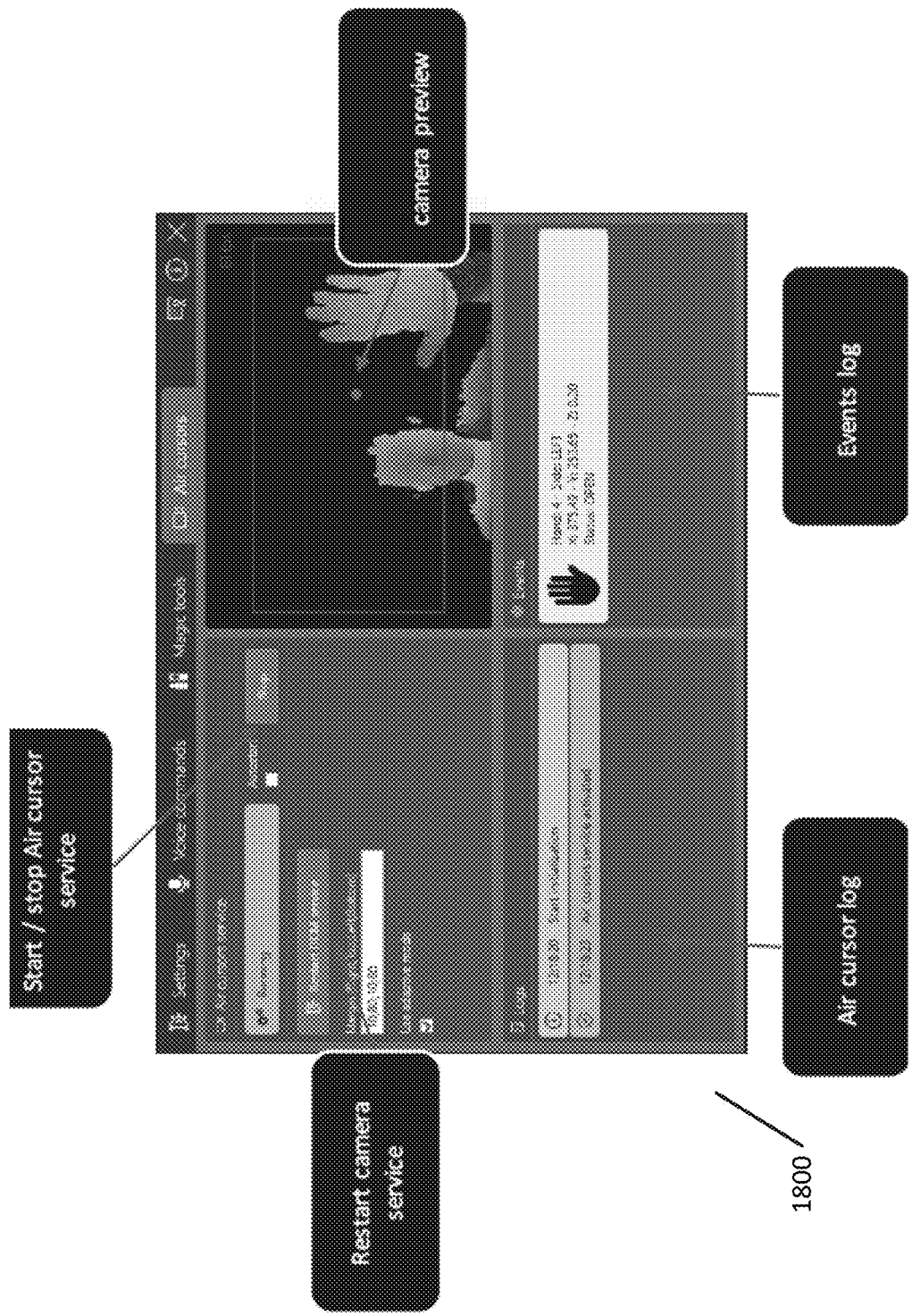
FIG. 18 illustrates a calibration and settings interface for a video camera hardware device that is used to recognize objects and allows for a user to provide input using touch and gestures according to an exemplary embodiment.
Figure 19:
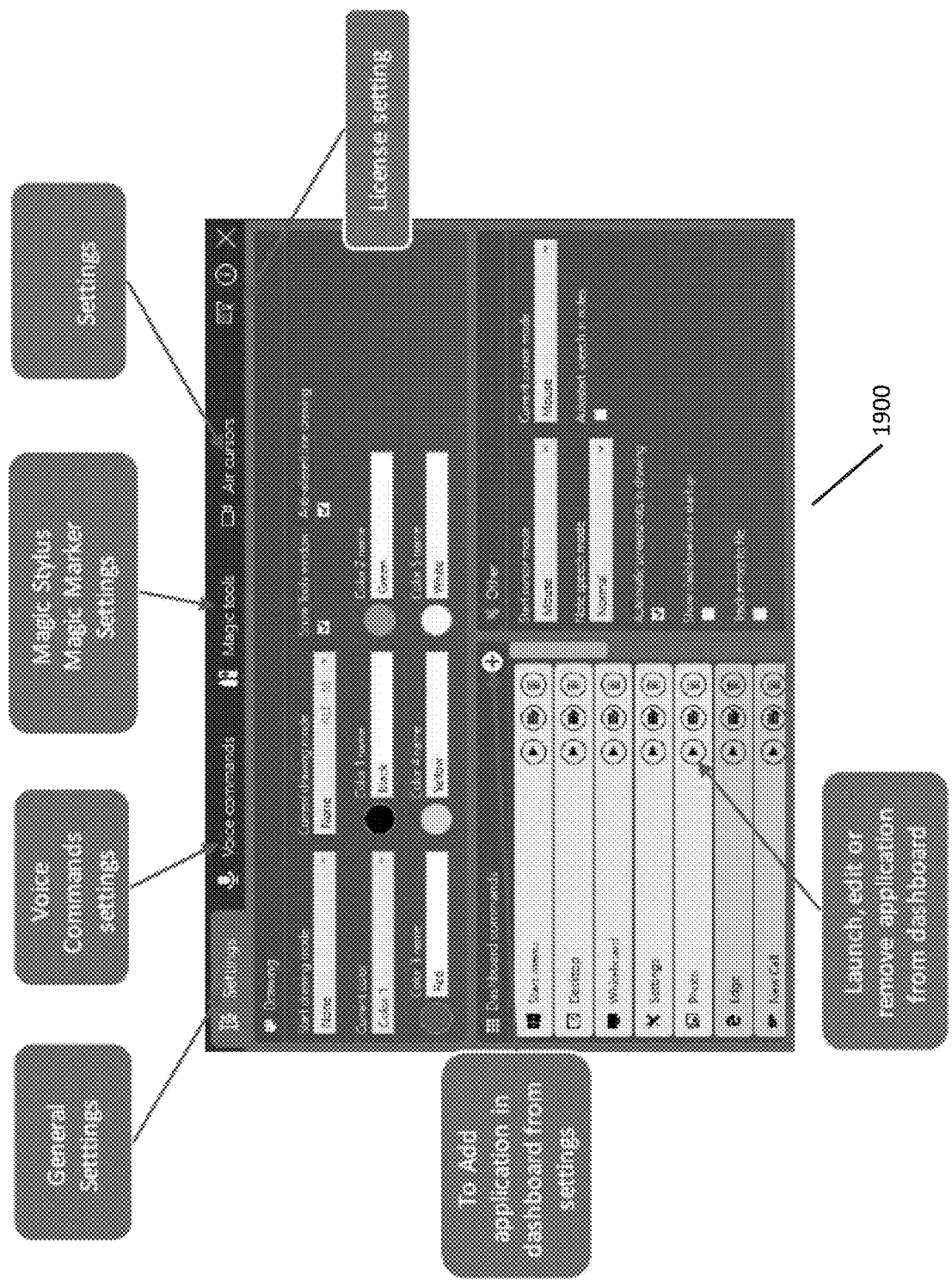
FIG. 19 illustrates a general settings interface that allows a user to customize various aspects of the interface, toggle input modes, and make other changes according to an exemplary embodiment.

FIG. 17 illustrates various components and options of the drawing interface 1700 and draw mode according to an exemplary embodiment. FIG. 18 illustrates a calibration and settings interface 1800 for a video camera hardware device that is used to recognize objects and allows for a user to provide input using touch and gestures. FIG. 19 illustrates a general settings interface 1900 which allows a user to customize various aspects of the interface, toggle input modes, and make other changes. As shown in interface 1900, a user can also access a settings page to calibrate and adjust settings for a hardware stylus (referred to as the "Magic Stylus").

The system disclosed herein can be implemented on multiple networked computing devices and used an aid in conducting networked collaboration sessions. For example, the whiteboard functionality described earlier can be a shared whiteboard between multiple users on multiple computing devices.

Whiteboards and collaboration spaces frequently include images that are the subject of discussion or of a particular meeting. Many times, it is necessary to edit and interact with images within the collaboration workspace. For example, a graphic design team may wish to make edits to a particular design and suggest revisions to colleagues. One of the problems with existing whiteboards or other shared collaborations spaces is that there is currently no way to clip, edit or otherwise revise images in the collaboration workspace on the fly—i.e., in real-time and in a way in which changes are automatically propagated to other participants in the collaboration workspace. For example, the process of changing and clipping images is difficult as users have to bring the images into other applications to edit and modify them and then re-import them into the collaboration program. This process results in a loss of productivity within the meeting to perform edits, such as the time taken for a particular user to export an image into an editing program, make the necessary edits, and then re-import the image. Additionally, many users are not familiar with or adept at performing these types of operations. Furthermore, the process of exporting and re-importing images wastes computing resources, such as the resources required to export and import images, the resources required to store an exported image, the resources required to launch and use editing software, and the resources required to store the edited image. This is in additional to computational resources that may be used for the collaboration session itself, placing strain on the local computing device.

In addition to the earlier described methods and systems for implementation of a universal hardware-software interface, Applicant has additionally discovered methods, apparatuses and computer-readable media that allow for propagating cropped images over a web socket connection in a networked collaboration workspace.

Figure 20:
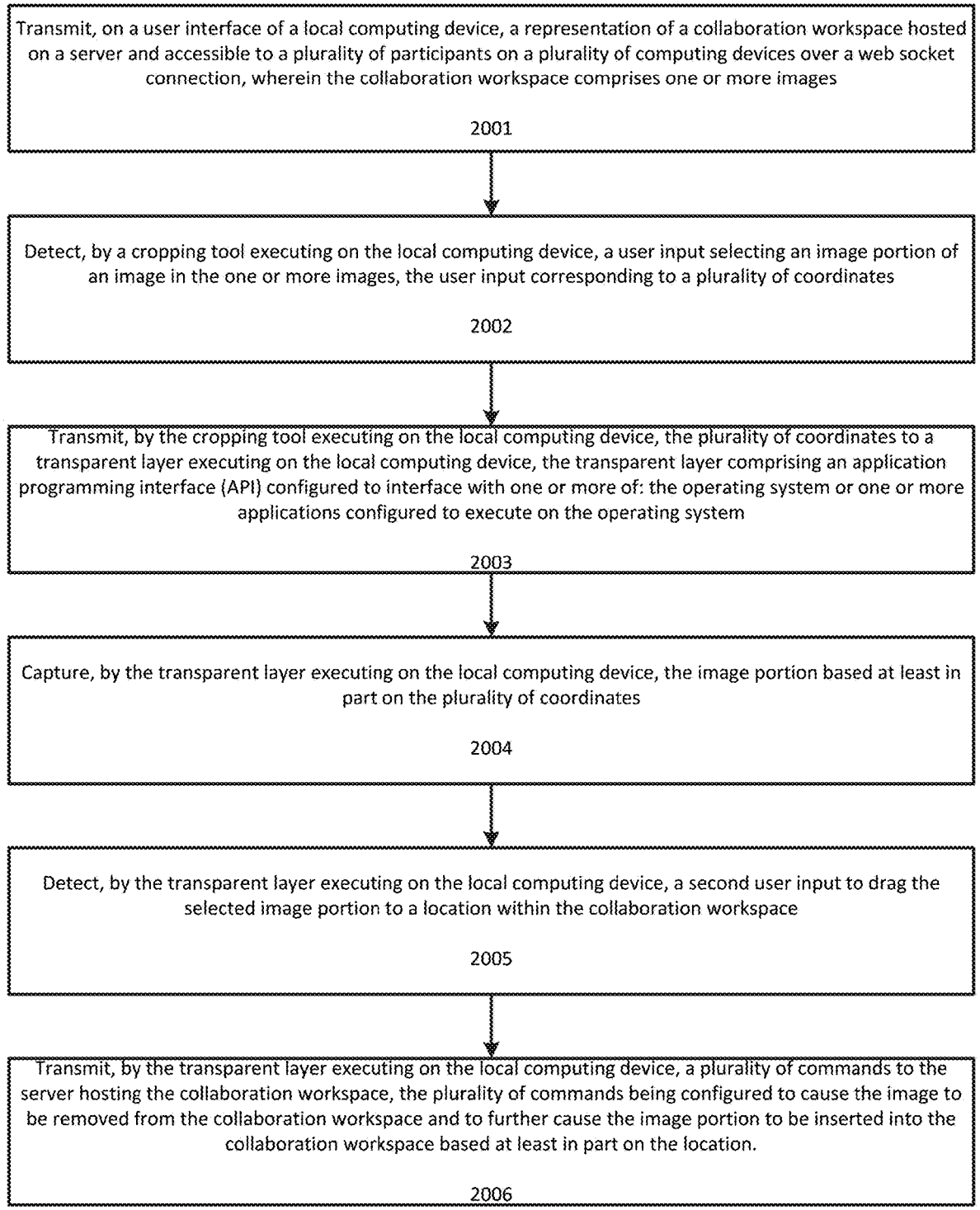
FIG. 20 illustrates a flowchart for propagating cropped images over a web socket connection in a networked collaboration workspace according to an exemplary embodiment.

FIG. 20 illustrates a flowchart for propagating cropped images over a web socket connection in a networked collaboration workspace according to an exemplary embodiment. All of the steps shown in FIG. 20 can be performed on a local computing device, such as a client device connected to a server, and do not require multiple computing devices.

At step 2001 a representation of a collaboration workspace hosted on a server and accessible to a plurality of participants on a plurality of computing devices over a web socket connection is transmitted on a user interface of a local computing device. The representation of the collaboration workspace can include one or more images, such as images being discussed or utilized in the collaboration session.

Figure 21A:
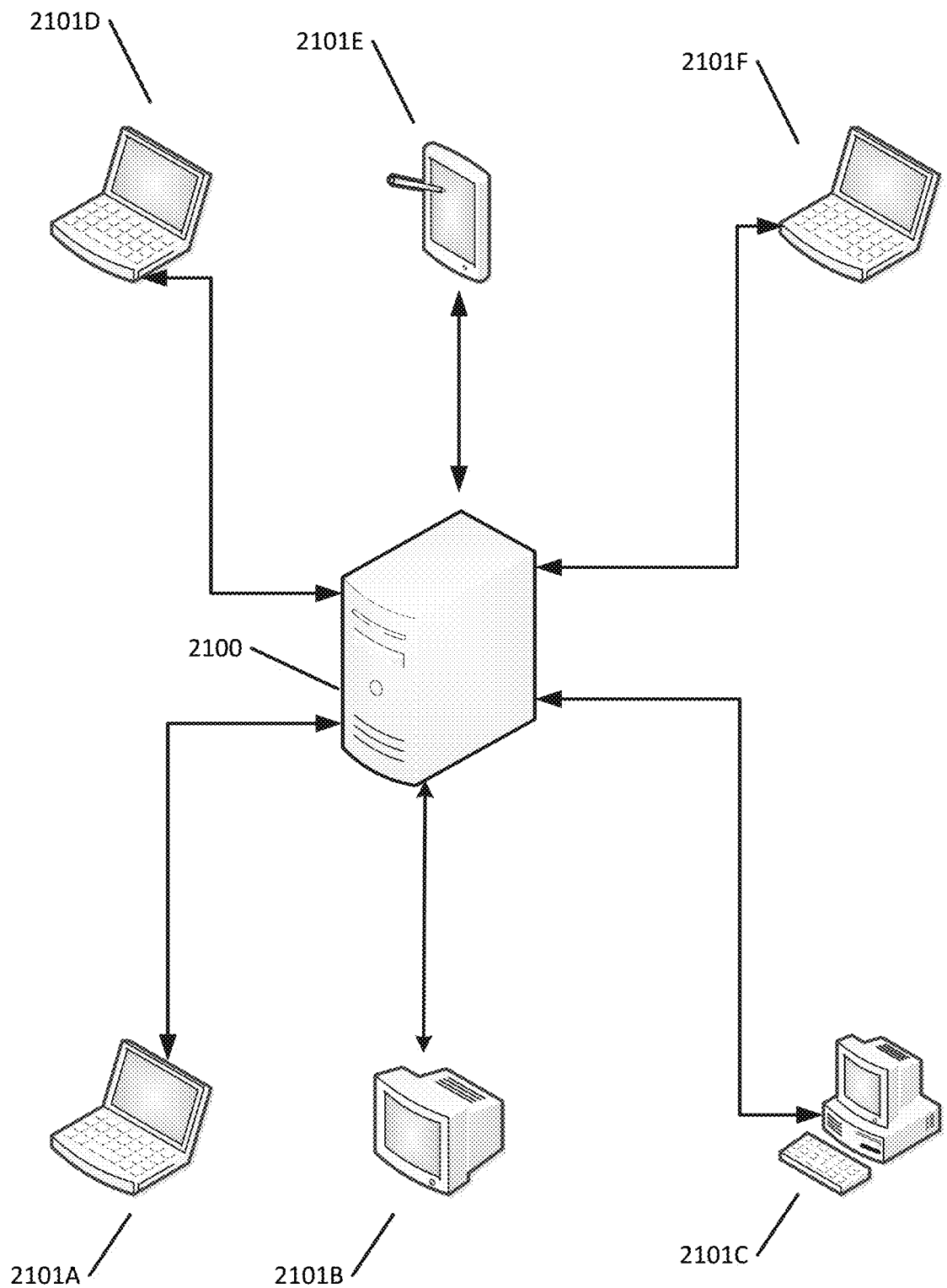
FIG. 21A illustrates the network architecture used to host and transmit collaboration workspace according to an exemplary embodiment.

FIG. 21A illustrates the network architecture used to host and transmit collaboration workspace according to an exemplary embodiment. As shown in FIG. 21A, server 2100 is connected to computing devices 2101A-2101F. The server 2100 and computing devices 2101A-2101F can be connected via a network connection, such as web socket connection, that allows for bi-directional communication between the computing devices 2101A-2101F (clients) and the server 2100. As shown in FIG. 21A, the computing devices can be any type of computing device, such as a laptop, desktop, smartphone, or other mobile device.

Figure 21B:
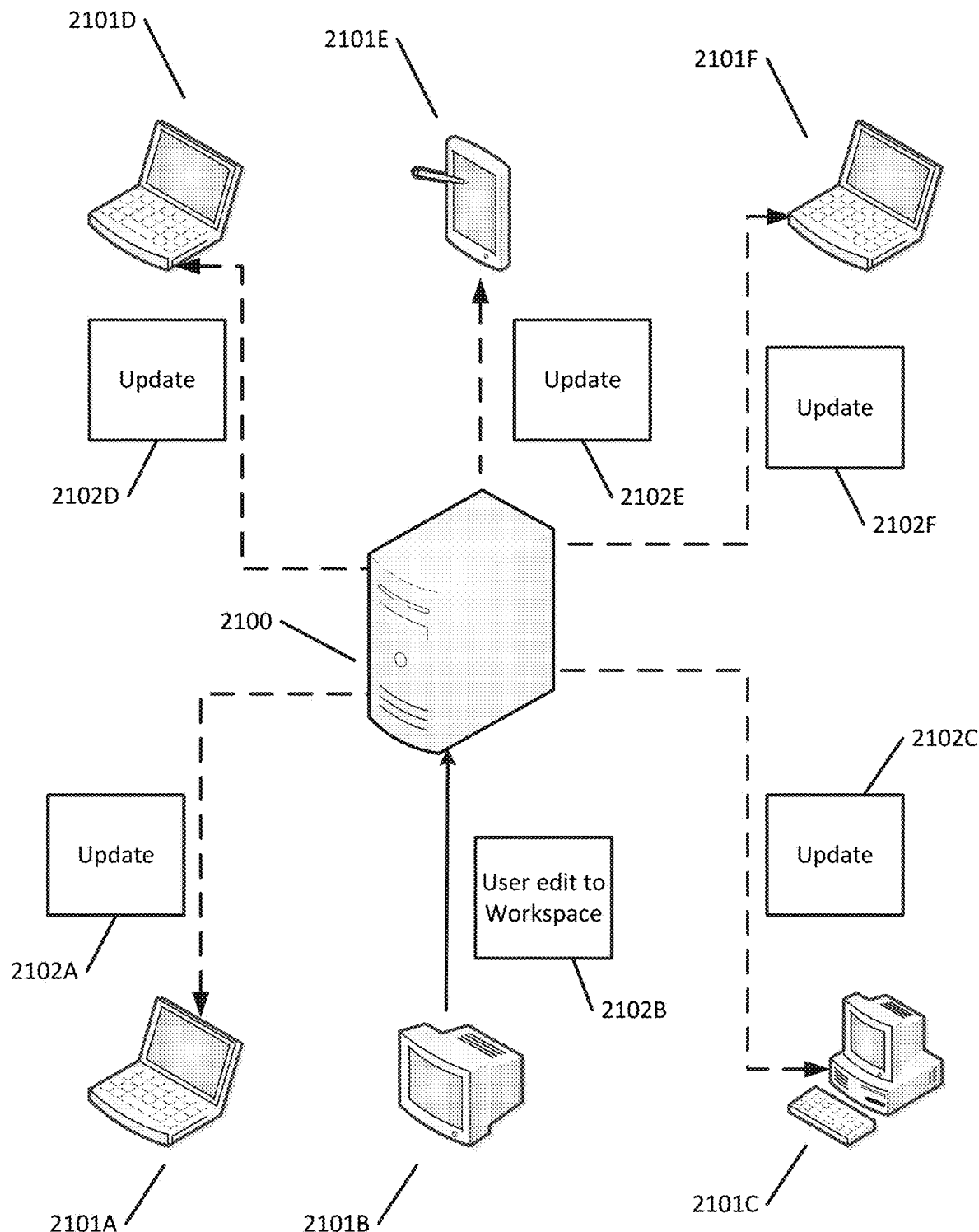
FIG. 21B illustrates the process for propagating edits to the collaboration workspace within the network according to an exemplary embodiment.

The collaboration workspace can be, for example, a digital whiteboard configured to propagate any edits from any participants in the plurality of participants to other participants over the web socket connection. FIG. 21B illustrates the process for propagating edits to the collaboration workspace within the network according to an exemplary embodiment. As shown in FIG. 21B, if a user at computing device 2101B makes an edit or an alteration to the collaboration workspace, this edit or alteration 2102B is sent to the server 2100, where it is used to update the hosted version of the workspace. The edit or alteration is then propagated as updates 2102A, 2102C, 2102D, 2102E, and 2102F by the server 2100 to the other connected computing devices 2101A, 2101C, 2101D, 2101E, and 2101F.

Each representation of the collaboration workspace can be a version of the collaboration workspace that is customized to a local participant. For example, as discussed above, each representation of the collaboration workspace can include one or more remote participant objects corresponding to one or more remote computing devices connected to the server.

Figure 22:
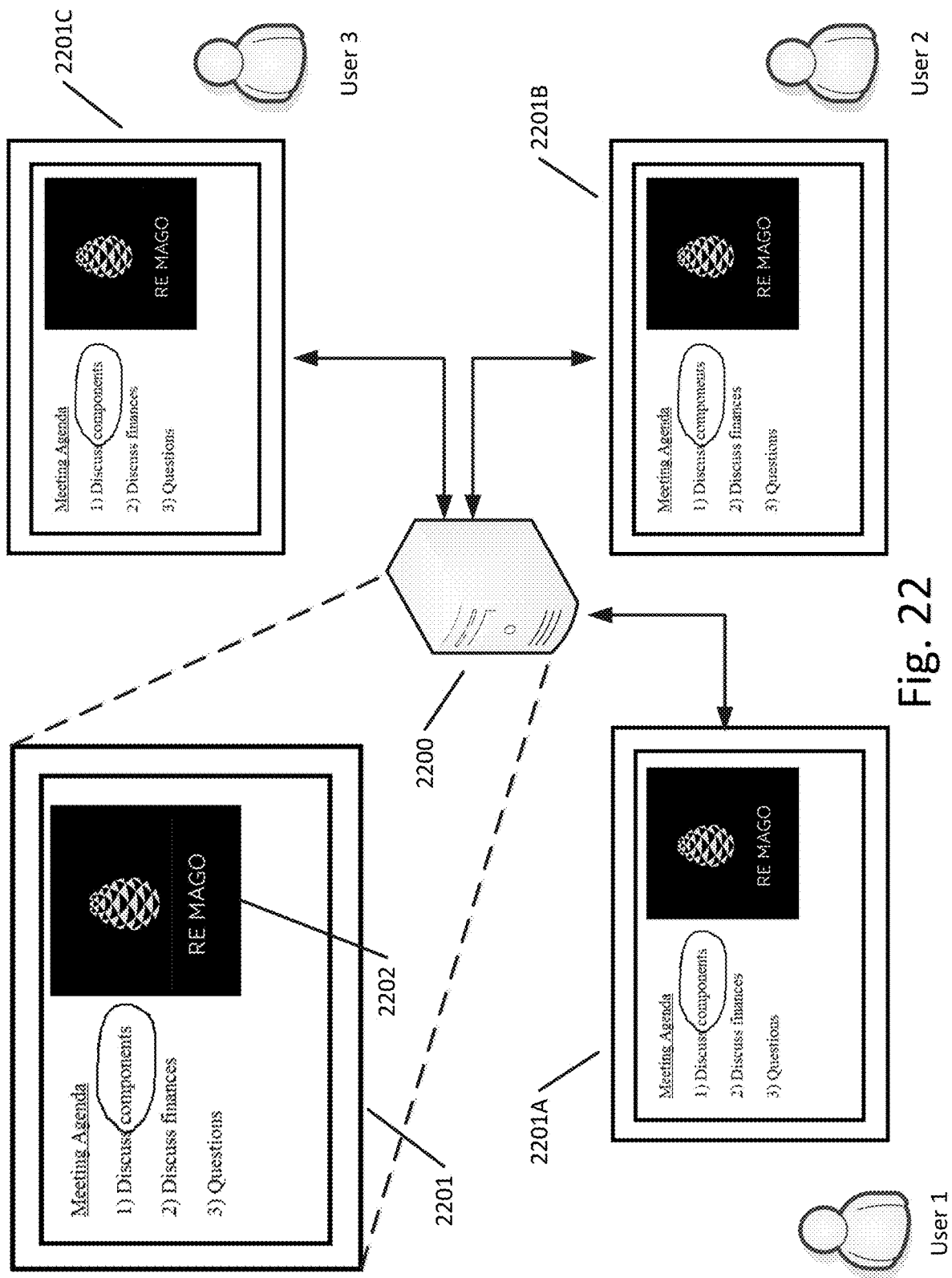
FIG. 22 illustrates multiple representations of a collaboration workspace according to an exemplary embodiment.

FIG. 22 illustrates multiple representations of a collaboration workspace according to an exemplary embodiment. As shown in FIG. 22, server 2200 hosts collaboration workspace 2201, that includes image 2202. The version of the collaboration workspace hosted on the server is propagated to the connected devices, as discussed earlier. FIG. 22 also illustrates the representations of the collaboration workspace for three connected users, User 1, User 2, and User 3. As shown, each representation includes all of the objects and edits in the collaboration workspace. For example, representation 2201A, 2201B, and 2201C all include a representation of image 2202.

Returning to FIG. 20, at step 2002 a cropping tool executing on the local computing device detects a user input selecting an image portion of an image in the one or more images shown in the collaboration workspace, the user input corresponding to a plurality of coordinates.

Figure 23A:
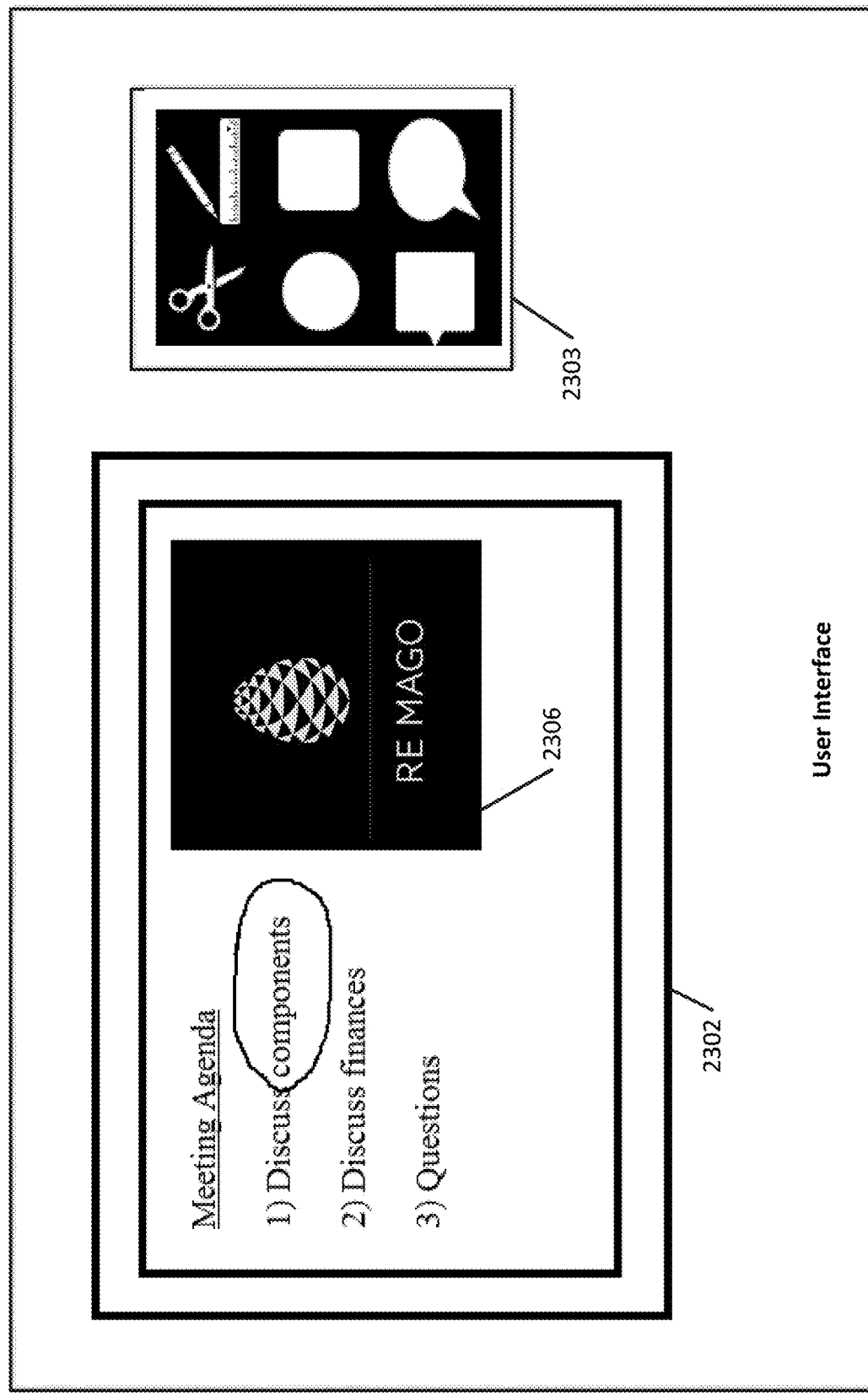
FIGS. 23A-23C illustrate an example of cropping input detection according to an exemplary embodiment.
Figure 23B:
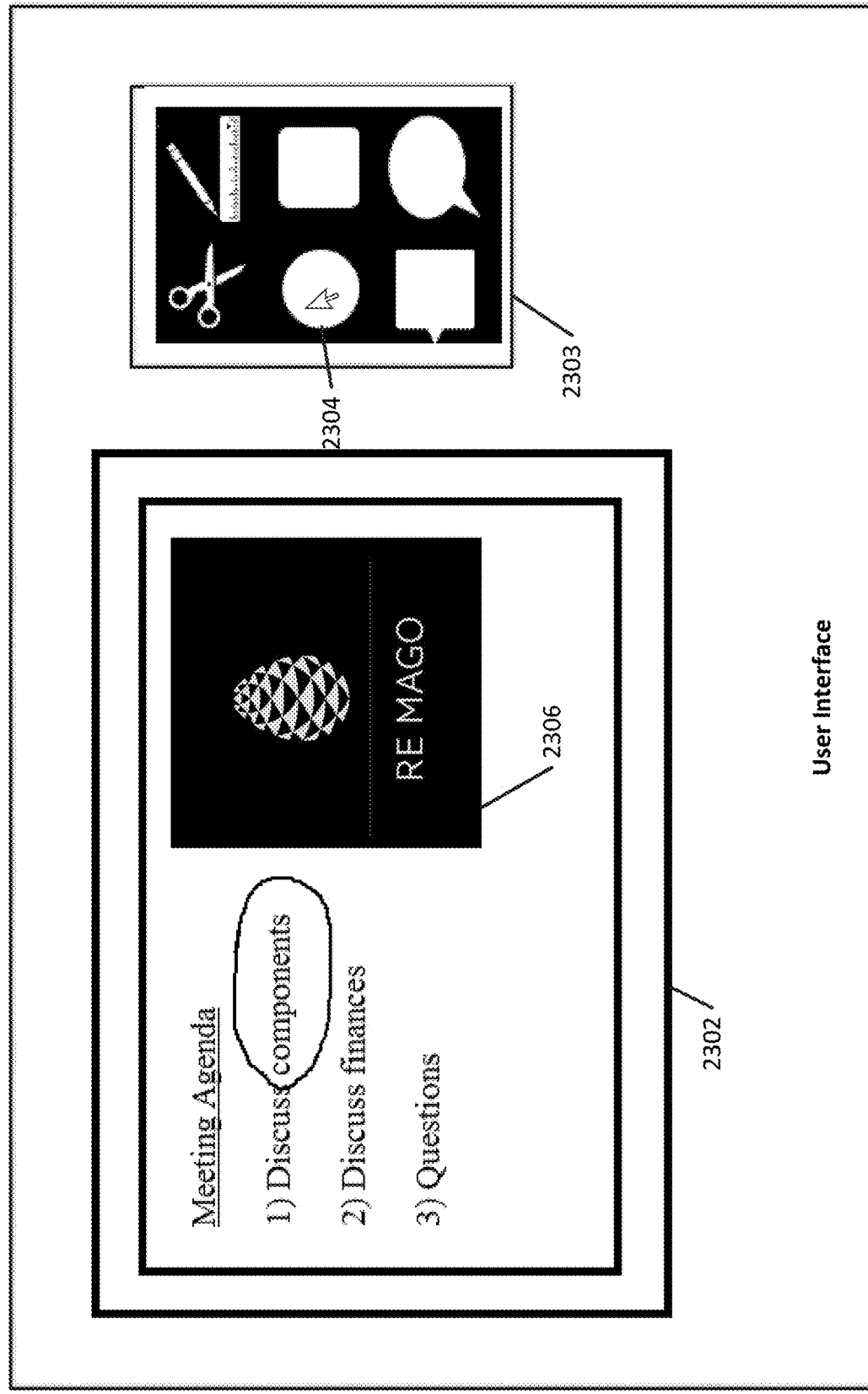
Figure 23C:
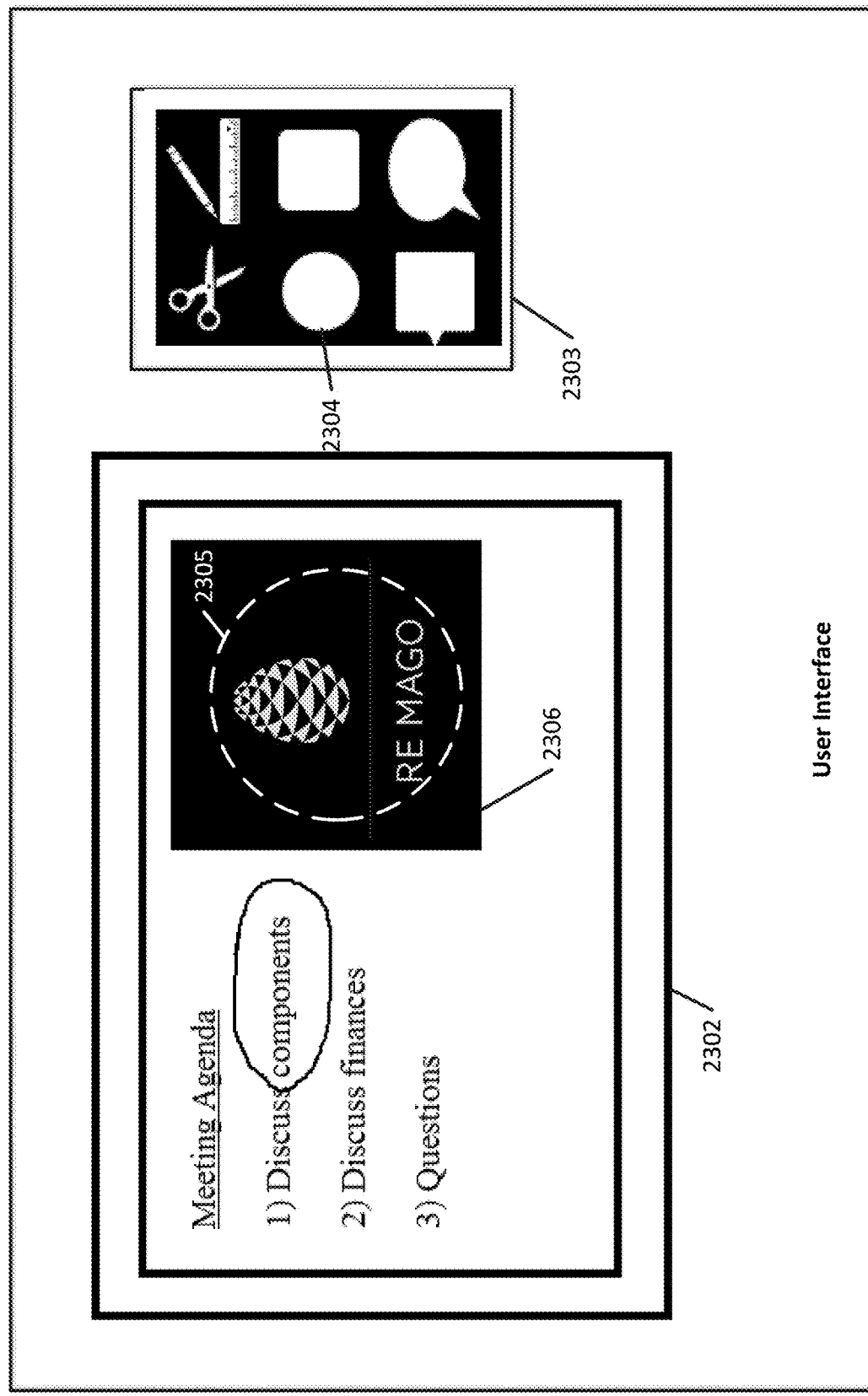

FIGS. 23A-23C illustrate an example of this detection process according to an exemplary embodiment. As shown in FIG. 23A, user interface 2301 includes a representation of the collaboration workspace 2302, including image 2306. User interface 2301 can correspond to the user interface of a local computing device that is connected to the server hosting the collaboration workspace.

User interface 2301 also includes cropping tool interface 2303. As shown, the cropping tool interface 2303 can display indicators or icons corresponding to multiple different selectable cropping tools. The selectable cropping tool interface can include, for example, cropping tools corresponding to a particular cropping shapes, such as a square, a circle, a rectangular quote box, an elliptical quote box, a manual freehand cropping tool (shown by the scissor icon), or a manual rule cropping tool (shown by the pencil and ruler icon). Of course, a variety of different cropping shapes can be utilized and these examples are not intended to be limiting.

While the cropping tool interface 2303 is shown as a separate interface from the representation of the collaboration workspace interface 2302, it is understood that the cropping tool interface can be integrated into the collaboration workspace representation, such that each user's representation of the collaboration workspace includes an interface for the cropping tool. Similarly, while the cropping tool can be a separate program configured to interface the program corresponding to the collaboration workspace (and additional programs, such as internet browsers, word processing programs, graphical editing programs, etc.), the cropping tool can also be implemented as module or component of the collaboration workspace program.

FIG. 23B illustrates the selection of a particular cropping shape in the cropping tool interface 2303 by a user. As shown in the figure, the user has selected the circular shape 2304 as the cropping shape. The selection can be made using a pointing device such as a mouse, as indicated by the mouse pointer shown in the figure. The selection can also be made using a hand gesture or stylus as discussed earlier. The earlier described techniques involving the virtual driver and/or the transparent layer can be used to detect the selection.

FIG. 23C illustrates the user interface 2301 after the selection of the circular cropping shape 2304 and after the user has selected a region to crop. The user may select a region for cropping, for example by dragging and dropping a cropping shape onto a particular location within interface 2301. The selection of a cropping shape can also bring up an outline of a cropping area in the selected shape that the user can move or drag and drop to a particular location within interface 2301. A user can drag-and-drop using a mouse. A user can also drag-and-drop using a hand gesture or stylus as discussed earlier. The earlier described techniques involving the virtual driver and/or the transparent can be used to detect the drag and drop motion.

As shown in FIG. 23C, the user has selected circular area 2305 in image 2306 using the circular cropping shape of the cropping tool. The selection can be made using a user input from a pointing device, as discussed above. Once the selection is made, the cropping tool detects the input and a plurality of coordinates corresponding to the cropping selection. These coordinates can be defined using the horizontal (X) and vertical (Y) axis of the user interface 2301. Additionally, the plurality of coordinates will correspond to the selected cropping area. In the example shown in FIG. 23C, the plurality of coordinates correspond to a circle shape. The coordinates themselves can be retrieved by the cropping tool from the operating system of the local computing device. For example, the cropping tool application (or the collaboration workspace application if the cropping tool is part of the collaboration workspace application) can query the operating system via an API to request coordinates corresponding to each point in the dashed circle 2305. Alternatively, the cropping tool can include functionality for determining the plurality of coordinates based upon the location of the pointer when the selection is made. For example, if the cropping shape is a circle and the center of the circle corresponds to the location of the pointing device when a selection is made, the cropping application can determine the screen coordinate of the center of the circle (such as by querying the operating system for the pointer location) and use those center coordinates to calculate the plurality of coordinates that correspond to the cropping shape. In this case, the calculation can use the radius of the circle to project equal length lines outwards from the center point in 360 degrees and record the resulting endpoints of each of the lines as the plurality of coordinates.

Returning to FIG. 20, at step 2003 the cropping tool executing on the local computing device transmits the plurality of coordinates corresponding to the boundary of the cropped image portion to the transparent layer discussed earlier. As previously explained, the transparent layer executes on the local computing device and comprises an application programming interface (API) configured to interface with one or more of: the operating system or one or more applications configured to execute on the operating system. In this case, the transparent layer is configured to interface with the cropping tool application. However, if the cropping tool is part of the collaboration workspace application, then the local instance of the collaboration workspace application executing on the local computing device can also transmit the plurality of coordinates to the transparent layer.

At step 2004 the transparent layer executing on the local computing device captures the image portion based at least in part on the plurality of coordinates that are received. Step 2004 can include transmitting, by the transparent layer executing on the local computing device, a request to one or more of the operating system or an application executing on the local computing device for a screen capture of the image portion defined by the plurality of coordinates, receiving, by the transparent layer executing on the local computing device, the screen capture of the image portion defined by the plurality of coordinates, and storing, by the transparent layer executing on the local computing device, the image portion in memory, such as random access memory of the local computing device. Step 2004 can of course be performed in other ways. For example, step 2004 can be performed by transmitting, by the transparent layer executing on the local computing device, a request to one or more of the operating system or an application executing on the local computing device for a screen capture of the entire screen (such as by sending a "print screen" command to the operating system), extracting the image portion from the screen capture based at least in part on the plurality of coordinates using functions that are part of the transparent layer, and then storing the image portion in memory, such as random access memory of the local computing device.

Figure 24:
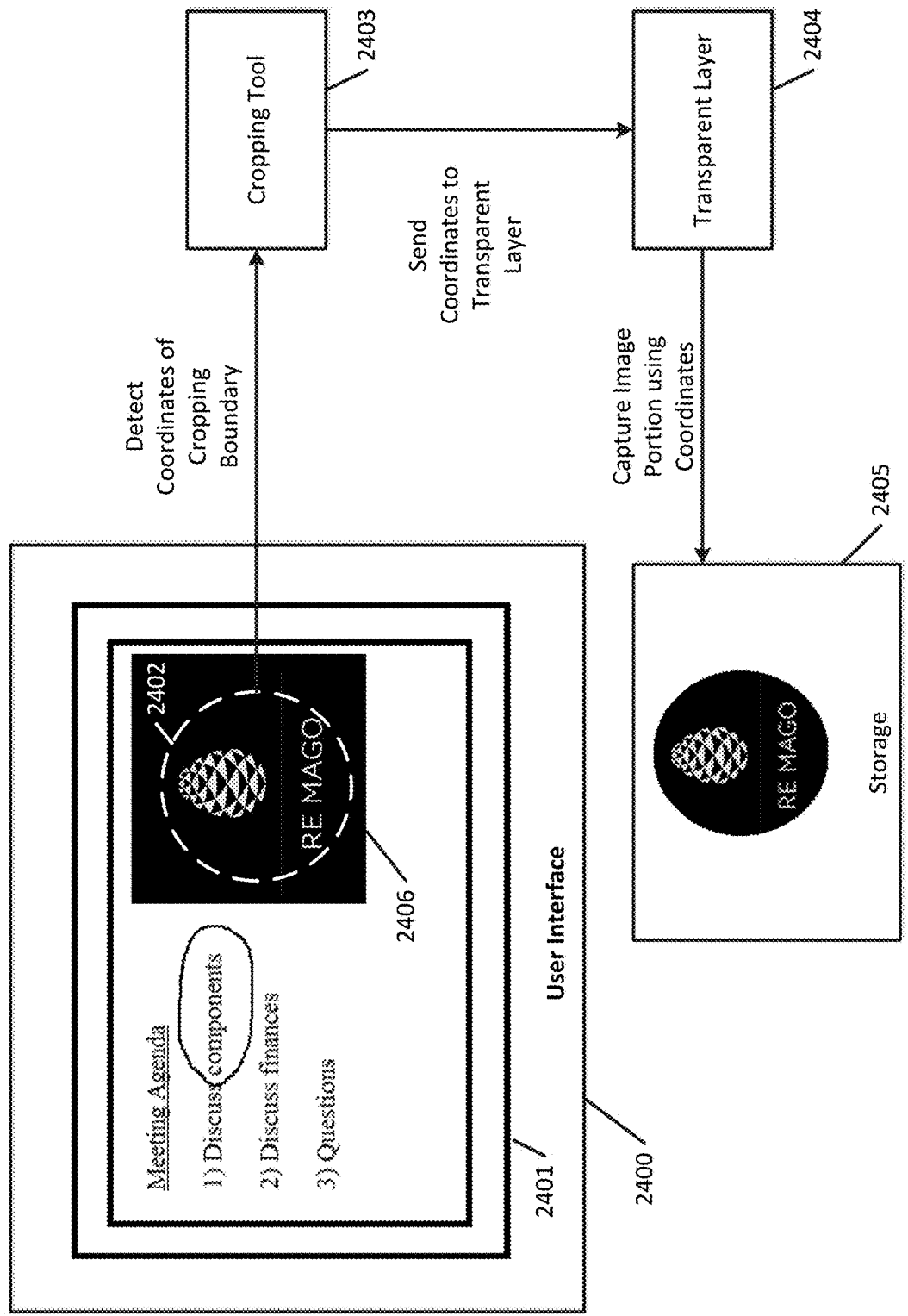
FIG. 24 illustrates an example of the process flow for transmitting coordinates to the transparent layer and capturing an image portion according to an exemplary embodiment.

FIG. 24 illustrates an example of the process flow for steps 2003 and 2004 in FIG. 20. As shown in the figure, a user has captured an image portion defined by the boundary 2402 within image 2406, which is displayed within collaboration workspace 2401 within user interface 2400. The cropping tool interface is not shown in this figure for simplicity, but it is understood that the cropping tool interface would also be displayed user interface 2400. Cropping tool application 2403 detects coordinates of the cropping boundary (corresponding to circle 2402) and sends those coordinates to the transparent layer 2404. The transparent layer 2404 then captures the cropped image portion using the plurality of coordinates and stores the resulting image portion in storage 2405 (which can be, for example, random access memory).

Returning to FIG. 20, at step 2005 the transparent layer executing on the local computing device detects a second user input to drag the selected image portion to a location within the collaboration workspace. This second user input can be a drag and drop motion and can be input using a pointing device or using a hand gesture or stylus as discussed earlier. The earlier described techniques involving the virtual driver and/or the transparent can also be used to detect the drag and drop motion.

As will be discussed below, the location within the collaboration workspace can include space within a "whiteboard" or other shared display and editing area and can also include any interfaces or toolbars that are part of the collaboration workspace.

Step 2005 can include detecting, by the cropping tool executing on the local computing device, the second user input to drag the selected image portion to a new position within the collaboration workspace. The new position can be determined by, for example, querying the operating system when the second user input is detect. Step 2005 can also include transmitting, by the cropping tool executing on the local computing device, the new position to the transparent layer executing on the local computing device (thereby alerting the transparent layer to the second input and the location of the second input).

Alternatively, the detection can be performed directly by the transparent layer based upon a variable or value that is transmitted from the cropping tool when the coordinates are transmitted to the transparent layer. For example, when the cropping tool transmits the coordinates to the transparent layer, the transparent layer can set a flag instructing the transparent layer to detect both a subsequent input and the location of a subsequent input—in this case—the "drop" input performed by the user after dragging the image portion. The transparent layer can determine the location, for example, by querying the operating system when the second input is detected.

Figure 25:
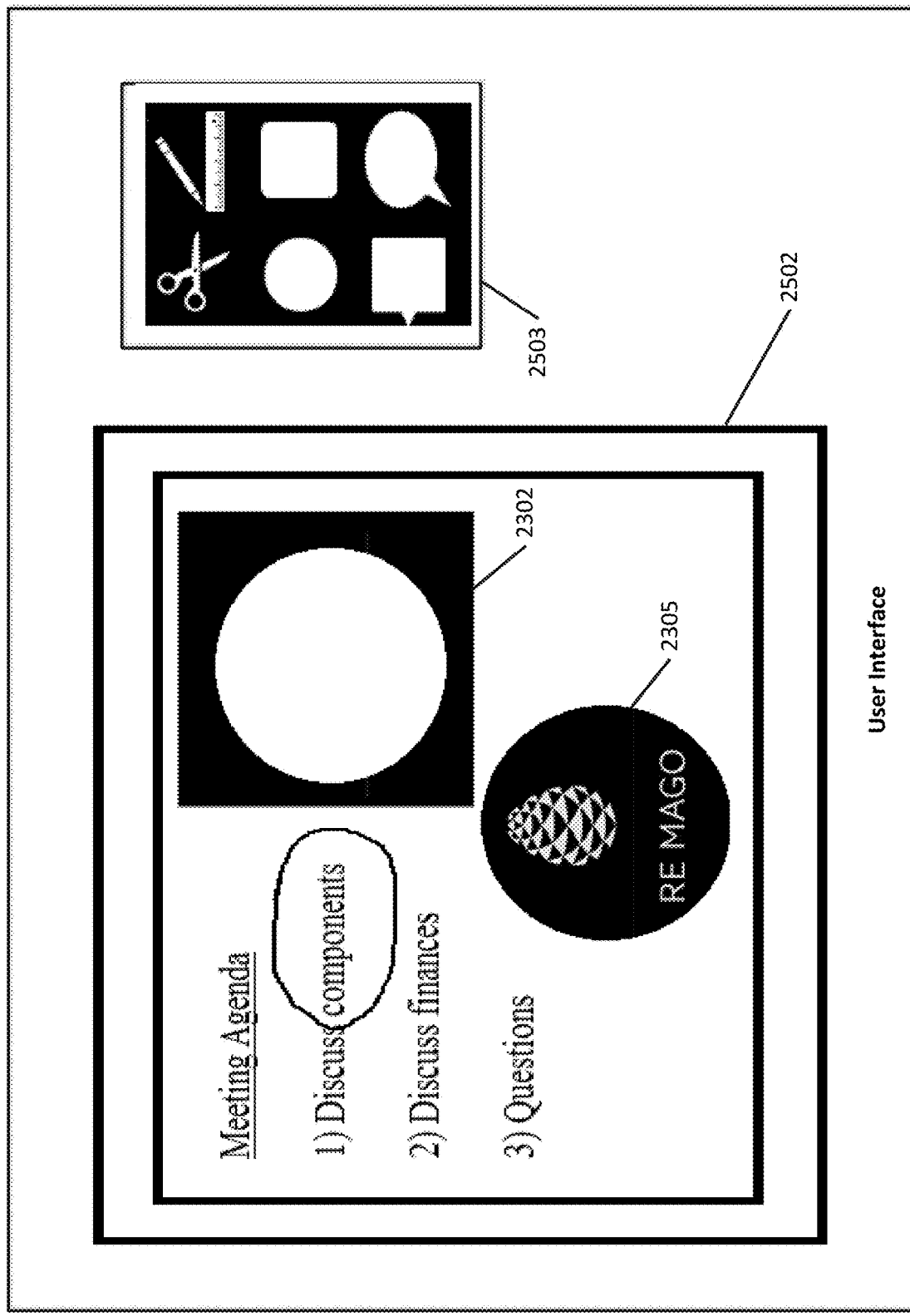
FIG. 25 illustrates an example of a user dragging the image portion to a location within the collaboration workspace according to an exemplary embodiment.

FIG. 25 illustrates an example of a user dragging the image portion to a location within the collaboration workspace. As shown in interface 2501, the user has dragged the image portion 2305 of image 2302 to a new location within the collaboration workspace 2502 using the circle shaped cropping tool of cropping tool interface 2503. Interface 2501 illustrates the interface 2501 after the user has dragged the image portion but prior to the user selecting the final location of the image portion (i.e., by completing the "drop" portion of the "drag and drop"). Therefore, FIG. 25 illustrates the interface 2501 prior to receiving the second input but after the first input. If the user were to release the image portion by completing the drop input then the current location corresponding to image portion 2305 would be detected by the transparent layer (either directly or via the cropping tool). This location can be expressed by a point corresponding to the pointer location at the moment the image is released (i.e., dropped).

Returning to FIG. 20, at step 2006 the transparent layer executing on the local computing device transmits a plurality of commands to the collaboration workspace hosted on the server. The plurality of commands are configured to cause the image (i.e., the remaining portion of the original image) to be removed from the collaboration workspace and to further cause the image portion to be inserted into the collaboration workspace based at least in part on the location of the second input that is detected in step 2005. As the collaboration workspace communicates with the local computing device over a web socket connection, the transparent layer can transmit the plurality of commands over the web socket connection.

Figure 26:
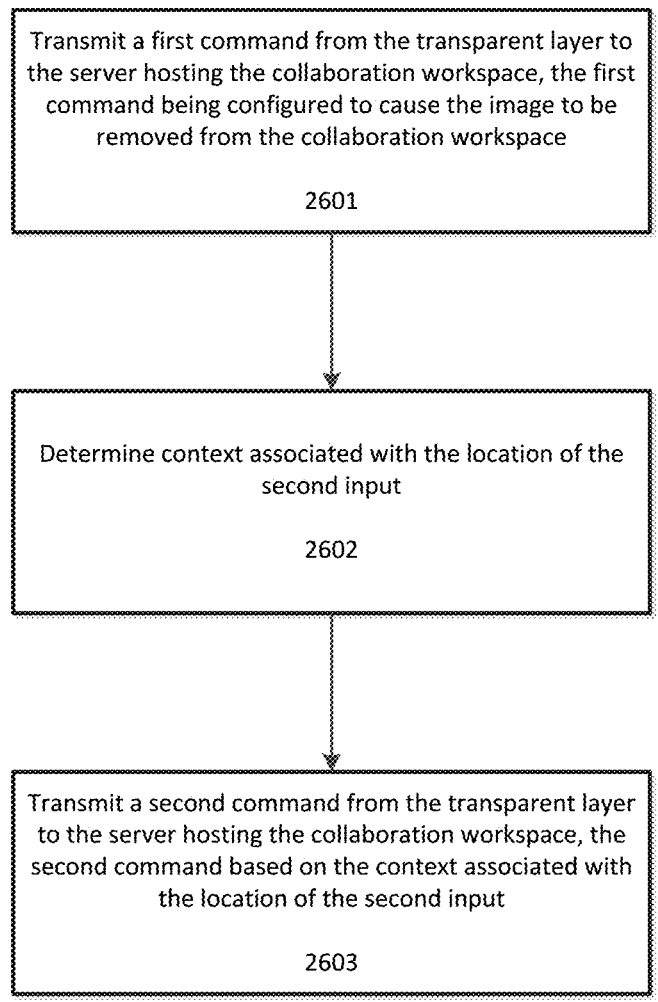
FIG. 26 illustrates a flowchart for transmitting plurality of commands to a collaboration workspace hosted on the server according to an exemplary embodiment.

FIG. 26 illustrates a flowchart for transmitting plurality of commands to the collaboration workspace hosted on the server according to an exemplary embodiment. The steps shown in FIG. 26 are performed by the transparent layer after detecting the second input.

At step 2601 a first command is transmitted from the transparent layer to the server hosting the collaboration workspace, the first command being configured to cause the image to be removed from the collaboration workspace. The specific instructions used to cause the image to be removed can depend on the configuration and parameters of the collaboration workspace. The first command can, for example, reference an object in the collaboration workspace corresponding to the image and instruct the collaboration workspace to delete that object. In the event that the collaboration workspace does not store the image as an object, the transparent layer can perform boundary detection of the image from a screen capture (based upon the first input) to determine coordinates defining the boundary of the image and transmit a command to the collaboration workspace to replace the area defined by the boundary(as specified by the coordinates) with whitespace. Many variations are possible and these examples are not intended to be limiting.

At step 2602 the transparent layer determines a context associated with the location of the second input. As discussed earlier, the collaboration workspace can include various toolbars and/or interface sections. The context can therefore be, for example, an editing interface of the workspace used for inputting information that is displayed to all users or a toolbar interface that is accessible to all users (and which can optionally be customized to each user locally).

At step 2603 a second command is transmitted from the transparent layer to the server hosting the collaboration workspace, the second command being based on the context associated with the location of the second input. The second command can depend upon the context, such as the whether the location is in the editing area of the collaboration workspace or whether the location is a location associated with a toolbar of the collaboration workspace.

Figure 27A:
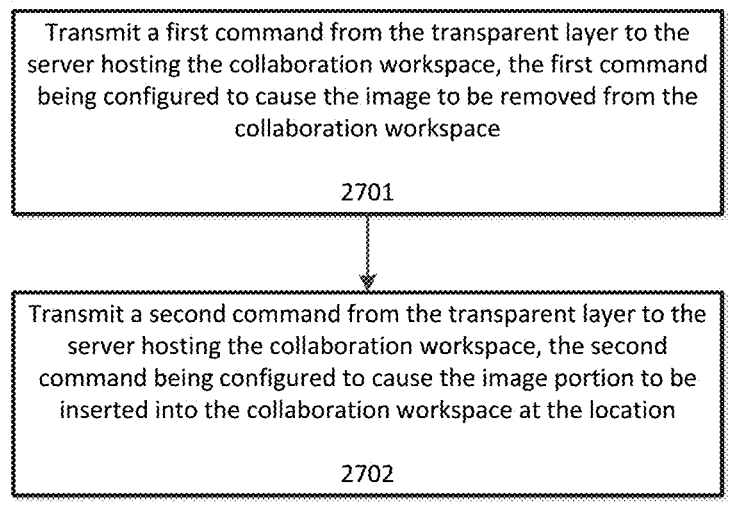
FIGS. 27A-27B illustrate flowcharts for transmitting plurality of commands to the collaboration workspace hosted on the server for two different contexts according to an exemplary embodiment.
Figure 27B:
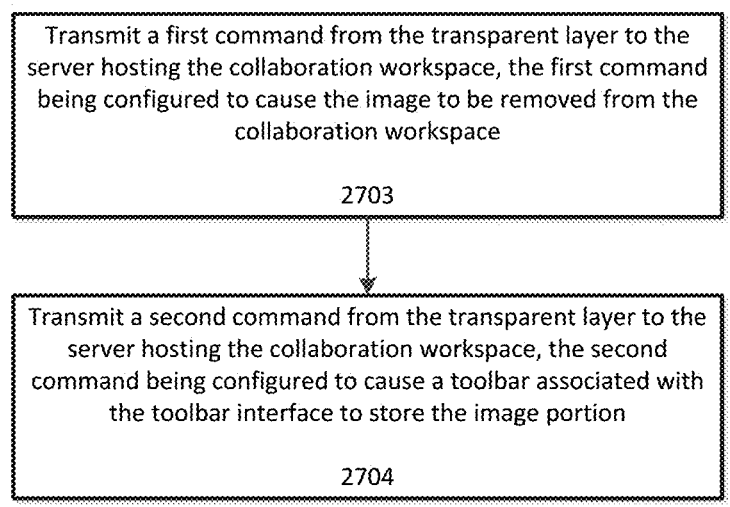

FIGS. 27A-27B illustrate flowcharts for transmitting plurality of commands to the collaboration workspace hosted on the server for two different contexts according to an exemplary embodiment.

The flowchart of FIG. 27A corresponds to a context of an editing interface when the location of second input corresponds to a location associated with an editing interface (such as the whiteboard interface 2502 shown in FIG. 25). At step 2701 a first command is transmitted from the transparent layer to the server hosting the collaboration workspace, the first command being configured to cause the image to be removed from the collaboration workspace. At step 2702 a second command is transmitted from the transparent layer to the server hosting the collaboration workspace, the second command being configured to cause the image portion to be inserted into the collaboration workspace at the location. When the image portion is stored in memory, such as random access memory, the transparent layer can retrieve the image portion from memory and transmit the image portion to the server for insertion at the location. Alternatively, the transparent layer can transmit a memory location of the image portion to the server as part of the second command and the server can retrieve the image portion from the local computing device using the memory location.

The flowchart of FIG. 27B corresponds to a context of a toolbar interface when the location of second input corresponds to a location associated with an editing interface. At step 2703 a first command is transmitted from the transparent layer to the server hosting the collaboration workspace, the first command being configured to cause the image to be removed from the collaboration workspace. At step 2704 a second command is transmitted from the transparent layer to the server hosting the collaboration workspace, the second command being configured to cause a toolbar associated with the toolbar interface to store the image portion. When the toolbar is customized to each user connected to the collaboration workspace, then a local version of the toolbar on the local computing device can store the image portion. In this case, the server can instruct the local computing device to store the image portion locally in local memory. Alternatively, if the toolbar is not customized for each user and is uniform across all users in the collaboration workspace, then the server can store the image portion on a memory of the server and it can be accessible to all users in the collaboration workspace using their toolbar interface via the web socket connection.

Figure 28A:
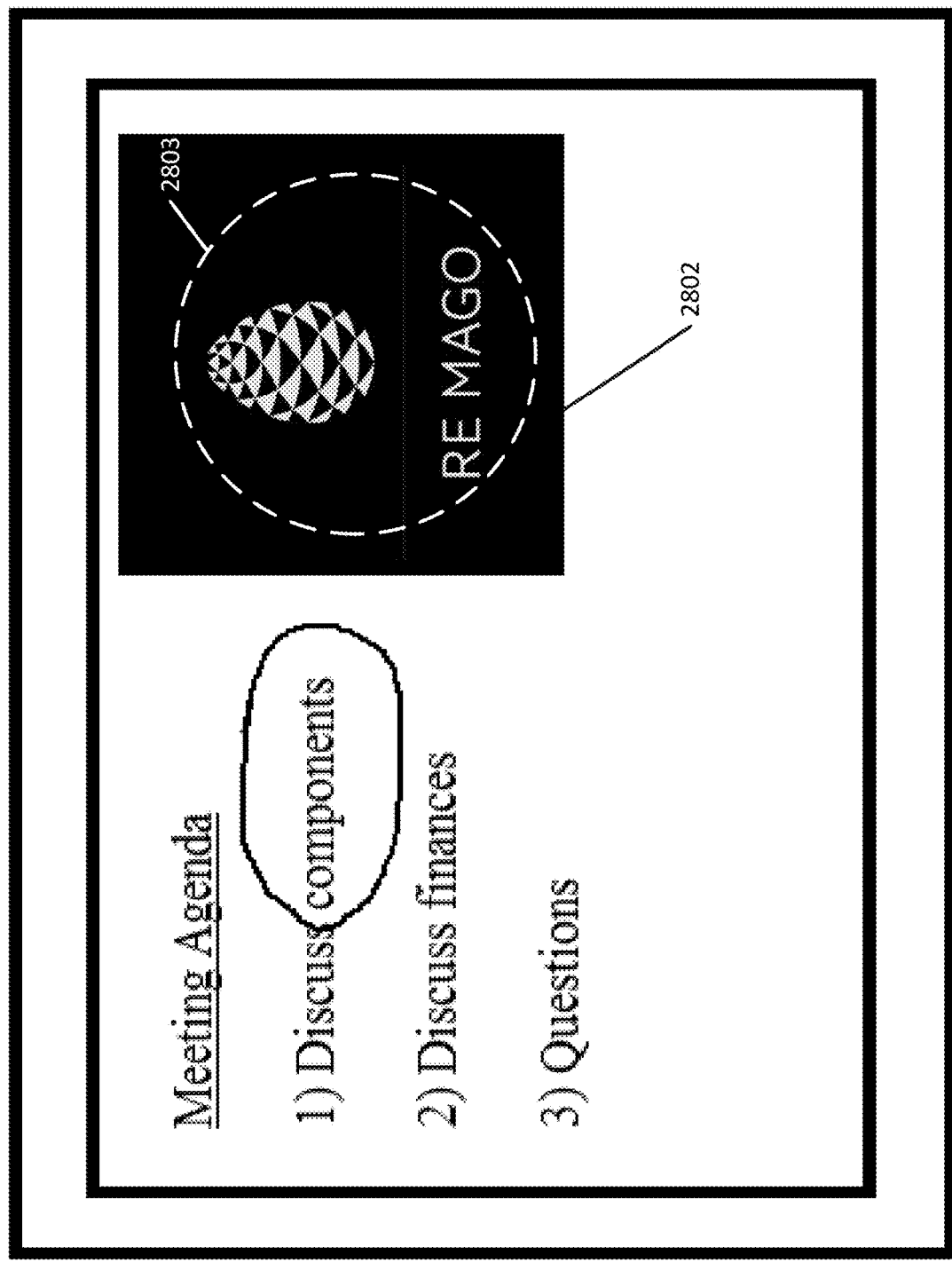
FIGS. 28A-28C illustrate an example of a user dragging the image portion to an editing interface of the collaboration workspace and the result of dragging the image portion to the editing interface according to an exemplary embodiment.
Figure 28B:
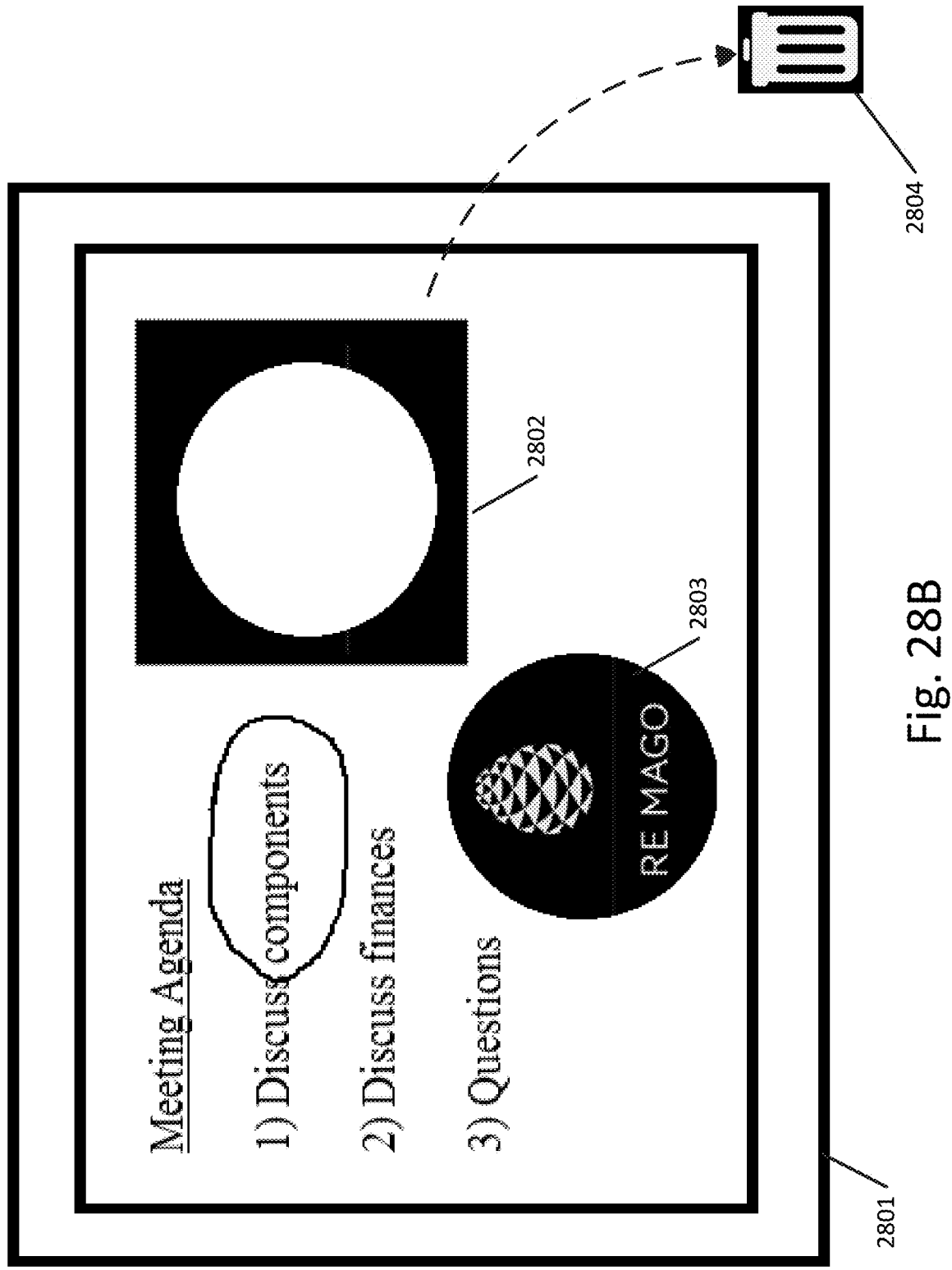
Figure 28C:
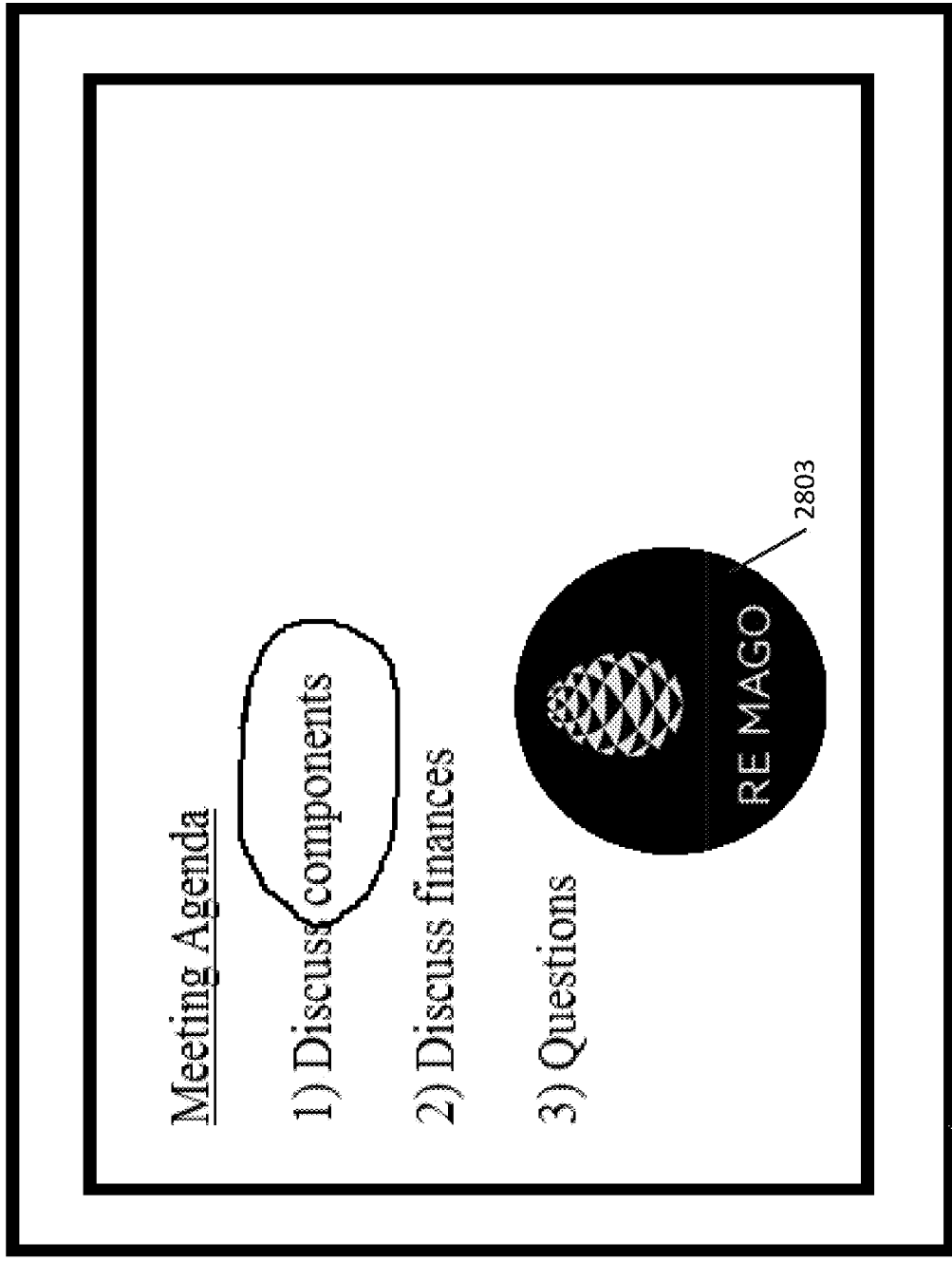

FIGS. 28A-28C illustrate an example of a user dragging the image portion to an editing interface of the collaboration workspace and the result of dragging the image portion to the editing interface according to an exemplary embodiment.

As shown in FIG. 28A, a user has selected a circular cropping 2803 of image 2802 in editing interface 2801 of a collaboration workspace. The cropping tool is not shown in this figure but it is understood that the user interface would include the cropping tool. Additionally, the collaboration workspace is shown as including only an editing interface 2801 in this example, but as discussed earlier, the collaboration workspace can include additional interfaces and toolbars.

FIG. 28B illustrates the editing interface 2801 after the user has dragged the image portion 2803 to a location within the editing interface 2801 of the collaboration workspace but prior to the user releasing (dropping the image portion). The dashed arrow between the remaining image 2802 and the trash icon 2804 indicates that when the user completes the drag and drop (i.e., when the second input is detected), the remaining image 2802 will be deleted from the collaboration workspace, as discussed earlier. The trash icon 2804 is not part of the user interface or collaboration workspace but is presented in the figure to illustrate the result of the drag and drop of the image portion 2803 by the user.

FIG. 28C illustrates the editing interface 2801 of collaboration workspace after the user has completed the drag and drop motion (i.e., after the second input is detected). As shown in the figure, the image portion 2803 is inserted into the editing interface 2801 of collaboration workspace at the drop location and the remainder of the original image (2802 in FIG. 28B) is removed from the editing interface 2801 of the collaboration workspace.

It is important to note that the changes to the editing interface in the collaboration workspace shown in in FIG. 28C are propagated across all instances of the collaboration workspace for all users connected to the collaboration workspace. In other words, the changes to the collaboration workspace do not merely occur on the local device or on the local instance of the collaboration workspace application, but also on the instances of the collaboration workspace on remote devices used by remote users. As discussed earlier, this is because the transparent layer sends the commands to remove the original image and insert the image portion at the location to the server hosting the collaboration workspace over a web socket connection, which then propagates these changes to all connected devices over the web socket connection.

FIGS. 29A-29E illustrate an example of a user dragging the image portion to toolbar interface of the collaboration workspace and the result of dragging the image portion to the toolbar interface according to an exemplary embodiment.

Figure 29A:
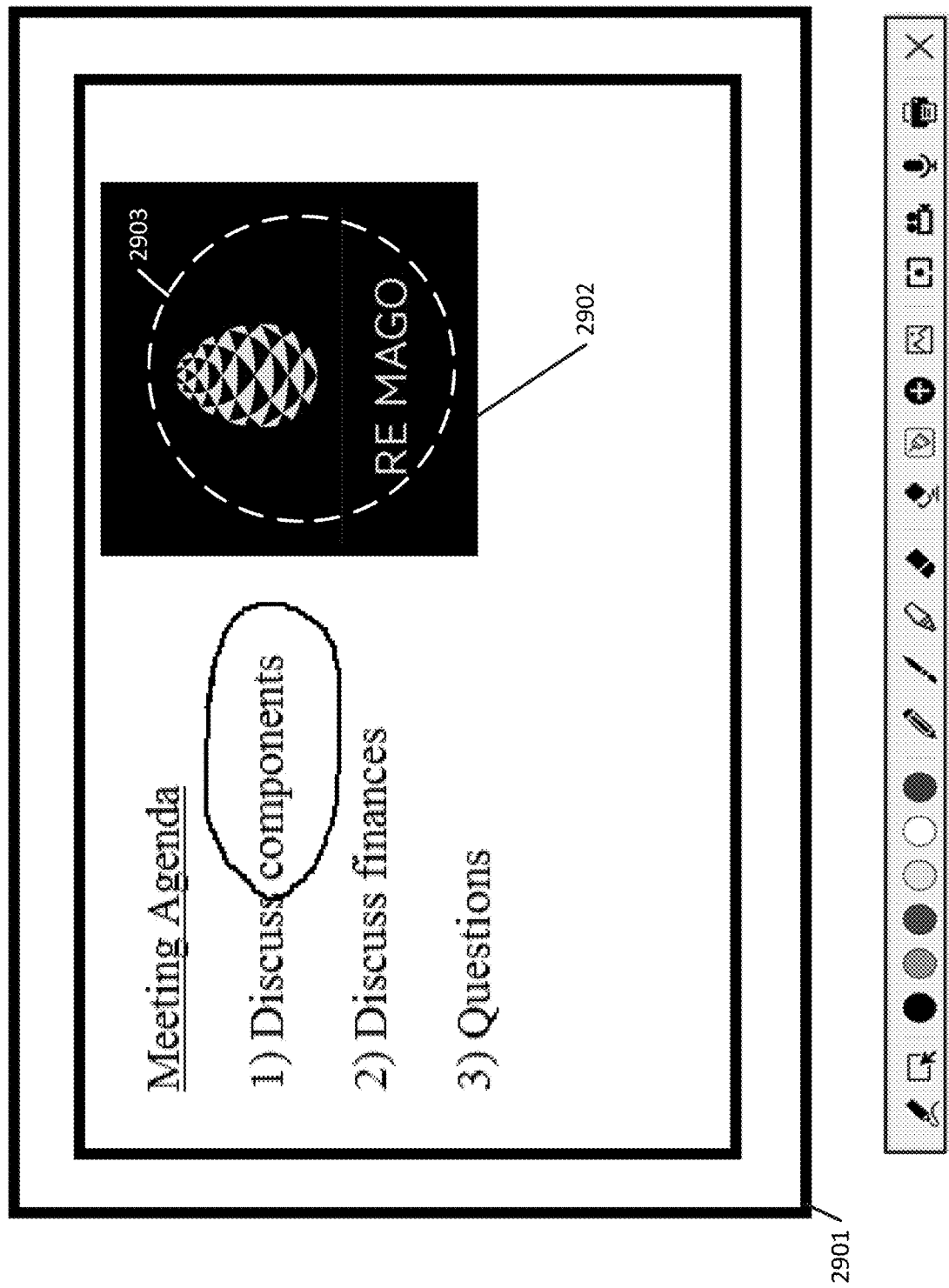
FIGS. 29A-29E illustrate an example of a user dragging the image portion to toolbar interface of the collaboration workspace and the result of dragging the image portion to the toolbar interface according to an exemplary embodiment.

As shown in FIG. 29A, a user has selected a circular cropping 2903 of image 2902 in editing interface 2901 of collaboration workspace. The cropping tool is not shown in this figure but it is understood that the user interface would include the cropping tool. In addition to the editing interface 2901, the collaboration workspace includes toolbar interface 2904. The toolbar interface 2904 can include various tools accessible to the user to edit or markup the content in the editing interface 2904. As discussed below, the toolbar interface can also include functionality to store images for re-use.

Figure 29B:
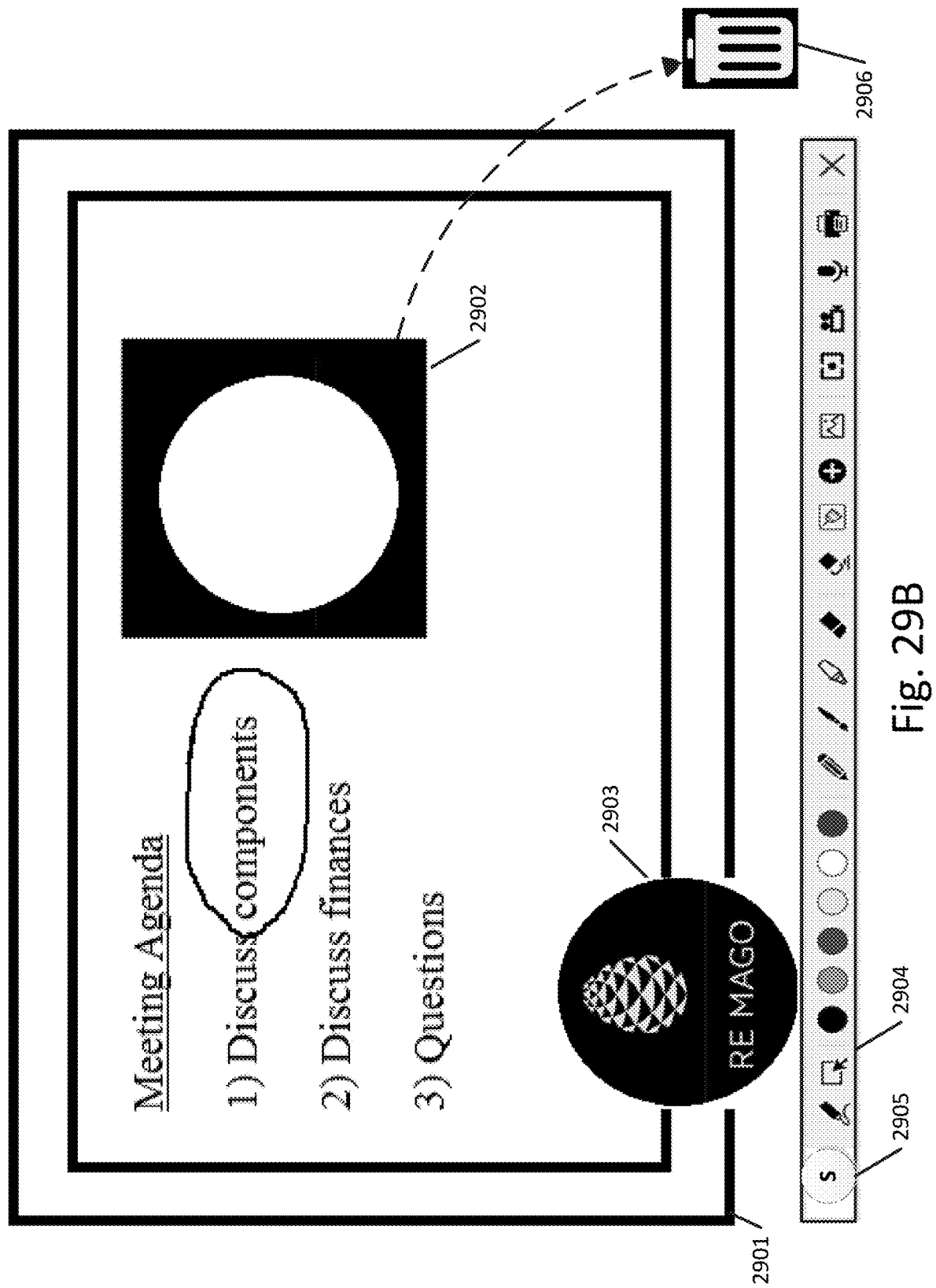

FIG. 29B illustrates the collaboration workspace after the user has dragged the image portion 2903 to a location associated with the toolbar interface 2904 of the collaboration workspace but prior to the user releasing (dropping the image portion). The dashed arrow between the remaining image 2902 and the trash icon 2906 indicates that when the user completes the drag and drop (i.e., when the second input is detected), the remaining image 2902 will be deleted from the collaboration workspace, as discussed earlier. The trash icon 2904 is not part of the user interface or collaboration workspace but is presented in the figure to illustrate the result of the drag and drop of the image portion 2903 by the user.

FIG. 29B additionally illustrates a new icon 2905 that can appear within the toolbar interface 2904 when the user drags the image portion 2903 over toolbar interface 2904. The icon 2905 (shown as "S") can indicate to the user that dropping the image portion on the toolbar interface will result in the image being saved to the toolbar for subsequent re-use by the user.

Figure 29C:
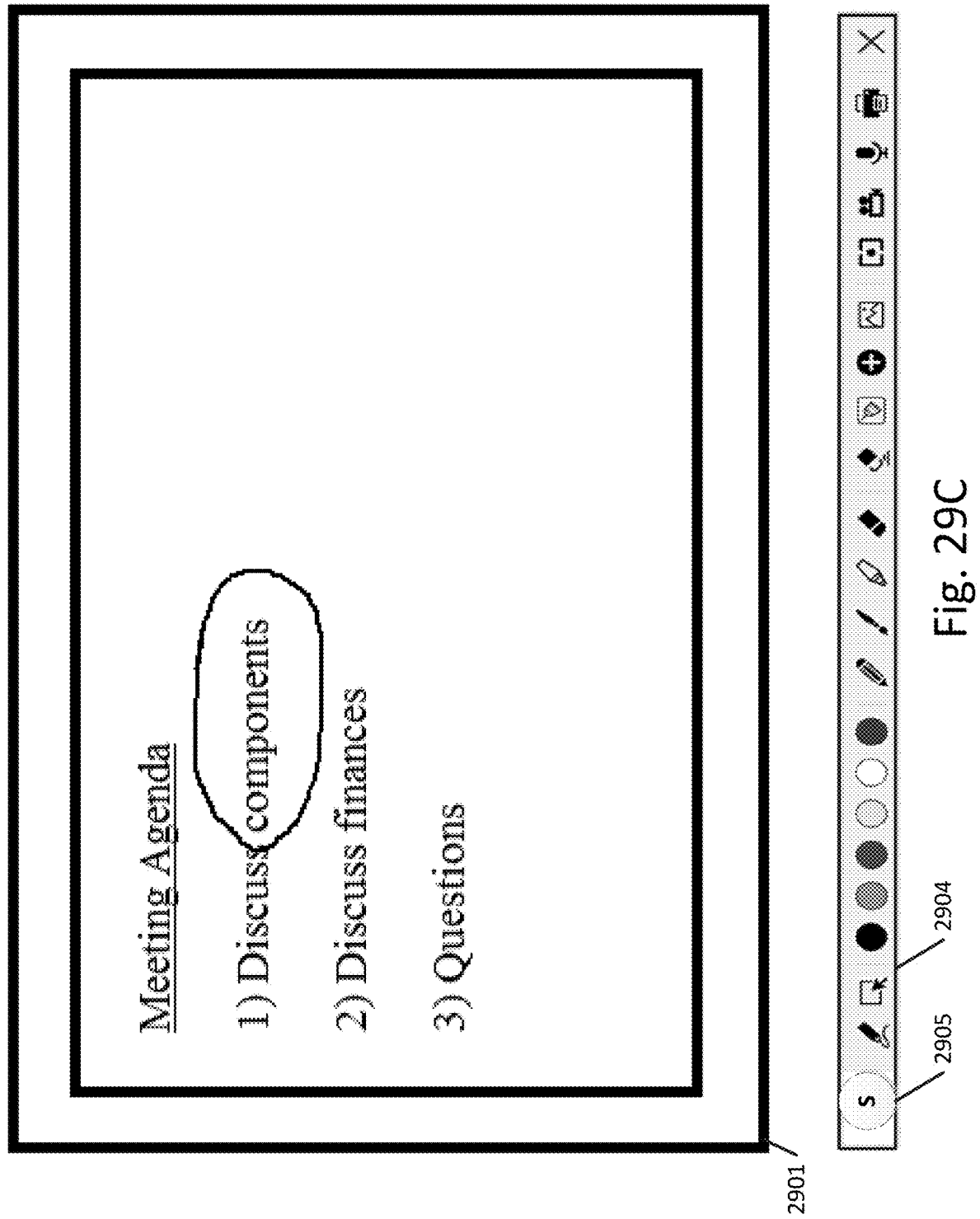

FIG. 29C illustrates the collaboration workspace after the user has completed the drag and drop motion (i.e., after the second input is detected). As shown in the figure, neither the image portion (2903 in FIG. 29B) nor the remaining image (2902 in FIG. 29B) appear in the collaboration workspace. This is the result of the transparent layer sending a first command to the server hosting the collaboration workspace instructing the collaboration application on the server to remove the original image from the collaboration workspace and a second command to the server hosting the collaboration workspace instructing the collaboration application to store the image portion within the toolbar associated with the toolbar interface 2904. The toolbar interface 2904 indicates this with the presence of icon 2905, which alerts the user that stored images are saved on the toolbar and can be accessed through the toolbar interface 2904.

The changes to the collaboration workspace shown in in FIG. 29C can be propagated across all instances of the collaboration workspace for all users connected to the collaboration workspace. In other words, the changes to the collaboration workspace can occur on all instances of the collaboration workspace for all users. As discussed earlier, this is because the transparent layer sends the commands to remove the original image and insert the image portion at the location to the server hosting the collaboration workspace over a web socket connection, which then propagates these changes to all connected devices over the web socket connection. In this case, the stored image can then be stored or hosted on the server and accessed by all users connected to the collaboration workspace through their respective instances of the toolbar interface (which can retrieve the image portion over a web socket connection). Alternatively, the server can instruct the local computing device to store the image portion locally in local memory, making it accessible only to the local computing device.

Figure 29D:
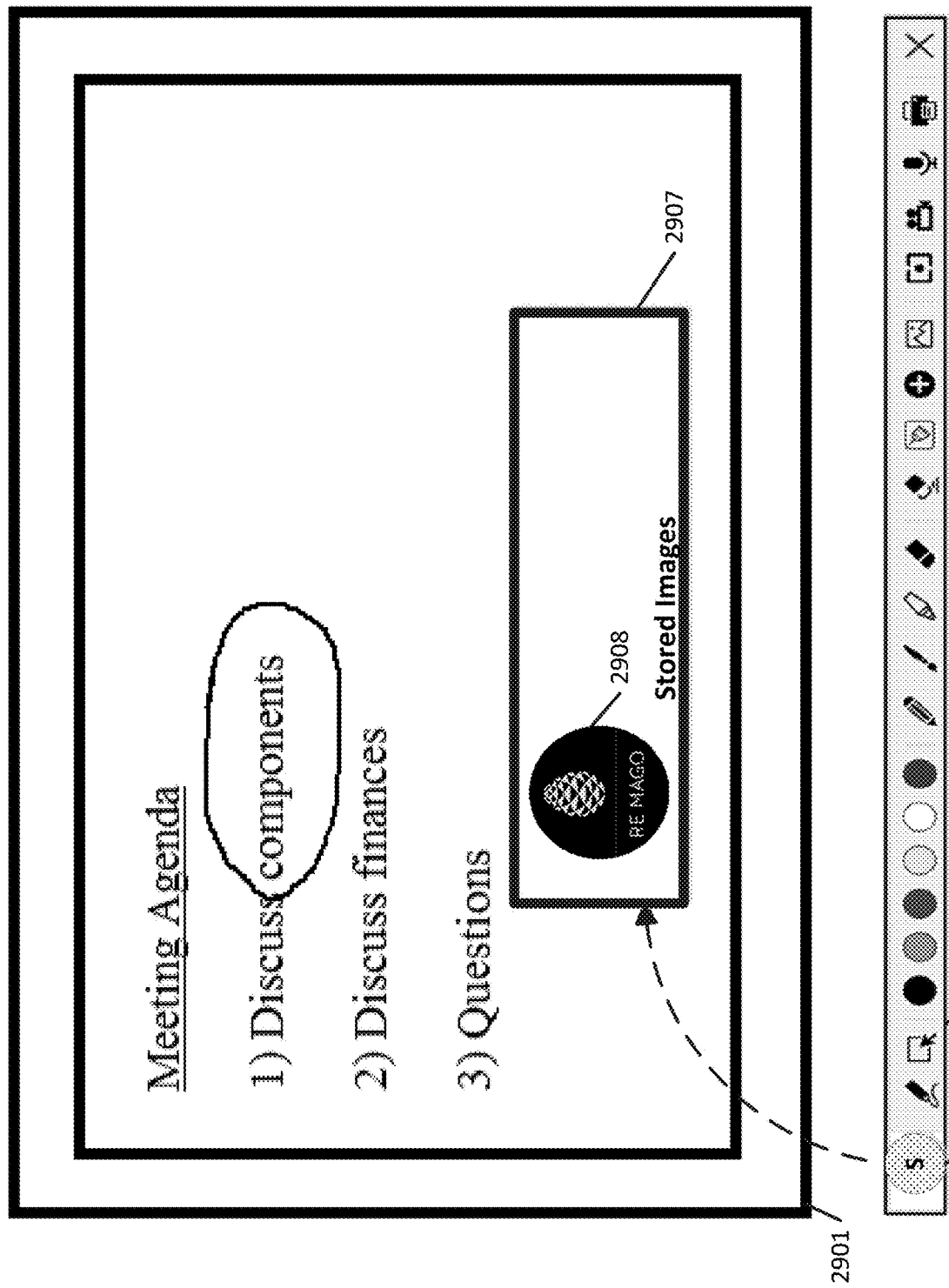

FIG. 29D illustrates the use of the toolbar interface 2904 to retrieve previously store image portions. As shown in FIG. 29D, a user has selected icon 2905 in toolbar interface, resulting in a stored image interface 2907 being presented to the user. The stored image interface 2907 can display representations of all previously saved images or image portions. For example, representation 2908 corresponds to image portion 2903 in FIG. 29B.

Figure 29E:
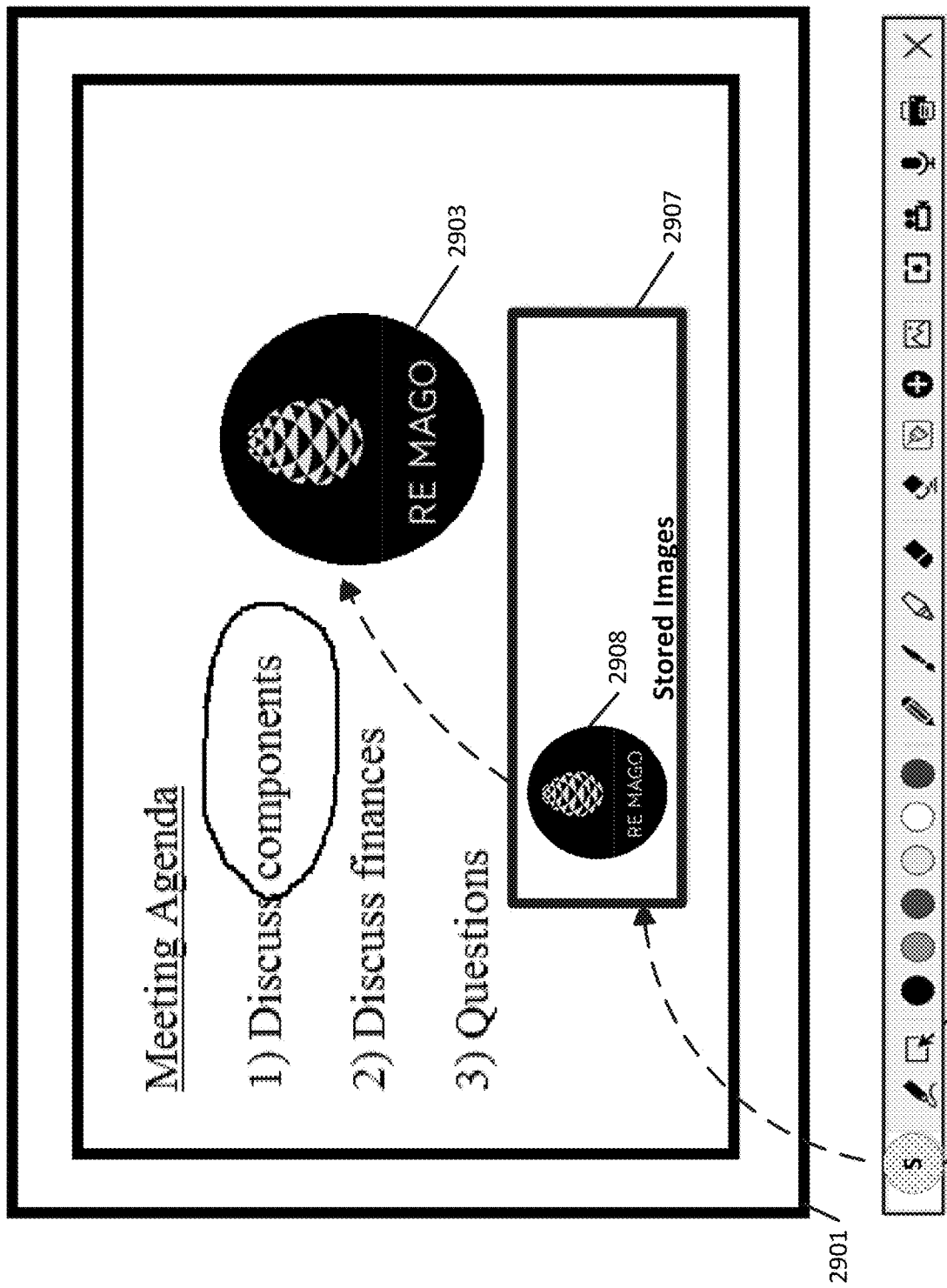

FIG. 29E illustrates the use of the toolbar interface to insert a previously saved image. As shown in FIG. 29E, the user has dragged representation 2908 out of the stored image interface and onto the editing interface 2901, resulting in re-insertion of image portion 2903 into the editing interface 2901 of collaboration workspace.

One or more of the above-described techniques can be implemented in or involve one or more computer systems.

Figure 30:
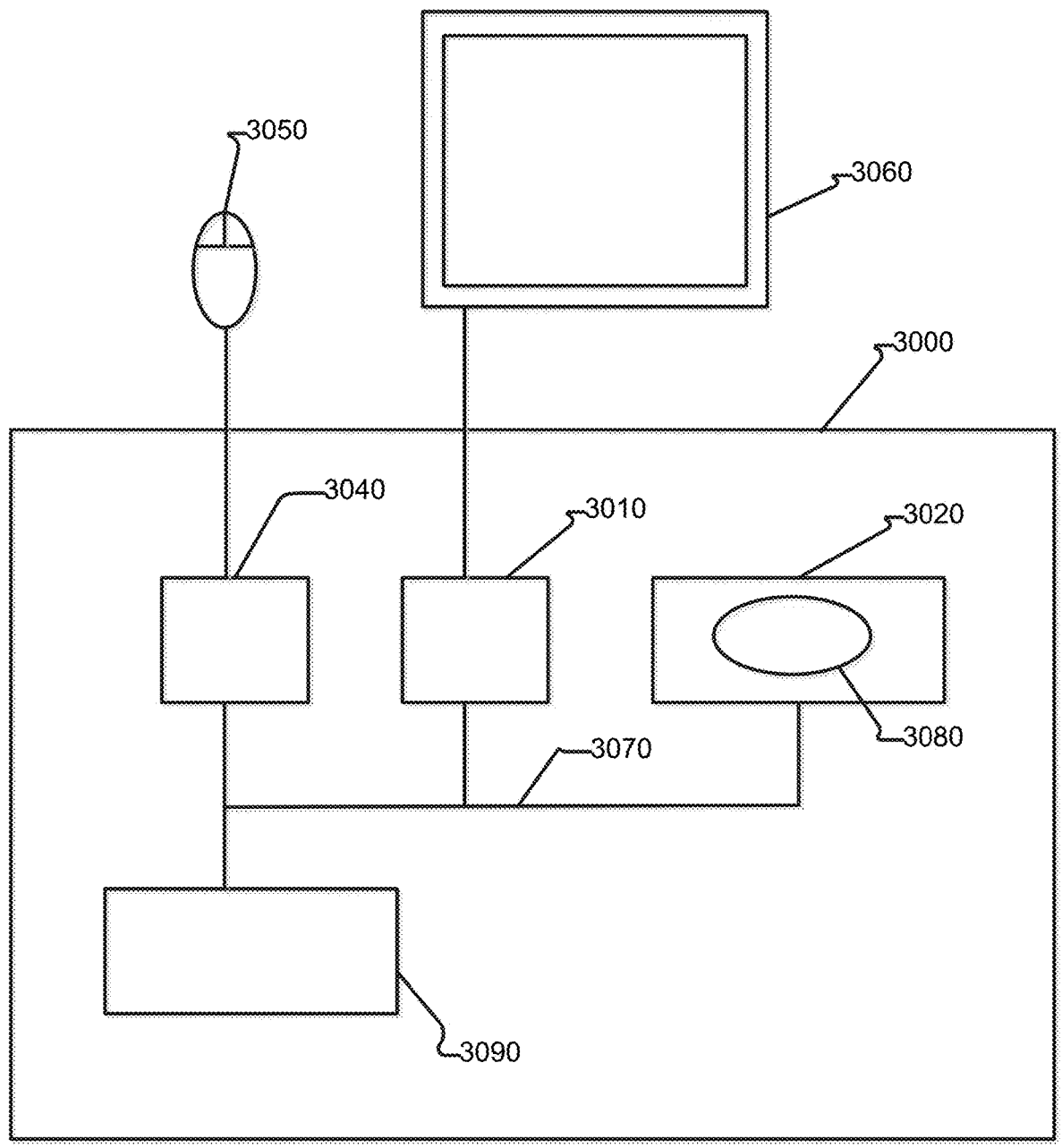
FIG. 30 illustrates an exemplary computing environment configured to carry out the disclosed methods.

FIG. 30 illustrates an example of a specialized computing environment 3000. The computing environment 3000 is not intended to suggest any limitation as to scope of use or functionality of a described embodiment(s).

With reference to FIG. 30, the computing environment 3000 includes at least one processing unit 3010 and memory 3020. The processing unit 3010 executes computer-executable instructions and can be a real or a virtual processor. In a multi-processing system, multiple processing units execute computer-executable instructions to increase processing power. The memory 3020 can be volatile memory (e.g., registers, cache, RAM), non-volatile memory (e.g., ROM, EEPROM, flash memory, etc.), or some combination of the two. The memory 3020 can store software 3080 implementing described techniques.

A computing environment can have additional features. For example, the computing environment 3000 includes storage 3040, one or more input devices 3050, one or more output devices 3060, and one or more communication connections 3090. An interconnection mechanism 3070, such as a bus, controller, or network interconnects the components of the computing environment 3000. Typically, operating system software or firmware (not shown) provides an operating environment for other software executing in the computing environment 3000, and coordinates activities of the components of the computing environment 3000.

The storage 3040 can be removable or non-removable, and includes magnetic disks, magnetic tapes or cassettes, CD-ROMs, CD-RWs, DVDs, or any other medium which can be used to store information and which can be accessed within the computing environment 3000. The storage 3040 can store instructions for the software 3080.

The input device(s) 3050 can be a touch input device such as a keyboard, mouse, pen, trackball, touch screen, or game controller, a voice input device, a scanning device, a digital camera, remote control, or another device that provides input to the computing environment 3000. The output device (s) 3060 can be a display, television, monitor, printer, speaker, or another device that provides output from the computing environment 3000.

The communication connection(s) 3090 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the context of computer-readable media. Computer-readable media are any available media that can be accessed within a computing environment. By way of example, and not limitation, within the computing environment 3000, computer-readable media include memory 3020, storage 3040, communication media, and combinations of any of the above.

Of course, FIG. 30 illustrates computing environment 3000, display device 3060, and input device 3050 as separate devices for ease of identification only. Computing environment 3000, display device 3060, and input device 3050 can be separate devices (e.g., a personal computer connected by wires to a monitor and mouse), can be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 3000 can be a set-top box, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto.

We claim:

1. A method for propagating cropped images over a web socket connection in a networked collaboration workspace, the method comprising:
   transmitting, on a user interface of a local computing device, a representation of a collaboration workspace hosted on a server and accessible to a plurality of participants on a plurality of computing devices over a web socket connection, wherein the collaboration workspace comprises one or more images;
   detecting, by a cropping tool executing on the local computing device, a user input selecting an image portion of an image in the one or more images, the user input corresponding to a plurality of coordinates;
   transmitting, by the cropping tool executing on the local computing device, the plurality of coordinates to a transparent layer executing on the local computing device, the transparent layer comprising an application programming interface (API) configured to interface with one or more of: the operating system or one or more applications configured to execute on the operating system;
   capturing, by the transparent layer executing on the local computing device, the image portion based at least in part on the plurality of coordinates;
   detecting, by the transparent layer executing on the local computing device, a second user input to drag the selected image portion to a location within the collaboration workspace; and
   transmitting, by the transparent layer executing on the local computing device, a plurality of commands to the server hosting the collaboration workspace, the plurality of commands being configured to cause the image to be removed from the collaboration workspace and to further cause the image portion to be inserted into the collaboration workspace based at least in part on the location.

2. The method of claim 1, wherein capturing, by the transparent layer executing on the local computing device, the image portion based at least in part on the plurality of coordinates comprises:
   transmitting, by the transparent layer executing on the local computing device, a request to one or more of the operating system or an application executing on the local computing device for a screen capture of the image portion defined by the plurality of coordinates;
   receiving, by the transparent layer executing on the local computing device, the screen capture of the image portion defined by the plurality of coordinates; and
   storing, by the transparent layer executing on the local computing device, the image portion in random access memory of the local computing device.

3. The method of claim 1, wherein the plurality of commands are transmitted over the web socket connection.

4. The method of claim 1, wherein detecting, by the transparent layer executing on the local computing device, a second user input to drag the selected image portion to a new position within the collaboration workspace comprises:
   detecting, by the cropping tool executing on the local computing device, the second user input to drag the selected image portion to a new position within the collaboration workspace; and
   transmitting, by the cropping tool executing on the local computing device, the new position to the transparent layer executing on the local computing device.

5. The method of claim 1, wherein the location corresponds to a location associated with an editing interface and wherein transmitting, by the transparent layer executing on the local computing device, a plurality of commands to the server hosting the collaboration workspace comprises:
   transmitting a first command from the transparent layer to the server hosting the collaboration workspace, the first command being configured to cause the image to be removed from the collaboration workspace; and
   transmitting a second command from the transparent layer to the server hosting the collaboration workspace, the second command being configured to cause the image portion to be inserted into the editing workspace at the location.

6. The method of claim 5, wherein the image portion is stored in random access memory by the transparent layer and wherein the second command comprises a storage location of the image portion in the random access memory.

7. The method of claim 1, wherein the location corresponds to a location associated with a toolbar interface and wherein transmitting, by the transparent layer executing on the local computing device, a plurality of commands to the server hosting the collaboration workspace comprises:
   transmitting a first command from the transparent layer to the server hosting the collaboration workspace, the first command being configured to cause the image to be removed from the collaboration workspace; and
   transmitting a second command from the transparent layer to the server hosting the collaboration workspace, the second command being configured to cause a toolbar associated with the toolbar interface to store the image portion.

8. A local computing device for propagating cropped images over a web socket connection in a networked collaboration workspace, the local computing device comprising:
   one or more processors; and
   one or more memories operatively coupled to at least one of the one or more processors and having instructions stored thereon that, when executed by at least one of the one or more processors, cause at least one of the one or more processors to:
   transmit, on a user interface of a local computing device, a representation of a collaboration workspace hosted on a server and accessible to a plurality of participants on a plurality of computing devices over a web socket connection, wherein the collaboration workspace comprises one or more images;
   detect, by a cropping tool executing on the local computing device, a user input selecting an image portion of an image in the one or more images, the user input corresponding to a plurality of coordinates;

transmit, by the cropping tool executing on the local computing device, the plurality of coordinates to a transparent layer executing on the local computing device, the transparent layer comprising an application programming interface (API) configured to interface with one or more of: the operating system or one or more applications configured to execute on the operating system;

capture, by the transparent layer executing on the local computing device, the image portion based at least in part on the plurality of coordinates;

detect, by the transparent layer executing on the local computing device, a second user input to drag the selected image portion to a location within the collaboration workspace; and transmit, by the transparent layer executing on the local computing device, a plurality of commands to the server hosting the collaboration workspace, the plurality of commands being configured to cause the image to be removed from the collaboration workspace and to further cause the image portion to be inserted into the collaboration workspace based at least in part on the location.

9. The local computing device of claim 8, wherein the instructions that, when executed by at least one of the one or more processors, cause at least one of the one or more processors to capture, by the transparent layer executing on the local computing device, the image portion based at least in part on the plurality of coordinates further cause at least one of the one or more processors to:

transmit, by the transparent layer executing on the local computing device, a request to one or more of the operating system or an application executing on the local computing device for a screen capture of the image portion defined by the plurality of coordinates;

receive, by the transparent layer executing on the local computing device, the screen capture of the image portion defined by the plurality of coordinates; and store, by the transparent layer executing on the local computing device, the image portion in random access memory of the local computing device.

10. The local computing device of claim 8, wherein the plurality of commands are transmitted over the web socket connection.

11. The local computing device of claim 8, wherein the instructions that, when executed by at least one of the one or more processors, cause at least one of the one or more processors to detect, by the transparent layer executing on the local computing device, a second user input to drag the selected image portion to a new position within the collaboration workspace further cause at least one of the one or more processors to:

detect, by the cropping tool executing on the local computing device, the second user input to drag the selected image portion to a new position within the collaboration workspace; and transmit, by the cropping tool executing on the local computing device, the new position to the transparent layer executing on the local computing device.

12. The local computing device of claim 8, wherein the location corresponds to a location associated with an editing interface and wherein the instructions that, when executed by at least one of the one or more processors, cause at least one of the one or more processors to transmit, by the transparent layer executing on the local computing device, a plurality of commands to the server hosting the collaboration workspace further cause at least one of the one or more processors to:

transmit a first command from the transparent layer to the server hosting the collaboration workspace, the first command being configured to cause the image to be removed from the collaboration workspace; and transmit a second command from the transparent layer to the server hosting the collaboration workspace, the second command being configured to cause the image portion to be inserted into the editing workspace at the location.

13. The local computing device of claim 12, wherein the image portion is stored in random access memory by the transparent layer and wherein the second command comprises a storage location of the image portion in the random access memory.

14. The local computing device of claim 8, wherein the location corresponds to a location associated with a toolbar interface and wherein the instructions that, when executed by at least one of the one or more processors, cause at least one of the one or more processors to transmit, by the transparent layer executing on the local computing device, a plurality of commands to the server hosting the collaboration workspace further cause at least one of the one or more processors to:

transmit a first command from the transparent layer to the server hosting the collaboration workspace, the first command being configured to cause the image to be removed from the collaboration workspace; and transmit a second command from the transparent layer to the server hosting the collaboration workspace, the second command being configured to cause a toolbar associated with the toolbar interface to store the image portion.

15. At least one non-transitory computer-readable medium storing computer-readable instructions that, when executed by a local computing device, cause the local computing device to:

transmit, on a user interface of the local computing device, a representation of a collaboration workspace hosted on a server and accessible to a plurality of participants on a plurality of computing devices over a web socket connection, wherein the collaboration workspace comprises one or more images;

detect, by a cropping tool executing on the local computing device, a user input selecting an image portion of an image in the one or more images, the user input corresponding to a plurality of coordinates;

transmit, by the cropping tool executing on the local computing device, the plurality of coordinates to a transparent layer executing on the local computing device, the transparent layer comprising an application programming interface (API) configured to interface with one or more of: the operating system or one or more applications configured to execute on the operating system;

capture, by the transparent layer executing on the local computing device, the image portion based at least in part on the plurality of coordinates;

detect, by the transparent layer executing on the local computing device, a second user input to drag the selected image portion to a location within the collaboration workspace; and transmit, by the transparent layer executing on the local computing device, a plurality of commands to the server hosting the collaboration workspace, the plurality of commands being configured to cause the image to be removed from the collaboration workspace and to further cause the image portion to be inserted into the collaboration workspace based at least in part on the location.

16. The at least one non-transitory computer-readable medium of claim 15, wherein the instructions that, when executed by the local computing device, cause the local computing device to capture, by the transparent layer executing on the local computing device, the image portion based at least in part on the plurality of coordinates further cause the local computing device to:
transmit, by the transparent layer executing on the local computing device, a request to one or more of the operating system or an application executing on the local computing device for a screen capture of the image portion defined by the plurality of coordinates;
receive, by the transparent layer executing on the local computing device, the screen capture of the image portion defined by the plurality of coordinates; and
store, by the transparent layer executing on the local computing device, the image portion in random access memory of the local computing device.

17. The at least one non-transitory computer-readable medium of claim 15, wherein the plurality of commands are transmitted over the web socket connection.

18. The at least one non-transitory computer-readable medium of claim 15, wherein the instructions that, when executed by the local computing device, cause the local computing device to detect, by the transparent layer executing on the local computing device, a second user input to drag the selected image portion to a new position within the collaboration workspace further cause the local computing device to:
detect, by the cropping tool executing on the local computing device, the second user input to drag the selected image portion to a new position within the collaboration workspace; and
transmit, by the cropping tool executing on the local computing device, the new position to the transparent layer executing on the local computing device.

19. The at least one non-transitory computer-readable medium of claim 15, wherein the location corresponds to a location associated with an editing interface and wherein the instructions that, when executed by the local computing device, cause the local computing device to transmit, by the transparent layer executing on the local computing device, a plurality of commands to the server hosting the collaboration workspace further cause the local computing device to:
transmit a first command from the transparent layer to the server hosting the collaboration workspace, the first command being configured to cause the image to be removed from the collaboration workspace; and
transmit a second command from the transparent layer to the server hosting the collaboration workspace, the second command being configured to cause the image portion to be inserted into the editing workspace at the location.

20. The at least one non-transitory computer-readable medium of claim 19, wherein the image portion is stored in random access memory by the transparent layer and wherein the second command comprises a storage location of the image portion in the random access memory.

21. The at least one non-transitory computer-readable medium of claim 15, wherein the location corresponds to a location associated with a toolbar interface and wherein the instructions that, when executed by the local computing device, cause the local computing device to transmit, by the transparent layer executing on the local computing device, a plurality of commands to the server hosting the collaboration workspace further cause the local computing device to:
transmit a first command from the transparent layer to the server hosting the collaboration workspace, the first command being configured to cause the image to be removed from the collaboration workspace; and
transmit a second command from the transparent layer to the server hosting the collaboration workspace, the second command being configured to cause a toolbar associated with the toolbar interface to store the image portion.

* * * * *